US011639658B2

(12) United States Patent
Chen

(10) Patent No.: US 11,639,658 B2
(45) Date of Patent: May 2, 2023

(54) DRILL BIT DYSFUNCTION IDENTIFICATION BASED ON COMPACT TORSIONAL BEHAVIOR ENCODING

(71) Applicant: Halliburton Energy Services, Inc., Houston, TX (US)

(72) Inventor: Shilin Chen, Montgomery, TX (US)

(73) Assignee: Halliburton Energy Services, Inc., Houston, TX (US)

(*) Notice: Subject to any disclaimer, the term of this patent is extended or adjusted under 35 U.S.C. 154(b) by 90 days.

(21) Appl. No.: 17/443,210

(22) Filed: Jul. 22, 2021

(65) Prior Publication Data

US 2023/0028108 A1     Jan. 26, 2023

(51) Int. Cl.
    *E21B 44/04*     (2006.01)
    *G01M 99/00*     (2011.01)
    *E21B 7/26*     (2006.01)

(52) U.S. Cl.
    CPC .......... *E21B 44/04* (2013.01); *G01M 99/008* (2013.01); *E21B 7/267* (2020.05)

(58) Field of Classification Search
    None
    See application file for complete search history.

(56) References Cited

U.S. PATENT DOCUMENTS

2015/0160101 A1*   6/2015   Gao .................... G01M 13/028
                                                                   702/6

OTHER PUBLICATIONS

Brett, "The Genesis of Torsional Drillstring Vibrations", SPE Drill Eng, 7 (03): 168-174. SPE-21943-PA, Sep. 1992.
Kyllingstad, et al., "A Study of Slip/Stick Motion of the Bit", SPE Drill Eng 3 (04): 369-373. SPE-16659-PA, Dec. 1988.

(Continued)

*Primary Examiner* — Raul J Rios Russo
*Assistant Examiner* — Carl F. R. Tchatchouang
(74) *Attorney, Agent, or Firm* — Delizio, Peacock, Lewin & Guerra

(57) ABSTRACT

Based on measurements of forces and rotational velocity experienced by a drill bit during drilling, drilling behavior is detected and identified. Measurements of forces on a drill bit including torque on bit (TOB), weight on bit (WOB), etc. and measurements of rotational velocity (rotations per minute or RPM) are acquired in real time at the drill bit. Various measurements are correlated to produce related combinations of measurements, such as WOB-RPM, TOB-RPM, and RPM-time. Based on fitting between the combinations of measurements and curves corresponding to predetermined torsional behavior trends, torsional, axial, and rotational behaviors are classified as functional or dysfunctional. A dysfunction identifier then identifies drill bit dysfunctions, such as high-frequency torsional noise, cutting-induced stick-slip, friction-inducted stick-slip, pipe-induced stick-slip, three-dimensional (3D) coupled vibrations (including subsets high-frequency torsional oscillations and low-frequency torsional oscillations), low-frequency torsional vibration, high-frequency torsional vibration, etc.) based on the functionality of the torsional, axial, and rotational behaviors. Based on drill bit dysfunction identification, dysfunctional drilling behavior can be mitigated.

30 Claims, 30 Drawing Sheets

(56) References Cited

OTHER PUBLICATIONS

Pelfrene, et al., "Mitigating Stick-Slip In Deep Drilling Based On Optimization Of PDC Bit Design", SPE/IADC Drilling Conference and Exhibition, Amsterdam, The Netherlands, Mar. 2011. SPE-139839-MS.

Shen, et al., "The Origin and Mechanism of Severe Stick-Slip", SPE Annual Technical Conference and Exhibition, San Antonio, Texas, USA, Oct. 2017. SPE-187457-MS.

* cited by examiner

US 11,639,658 B2

DRILL BIT DYSFUNCTION IDENTIFICATION BASED ON COMPACT TORSIONAL BEHAVIOR ENCODING

TECHNICAL FIELD

The disclosure generally relates to the field of earth or rock drilling or mining and more particularly to identification of drill bit dysfunction.

BACKGROUND

In earth drilling, mechanical energy is applied to deform and fracture geological formations in order to create wellbores or otherwise access geological assets. Rotary drill bits are driven by torsional and axial forces causing drill bit cutting surfaces to remove formation mass. Interactions between the drill bit and associated apparatuses (such as the drill string), the formation, and drilling fluid can result in various types of drilling behavior, including vibrational and oscillatory drilling dysfunctions. Drilling dysfunctions can result in drilling energy loss and reduced drilling efficiency, as torsional and axial forces are dissipated instead of applied to formation removal and can be damaging to drilling equipment. Types of vibrational behaviors and dysfunctions, such as torsional oscillations, stick-slip, etc., can be classified by characteristic drill bit and bottom hole assembly (BHA) behavior.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to PDC drill bits in illustrative examples. Aspects of this disclosure can be also applied to other rotary drill bits. In other instances, well-known instruction instances, protocols, structures, and techniques have not been shown in detail in order not to obfuscate the description.

Overview

Drilling dysfunctions include high-frequency torsional noise, cutting-induced stick-slip, friction-inducted stick-slip, pipe-induced stick-slip, three-dimensional (3D) coupled vibrations (of which can include subsets high-frequency torsional oscillations and low-frequency torsional oscillations), low-frequency torsional vibration, high-frequency torsional oscillation, etc. The technology disclosed herein identifies various drilling dysfunctions based on characteristic trends displayed in relationships between different types of drill bit measurements. A torsional behavior detector loaded proximate to a drill bit contains information about predetermined trends corresponding to different drilling behaviors ("torsional behavior trends") and uses the torsional behavior trends to detect a drilling behavior during drilling.

The torsional behavior detector relates different types of drilling measurements obtained at the drill bit over a time period to the torsional behavior trends. For example, for a given time period the torsional behavior detector relates the following: weight on bit (WOB) measurements and rotational speed (e.g., rotations per minute (RPM)), torque on bit (TOB) and RPM, and RPM and time. For each set of related measurements, the torsional behavior detector determines whether the related measurements fit one or more of the predetermined torsional behavior trends. If a set of related measurements fits a torsional behavior trend, then the torsional behavior detector sets a sequence of bits (e.g., 3-bit array), according to the fitting (hereinafter "compact torsional behavior array"). The compact torsional behavior array is communicated to a device that is most likely at the surface to identify a drilling dysfunction based on the compact torsional behavior array. The compact form allows torsional behavior(s) to be communicated instead of measurement distributions. With the identified drilling dysfunction, a corresponding mitigation action(s) can be taken.

Example Illustrations

Figure 1:
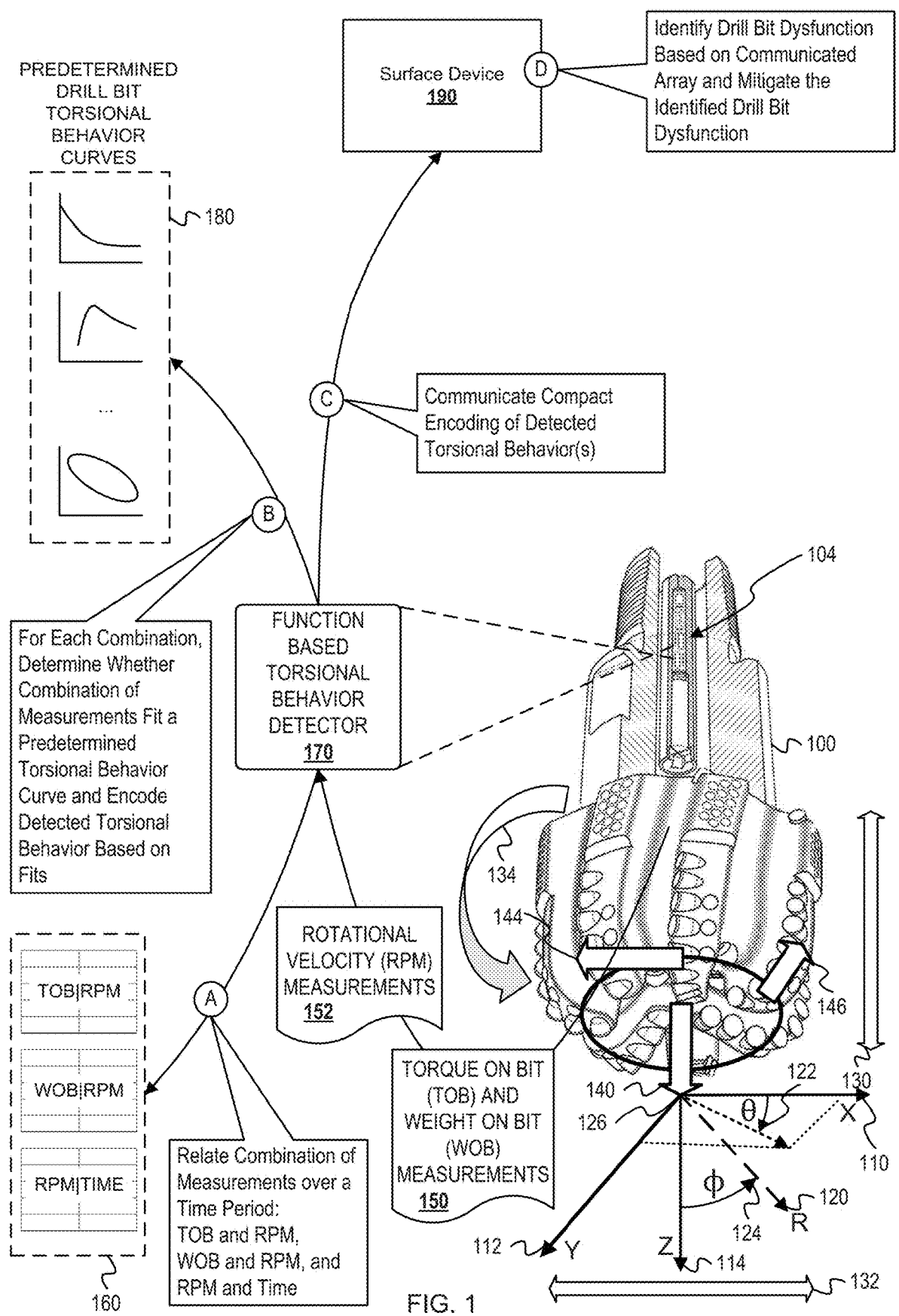
FIG. 1 depicts an example system for identifying torsional behavior types and mitigating torsional dysfunctions.

FIG. 1 depicts an example system for identifying torsional behavior types and mitigating torsional dysfunctions. FIG. 1 includes a schematic diagram of a drill bit 100 and a schematic diagram of a function-based torsional behavior detector 170 (hereinafter the "behavior detector" 170).

Drilling of wells and other wellbores or boreholes is commonly carried out using drill bits, such as the drill bit 100. The drill bit 100 is depicted as a poly-crystalline diamond compact (PDC) bit, but can be a rotary bit such as a fixed cutter-bit (i.e., a PDC bit, an impregnated bit, a diamond bit, etc.), a rotary bit such as a roller-cone bit (i.e., a tungsten carbide insert (TCI) bit, a milled-tooth bit, etc.), a coring bit, a reaming bit, a sidetracking bit, etc. The drill bit 100 includes an embedded force measurement device 104. The embedded force measurement device 104 can include memory and one or more processors. The embedded force measurement device 104 can also or alternatively be in communication with a processor and memory, including data storage. The embedded force measurement device 104 comprises circuitry placed proximate to the drill bit 100, including within the drill bit such as inside any combination of the shank and pin connection. For example, the embedded force measurement device 104 can be located in the center of the drill bit 100, e.g., along the axis of rotation, can be located in the shank of the drill bit 100, and can be located in a puck or additional element located proximate to the drill bit 100 or between the drill bit boo and the drill string.

The embedded force measurement device 104 includes or is in communication with sensors which measure at least torsional force, axial force, and rotational velocity experienced by the drill bit 100. The sensors can measure force directly or indirectly— for example, sensors can measure strain and determine force from strain measurements based on a relationship between strain and force (e.g., Hook's law). Alternatively, sensors can measure deformation or stress and determine force based on a relationship between at least some of deformation, stress, strain and force (e.g., through the use of Young's modulus). The embedded force measurement device 104 determines TOB (torque-on-bit) based on the torsional force at the drill bit 100 and WOB (weight-on-bit) based on the axial force at the drill bit 100.

Traditionally, TOB and WOB are estimated or approximated from surface, drill string, or drilling rig measurements. Measurement of the TOB and WOB at the drill bit 100 eliminates effects of intervening wellbore components (i.e., drill pipe, drilling fluid, casing, centralizers, etc.) from TOB and WOB determinations. TOB and WOB can be measured at any appropriate measurement location, including at separate locations, on the drill bit 100. TOB can be measured along the rotational axis of the drill bit 100, at a surface of the drill bit 100 (i.e., where the drill bit 100 interacts with a formation), or at any other point. TOB can also be measured in multiple locations and such measurements averaged, such as at multiple points along outer radial surfaces of the drill bit 100. WOB can be measured along the axial axis of the drill bit 100, at a surface of the drill bit 100, or at any other point. WOB can be measured at multiple locations and such measurements averaged, such as at multiple points along bottom most axial surface of the drill bit 100.

The embedded force measurement device 104 also includes or is in communication with sensors which measure angular or rotational velocity of the drill bit 100. The drill bit rotational speed can be measured in RPM as revolutions or rotations per minute. Traditionally, drill bit RPM can be estimated based on knowledge of drill pipe RPM and any mud motor RPM—where mud motor RPM can be dependent on variables such as drilling fluid flow rate, differential pressure, etc. RPM measurements can also be inferred from the rate at which cuttings or drilling mud return to the surface, or other mud-pump-derived information. Measurement of the RPM at the drill bit 100 eliminates effect of intervening wellbore components (i.e., friction between the drill pipe and casing, centralizer drag, drilling fluid turbulence, formation fluid influx, etc.) from RPM determination. The RPM can be measured as an angular velocity or can be calculated or inferred from measurements of displacement, velocity, or acceleration (i.e., in the x-y plane) or from measurements of angular displacement or angular acceleration.

Various coordinate systems for the drill bit 100 are depicted. X-axis 110, y-axis 112, and z-axis 114 define an example set of Cartesian coordinates for the drill bit 100. Radial distance 120, azimuthal angle θ 122, and polar angle φ 124 define an example set of spherical coordinates for the drill bit 100. For the example Cartesian and spherical coordinates, the azimuthal angle θ is shown to be a projection of the radius vector R onto the x-y plane defined by the x-axis 110 and the y-axis 112. This is an example relationship, and the drill bit measurements can be defined in relationship to either solely Cartesian or spherical coordinates and can be defined in relationship to other appropriate coordinate systems (e.g., cylindrical coordinates). These example coordinate systems are described for ease of further descriptions and should not be considered limiting in any way.

Both the Cartesian and spherical coordinate systems are shown about an origin point 126. A coordinate system for the drill bit 100 can be defined about any appropriate origin point—e.g., the origin point can be between the drill bit and the surface to be drilled (as depicted by the origin point 126), the origin point can be within the drill bit 100, the origin point can be within the sensor, within the embedded force measurement device 104, etc. Further, the coordinate system for the drill bit 100 can be defined in any appropriate frame of reference, including both non-inertial and inertial frames of reference. The frame of reference can be defined with respect to the drill bit 100—where the drill bit 100 operates in a generally rotation frame of refence if the drill bit 100 is a rotary drill bit. The frame of reference can be defined with respect to a wellbore or a formation—which can be approximated as an inertial frame of refence if centrifugal, Coriolis, and Euler forces are assumed to be zero on the scale of operation of the drill bit 100. No matter which frame of reference is selected, measurements can be converted between reference frames (including between inertial and non-inertial frames of reference) based on well-known relationships. Sensor and measurement locations can determine reference frame and origin selection. Further, sensor and measurement locations can be selected for ease of conversion between reference frames, where obtaining measurements along a rotational axis in a non-inertial frame may reduce any need for calculation of fictitious forces.

Various movement directions for the drill bit 100 are depicted. As drilling operates, the drill bit 100 experience movement (or displacement) in an axial direction 130, a lateral direction 132 and a torsional direction 134. Movement can be functional (e.g., a product of successful drilling) or dysfunctional (i.e., damaging or non-productive). Functional movement in the axial direction 130 is a product of advancement of the drill bit 100 along a wellbore. Functional movement in the torsional direction 134 is produced by rotation of the drill bit 100 during drilling. Movement in the lateral direction 132 can also be an artifact of normal drilling (i.e., functional movement)—for example, if measurements are collected off the axis of torsional rotation, movement in the lateral direction 132 (or in the x-y plane) will occur as a function of movement of the sensors in the torsional direction 134. Drilling dysfunctions cause dysfunctional movements in any of the axial direction 130, lateral direction 132, and torsional direction 134. Dysfunctional movements in any of the axial direction 130, lateral direction 132, and torsional direction 134 can be characteristic of various types of drilling dysfunctions. Movement encompasses at least one of displacement, velocity, acceleration and angular displacement, angular velocity, and angular acceleration.

Movement of the drill bit 100 is a result of forces applied to (i.e., via drill pipe, mud motor, fluid drag, etc.) the drill bit 100. The total force experienced at the drill bit is decomposed into an axial force 140 (along the z-axis 114), a torsional force 144 (in the torsional direction 134), and a bending force 146 (in the direction of the polar angle ϕ 124) in FIG. 1. Other appropriate components of force can be used instead or in addition, including those based in other reference frames. WOB is a measurement of the axial force 140, while TOB is a measure of the torsional force 144. Measurement of the bending force 146 can be used to determine a bending moment of the drill bit 100. The embedded force measurement device 104 determines and, optionally, stores torque on bit (TOB) and weight on bit (WOB) measurements 150 as a function of time. The embedded force measurement device 104 also determines or is in communication with a component (such as a device, processor, sensor, etc.) that determines and, optionally, stores rotational velocity (RPM) measurements 152 as a function of time. The embedded force measurement device 104 communicates the TOB and WOB measurements 150 and RPM measurements to the behavior detector 170 for classification of drill bit torsional behavior. These measurements, obtained over time during drill bit operation, can be grouped or organized as sets of drill bit operational measurements where each set of operational measurements comprise a set of one type of operational measurement— e.g., TOB, WOB, RPM, time, etc. In some cases, a set of operational measurements includes a time measurement with a force measurement (i.e., TOB, WOB, etc.) or velocity measurement (e.g., RPM). In other cases, a set of operational measurements includes a force (i.e., TOB, WOB, etc.) measurement or velocity measurement (e.g., RPM). In such cases, each value of the set of operational measurements is related to a corresponding time or ordinal value.

The behavior detector 170 can be located in the embedded force measurement device 104 or at another location within the drill bit, within a bottom hole assembly (BHA), with the drill string, etc., such that the behavior detector 170 is in communication with the embedded force measurement device 104. The behavior detector 170 operates with the TOB and WOB measurements 150 and the RPM measurements 152 collected over a time period. Collection of TOB, WOB, and RPM measurements can be for the same time period or substantially the same time period (for example, to within measurement limits)—i.e., TOB, WOB, and RPM measurements occur synchronously or substantially synchronously.

FIG. 1 is annotated with a series of letters A-D. Each of these stages represents one or more operations. Although these stages are ordered for this example, the stages illustrate one example to aid in understanding this disclosure and should not be used to limit the claims. Subject matter falling within the scope of the claims can vary with respect to the order and some of the operations.

At stage A, the behavior detector 170 relates a combination of measurements (i.e., sets of operational measurements) into a data structure 160 (hereinafter "related measurements sets") over a time period. The related measurements sets 160 can be organized in a table, database, etc. The related measurements sets 160 can include the relationships (i.e., different combinations of the sets of drill bit operational measurements) between TOB and RPM, WOB and RPM, and RPM and time. Alternatively, more or fewer combinations of relationships can be used. For example, the behavior detector 170 can operate with the relationship between TOB and RPM alone, or on both the relationships between TOB-and-RPM and WOB-and-RPM without separately analyzing the relationship between RPM and time. Each of the related measurements sets 160 can be analyzed spatially, can be analyzed statistically, or can be otherwise treated as a set of two or three-dimensional data points or vectors. The different measurements are related by time, either having a same timestamp or proximate time stamps. The related measurements sets 160, which are combinations of different sets of operational measurements, represent distributions of the different measurements in relation to one another and therefore can be analyzed to detect torsional and other effects, such as the velocity weakening effect, stick-slip, etc.

At stage B, the behavior detector 170 determines whether any of the related measurements sets 160 fit one of predetermined drill bit torsional behavior curves 180 (hereinafter "behavior curves" 180) and encodes (e.g., sets bits or flags) torsional behavior(s) detected based on fits. The behavior detector 170 accesses a set of behavior curves 180. The behavior curves 180 can be installed with the behavior detector 170. The behavior curves 180 can comprise curves, lines (including straight lines with defined slopes), or other one-dimensional or two-dimensional shapes (e.g., closed loops) corresponding to each of the related measurement sets 160. Each of the behavior curves 180 corresponds to at least one drilling behavior. Embodiments may also install, with the behavior detector 170 or store in memory accessible to the behavior detector 170, a curve(s) corresponding to functional drilling (i.e., accepted drilling behavior or functional behavior). Some of the behavior curves 180 can correspond to more than one drilling dysfunction or to general dysfunctional drilling defined in at least one of TOB, WOB, and RPM. The term "drill bit dysfunction classification" is used herein to refer to a type or class of drill bit dysfunction or behavior (e.g., torsional vibration, stick-slip, normal drilling, etc.). The term "drill bit dysfunction" is used herein to refer to a member or instance of a drill bit dysfunction class (e.g., high frequency torsional oscillation, cutting-induced stick-slip, noise, etc.). Each of the behavior curves 180 can be defined by a function—where a function can be a mathematical relationship or other description for the shape of the curve. The behavior curves 180 can also optionally include variance or confidence interval information or distribution shapes.

The behavior detector 170 compares each of the related measurement sets 160 to the behavior curves 180 that correspond to the same measurement combination. The fit between the related measurements sets 160 and one of the behavior curves 180 can be determined spatially, based on regression analysis, through the use set theory (e.g., determination of intersection or union), etc. The fit between one of the related measurements sets 160 and one of the behavior curves 180 can be exact—for example, if the one of the behavior curves 180 is an expansive two-dimensional shape. However, in most instances, the behavior detector 170 determines that one of the related measurements sets 160 fits one of the behavior curves 180 to within a threshold or margin of allowable deviation. The behavior curves 180 can be adjusted to fit one of the related measurements sets 160. For example, for a line of the behavior curves 180 a slope and y-intercept can be adjusted to generate the best fit to one of the related measurements sets 160. In such a case, the fit between the line and the one of the related measurements sets 160 can be determined based on the adjusted line.

In some cases, the behavior detector 170 can determine that one of the related measurements sets 160 fits more than one of behavior curves 180. In these cases, the behavior detector 170 can determine that the one of the related measurements sets 160 fits one of the predetermined behavior curves 180 that is most dysfunctional—i.e., the behavior detector 170 can be biased to report dysfunction over function. In some embodiments, the behavior detector 170 can determine that the one of the related measurements sets 160 fits one of the behavior curves 180 that is least dysfunctional (i.e., corresponds to normal drilling), such that the behavior detector 170 can be biased to report function over dysfunction to avoid false detection of drilling dysfunctions which required mitigation and can slow drilling. In some examples, the behavior detector 170 can be biased to report instances of destructive types of dysfunctions over less destructive types of dysfunctions. For example, cutting-induced stick-slip, high frequency torsional oscillation, and low frequency torsional oscillation are typically more destructive to the drill bit and/or BHA than stable motion (e.g., normal drilling), high noise regimes, and friction-induced stick-slip. Biasing reporting of damaging dysfunctional drilling may allow mitigation to prevent drill bit damage.

Alternatively, the behavior detector 170 can determine which of the behavior curves 180 best fits to the one of the related measurements sets 160. A best fit can be determined based on regression analysis, correlation coefficients, coefficients of determination (including $R^2$), or any other appropriate method. In some embodiments, a best fit can be determined based on limitations or thresholds for one or more parameters of the one of the behavior curves 180. For example, one of the related measurements sets 160 can be fit to one of the behavior curves 180 represented by a straight line, where the slope, y-intercept, etc. of the straight line of the behavior curves 180 are adjusted to create the best fit of the straight line and the one of the related measurements sets 160. The behavior detector 170 can determine both the best fit of the one of the related measurements sets 160 and a straight line (where the slope and y-intercept are determined) and whether the best fit straight line or another of the behavior curves 180 is an overall best fit. Each of the behavior curves 180 may be adjusted to best fit the related measurements sets 160—including closed loops and three-dimensional curves.

At stage C, the behavior detector 170 communicates the compact encoding/array of detected torsional behaviors. The positions within the compact array are predefined to represent each detectable torsional behavior at a specified position in the array. FIG. 1 depicts 3 types of torsional behaviors that can be detected. Therefore, the compact encoding would be a 3-bit sequence/array with each bit set to indicate that the corresponding torsional behavior was detected or not detected based on the evaluation of measurements. The behavior detector 170 communicates the compact torsional behavior array to a surface device 190 (e.g., a device monitored by an operator or other drilling controller) via mud pulse telemetry, optical fiber, electromagnetic transmission, electrical signals, etc. The amount of information communicated can vary based on the mode of communication, as some methods allow larger bandwidth data transfer than other methods. The communication can comprise or trigger a transmission to a user or user software, a notification on a user interface or to one or more controller or controlling software, a warning, an alarm, etc.

At stage D, the surface device 190 (e.g., a process running on the surface device 190) determines a drill bit dysfunction based on the communicated torsional behaviors array. The surface device 190 evaluates the compact torsional behaviors array to determine a drill bit dysfunction. After identification of the drill bit dysfunction, the surface device 190 or another device in communication with the surface device 190 can mitigate the dysfunction.

Figure 2:
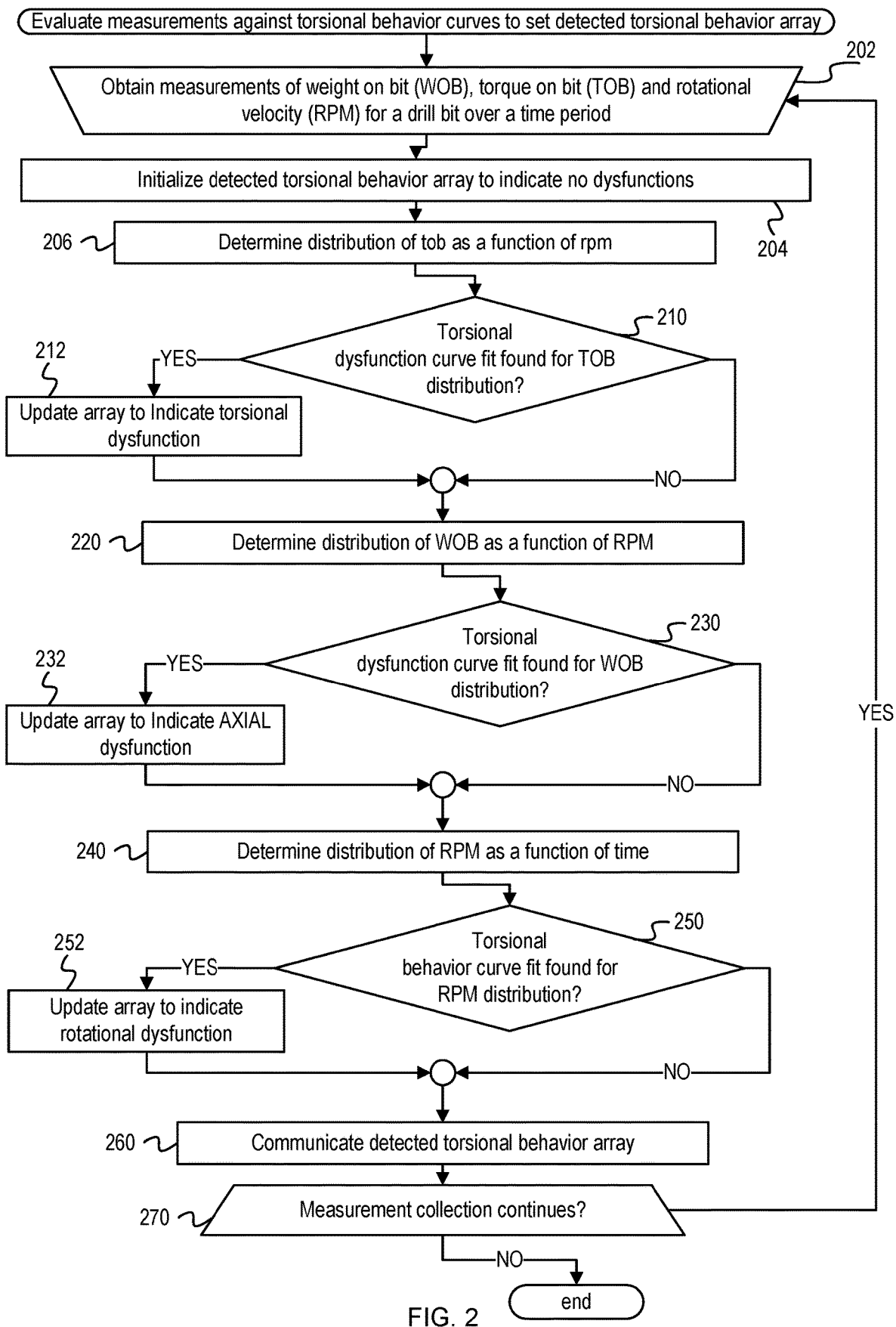
FIG. 2 depicts a flowchart of example operations for evaluating measurements against torsional behavior curves to set a compact torsional behavior array.

FIG. 2 depicts a flowchart of example operations for evaluating measurements against torsional behavior curves to set a compact torsional behavior array. The flowchart contains example operations described with reference to a behavior detector for consistency with earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 202, the behavior detector obtains measurements of weight on bit (WOB), torque on bit (TOB), and rotational velocity (RPM) for a drill bit over a time period. The behavior detector obtains the TOB, WOB, and RPM measurements collected over a time period, where the same time period or substantially the same time period (for example, to within measurement limits) is used for collection of TOB, WOB, and RPM measurements—i.e., TOB, WOB, and RPM measurements occur synchronously or substantially synchronously. TOB, WOB, and RPM measurements can occur at a constant rate (for example, a rate of 100 measurements per sec) or a variable rate (for example, dependent on other drilling parameters like RPM). In some instances, data collection can occur at different rates for one or more of TOB, WOB, and RPM. TOB, WOB, and RPM measurements can be collected as vectors (e.g., as pairs of measurement and time collected) or other multi-dimensional quantities, or as numerical values and otherwise associated with a time of measurement or order of measurement within a data set.

Time periods can be of a constant duration such as 5 seconds (sec), 10 sec, 100 sec, 500 sec, etc., can be of variable length (for example, dependent on other drilling parameters like RPM), can be a rolling window, etc. Time periods can also be of a constant number of measurements, such as a certain number of data points, a constant data collection or storage size (e.g., a table size) or contain a variable number or measurements or size of data. Time periods can be sequential and without significant gaps, such that for all or substantially all times, TOB, WOB, and RPM measurements are collected and analyzed. Data collection can also occur at intervals, where for some time periods TOB, WOB, and RPM measurements are collected and analyzed and for some time periods TOB, WOB, and RPM measurements are not collected or are collected but are not analyzed. For example, TOB, WOB, and RPM measurements can be collected and analyzed in representative time periods, such as collected and analyzed over a 10 sec data collection window which can re-occur once a minute during drilling. Data analysis can occur in real time, or TOB, WOB, and RPM measurements from historical or previously collected data can be analyzed.

TOB, WOB, and RPM measurements can be collected by any appropriate sensors and stored in any appropriate data storage, such as those described in reference to the embedded force measurement device of FIG. 1. The TOB, WOB, and RPM measurements can be measured in any appropriate units, such as English units of foot-pound force (ft-lb) and pounds (lb), SI units of Joules (J) and newtons (N), CGS units of ergs and dynes, etc.

At block 204, the behavior detector initializes a compact torsional behavior array to indicate no dysfunctions. Each position within the array is predefined as representing one of a set of detectable torsional behaviors. For example, an array of 3 elements can represent torsional dysfunction, axial dysfunction, and rotational dysfunction. Assuming the array is ARRAY[ ]: ARRAY[0] can be defined as indicating whether or not torsional dysfunction is detected; ARRAY[1] can be defined as indicating whether or not axial dysfunction is detected; and ARRAY[2] can be defined as indicating whether or not rotational dysfunction is detected. Embodiments can allocate additional elements to convey additional information (e.g., a flag or indicator of confidence or intensity for a detected dysfunction). The amount of information to encode will depend upon preferences and communication constraints.

At block 206, the behavior detector determines a distribution of TOB as a function of RPM. The behavior detector associates obtained TOB measurements with corresponding RPM measurements. The behavior detector can perform the association based on time values, such each TOB measurement is associated with an RPM measurement obtained at the same time. The behavior detector can perform the association based on the order of TOB and RPM measurements within the time period or set. In cases where TOB and RPM measurements are acquired at different rates or in different numbers, the behavior detector can selectively discard measurements in one variable (i.e., TOB or RPM) without a corresponding measurement in the other variable. The distribution can be plotted spatially or analyzed without plotting based on data points.

At block 210, the behavior detector determines if a torsional dysfunction curve fit is found for the TOB distribution. The behavior detector can determine if the relationship between TOB and RPM indicates a velocity weakening effect or other dysfunctional effect. The velocity weakening effect is an effect observed during stick-slip drilling dysfunctions in which the TOB (or WOB) applied by the drill bit decreases as RPM increases. Various types of dysfunctions are associated with this and other effects which affect distributions of TOB (or WOB) as a function of RPM. The behavior detector determines if the relationship between TOB and RPM is dysfunctional by curve, line, or other shape or function fitting between the TOB-and-RPM distribution. Once the behavior detector determines a best fit function for the TOB-and-RPM distribution, the behavior detector determines if the best fit function corresponds to a torsional dysfunction or not.

Torsional dysfunction can be indicated by a negative slope in a line fit to the TOB-and-RPM data points. Low frequency 3D torsional oscillation, low frequency torsional vibration, and high frequency torsional vibration dysfunctions all exhibit a negative slope in the relationship between TOB-and-RPM. Torsional dysfunction can be indicated by a negative slope for a major axis of an ellipse fit to the TOB-and-RPM data points—for example, in the case of high frequency torsional oscillation. Torsional dysfunction can be indicated by downward opening parabola for a quadratic polynomial (or quasi-triangular) fit the TOB-and-RPM data point, where such behavior can correspond to cutting-induced stick-slip or drillpipe-induced stick-slip. Torsional dysfunction indications will be discussed in more detail in reference to FIGS. 4-12. If torsional dysfunction is indicated, flow continues to block 212.

Absence of torsional dysfunction can be indicated by a flat or zero slope fit to the TOB-and-RPM data points. In some embodiments, the behavior detector can determine that the TOB-and-RPM distribution corresponds to functional or normal drilling. Alternatively, the behavior detector can determine whether or not torsional dysfunction is indicated by the distribution. If torsional dysfunction is not indicated, flow continues to block 220.

At block 212, the behavior detector updates the array to indicate torsional dysfunction. For instance, the behavior detector sets the element within the array corresponding to torsional dysfunction to 1.

At block 220, the behavior detector determines a distribution of WOB as a function of RPM. The behavior detector associates obtained WOB measurements with corresponding RPM measurements using any appropriate method, including those described with reference to block 206.

At block 230, the behavior detector determines if a torsional dysfunction curve fit is found for the WOB distribution. The behavior detector can determine if the relationship between WOB and RPM indicates a velocity weakening effect or other dysfunctional effect. The behavior detector determines if the relationship between WOB and RPM is dysfunctional by curve, line, or other shape or function fitting between the WOB-and-RPM distribution. Once the behavior detector determines a best fit function for the WOB-and-RPM distribution, the behavior detector determines if the best fit function corresponds to a torsional dysfunction or not.

Axial dysfunction can be indicated by a negative slope in a line fit to the WOB-and-RPM data points. Low frequency 3D torsional oscillation and low frequency torsional vibration dysfunctions all exhibit a negative slope in the relationship between WOB-and-RPM. Axial dysfunction can be indicated by a circular distribution of the WOB-and-RPM data points—for example, in the case of high frequency torsional vibration. Stick-slip dysfunctions (which may not be strictly axial dysfunctions) can be indicated by a distribution of WOB-and-RPM data points which is distributed heavily about a zero or minimum RPM. Axial dysfunction indications will be discussed in more detail in reference to FIGS. 4-12. If axial dysfunction is indicated, flow continues to block 232.

Absence of axial dysfunction can be indicated by a flat or zero slope fit to the WOB-and-RPM data points. Stick-slip dysfunctions can display both a flat or zero slope in addition to heavy distribution of points near a zero or minimum RPM. In some embodiments, the behavior detector can determine that the WOB-and-RPM distribution corresponds to functional or normal drilling. Alternatively, the behavior detector can determine whether or not axial dysfunction is indicated by the distribution. In some embodiments, stick-slip dysfunctions can be classified as axial dysfunctions. In some embodiments, stick-slip dysfunctions can be classified as lacking axial dysfunction. If axial dysfunction is not indicated, flow continues to block 240.

At block 232, the behavior detector updates the array to indicate axial dysfunction. For instance, the behavior detector sets the element within the array corresponding to axial dysfunction to 1.

At block 240, the behavior detector determines a distribution of RPM as a function of time. The behavior detector can obtain RPM measurements as a function of time or otherwise associate RPM measurements with corresponding time measurements or time orders using any appropriate method, such as those described in reference to block 206. The distribution of RPM as a function of time can be the value of RPM as a function of time. In some embodiments, the behavior detector can determine the RPM measurement distribution without time data. For example, distribution of RPM measurement values can be determined where the time order is discarded or ignored (e.g., a histogram or other probability or density estimate).

At block 250, the behavior detector determines if a torsional dysfunction curve fit is found for the RPM distribution. The behavior detector can determine if the relationship between RPM and time (or the distribution of RPM alone) indicates a dysfunctional effect, such as stick-slip. The behavior detector determines if the relationship between RPM and time is dysfunctional by curve, line, or other shape or function fitting of the RPM distribution. Once the behavior detector determines a best fit function for the RPM distribution, the behavior detector determines if the best fit function corresponds to a rotational dysfunction or not.

Rotational dysfunction (such as stick-slip) can be indicated by an uneven or multi-modal distribution of RPM values. Stick-slip comprises stick phases in which the drill bit, drillpipe, or other rotating drilling apparatus is stuck or immobile and slip phases in which the drill bit, drillpipe, or other rotating drilling apparatus rotates while sliding or slipping past an obstruction or friction face. Stick and slip phases can appear as dual distributions of RPM values—where one distribution is centered near a minimum or zero RPM representing stick phases and one distribution is centered near a non-zero average or modal RPM presenting slip phases. Cutting-induced stick-slip and friction-induced stick slip exhibit characteristic RPM values of near zero during stick phases. In such cases, the RPM distribution is unequal or bimodal, with RPM values clustered near zero and (optionally) about a maximum or average RPM, where the average RPM represents average rotational velocity of the drill bit during slip phases. Drillpipe-induced stick-slip is indicated by characteristic RPM values about a minimum RPM during stick phases and about a maximum RPM during slip phases. Drillpipe-induced stick-slip at the drill bit can be caused by stick-slip occurring elsewhere along the drillpipe—i.e., classic stick-slip with near zero RPM during stick phases. During drillpipe-induced stick-slip, the RPM distribution can be unequal with the RPM values clustered about a minimum but nonzero RPM which represents the RPM of the quasi-stick phase. Uneven ranges can be detected based on RPM distribution—e.g., bimodal or multimodal—or based on a standard deviation value (such as a threshold for dividing large and normal values of standard deviation) or range values (such as a threshold for identifying when the RPM range is large or normal).

In some embodiments, coupled vibrations are classified as rotational dysfunctions. Coupled vibrations, which occur along two or more axis of movement of the drill bit and at the same or substantially the same frequency along each of the coupled axes, include high frequency 3D torsional oscillations and low frequency 3D torsional oscillations. Coupled vibrations exhibit characteristic frequency patterns in RPM as a function of time. Based on RPM-and-time data, the behavior detector can identify coupled vibrations and determine if the coupled vibrations correspond to high frequency 3D torsional oscillations or low frequency 3D torsional oscillations. A frequency transform, such as a Fourier transform, can be used to determine if the RPM data displays a characteristic frequency and if that frequency is high frequency (for example, greater than or equal to 5 hertz (Hz)) or low frequency (for example, less than 5 Hz).

In some embodiments, torsional vibrations (e.g., high frequency torsional vibrations and low frequency torsional vibrations) are classified as rotational dysfunctions. Torsional vibrations occur along the torsional axis and can be a subset of coupled vibrations. Torsional vibrations exhibit a characteristic frequency in RPM as a function of time. Torsional vibrations typically exhibit variations in RPM of a smaller magnitude than those displayed during coupled vibrations. For example, coupled vibrations can exhibit an RPM variation or bandwidth of 300 rev/min where RPM bandwidth is the difference between a maximum RPM and minimum RPM over a time period. In the same example, torsional vibrations may exhibit an RPM bandwidth of 100 to 150 rev/min. This is only an example and bandwidth range can change based on drilling and drill bit parameters. Alternatively, the behavior detector can distinguish between coupled vibrations and torsional vibrations based on an additional parameter or measurement, such as axial displacement. Coupled vibrations, which occur across multiple axis, are characterized by vibrations occurring at a dominant frequency in both axial and rotational measurements, while torsional vibrations display weaker coupling across axes. Rotational dysfunction indications will be discussed in more detail in reference to FIGS. 4-12. If rotational dysfunction is indicated, flow continues to block 252.

Absence of rotational dysfunction can be indicated by absence of stick phases or characteristic RPM value clusters. In some embodiments, the behavior detector can determine that the RPM distribution corresponds to functional or normal drilling. Alternatively, the behavior detector can determine whether or not rotational dysfunction is indicated by the distribution. In some embodiments, coupled vibrations and/or torsional vibrations can be classified as rotational dysfunctions. In some embodiments, coupled vibrations and/or torsional vibrations can be classified as lacking rotational dysfunctions. If rotational dysfunction is not indicated, flow continues to block 260.

At block 252, the behavior detector indicates rotational dysfunction. For instance, the behavior detector sets the element within the array corresponding to rotational dysfunction to 1.

At block 260, the behavior detector communicates the compact torsional behavior array. The behavior detector passes the compact torsional behavior array which contains any indications of torsional, axial, and rotational dysfunctions (as described in block 212, 232, and 252, respectively) to a communication program or device responsible for transmitting information from downhole. Since the communication method is likely being employed to communicate other information, the compact torsional behavior array is communicated according to a defined protocol. As an example, the torsional behavior array may be delimited by a reserved sequence of bits to signal to a recipient that a torsional behavior array is being transmitted. As another example, an interval may be reserved for communicating a torsional behavior array.

At block 270, the behavior detector determines if measurement collection continues. If measurement collection continues, i.e., if the behavior detector obtains additional measurements for another time period, flow continues to block 202 where the measurements of the next time period are analyzed.

Figure 3A:
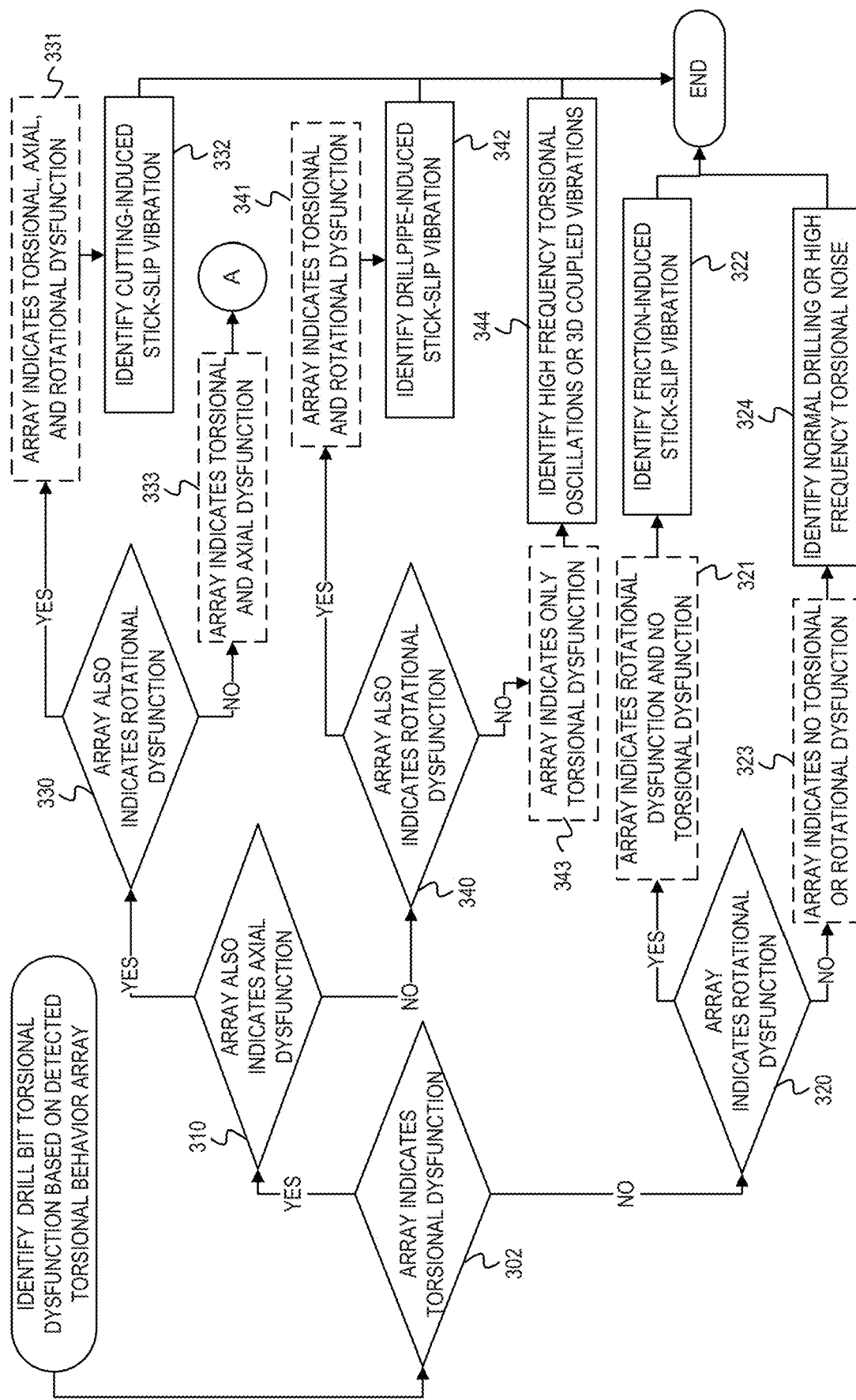
FIGS. 3A, 3B, 3C, and 3D depict flowcharts of example operations for identifying drill bit torsional dysfunction based on a compact torsional behavior array.

FIGS. 3A, 3B, 3C, and 3D depict flowcharts of example operations for identifying drill bit torsional dysfunction based on a compact torsional behavior array. FIG. 3A depicts decision nodes for a decision tree or algorithm for identifying drill bit behavior. FIG. 3A continues from transition point A to transition point A1 of FIG. 3B, transition point A2 of FIG. 3C, or transition point A3 of FIG. 3D in some cases. Together with FIG. 3A, FIGS. 3B, 3C and 3D represent example alternative embodiments for algorithms for identifying some drill bit dysfunctions. FIGS. 3A-3D contain example operations described with reference to a behavior detector and a dysfunction identifier for consistency with earlier figures.

The dysfunction identifier optionally identifies the drill bit behavior type based on the indicated dysfunction(s). The dysfunction identifier can identify drill bit functional behavior or drill bit dysfunction (i.e., identify normal drilling or identify a type of dysfunctional drilling). In some embodiments, the dysfunction identifier can identify one or more class or family of dysfunction—such as destructive versus less harmful dysfunctions, for example. The dysfunction identifier can operate on the indicated dysfunctions of the compact torsional behavior array (i.e., at least one of torsional, axial, and rotational) to identify one or more drill bit behavior type.

In some embodiments, the compact torsional behavior array is a set of binary bits, and the dysfunction identifier can identify the drill bit behavior type via a decision tree or programming algorithm. The indicated dysfunctions can be communicated as a binary string, such as 1-0-1 which may correspond to an indication that torsional dysfunction is indicated, axial dysfunction is not indicate, and rotational dysfunction is indicated. Based on the detection torsional behavior array, the dysfunction identifier determines one or more drill bit behavior type which corresponds to the indicated types of dysfunctions. The dysfunction identifier can indicate or communicate the identified drill bit behavior type to a controller or operator. Optionally, a drill bit dysfunction can be mitigated based on the communication of the identified drill bit behavior type.

In FIG. 3A, blocks 331, 333, 341, 343, 321, and 323 indicated drill bit dysfunction determined from the transmitted array and can be optional as blocks 302, 310, 320, 330, and 340 can directly lead to drill bit dysfunction identification. As examples, an implementation can read each field of the array and set a flag(s) accordingly to determine which torsional behavior(s) is indicated in the array. Another implementation can look up a torsional dysfunction in a table that maps possible patterns or values of the torsional behavior array to torsional dysfunctions. Blocks 332, 334, 341, 344, 322, and 324 indicate drill bit dysfunctions and represent output of the dysfunction identifier.

At block 302, the dysfunction identifier determines if the compact torsional behavior array indicates torsional dysfunction. If the compact torsional behavior array, or any other appropriate communication, indicates torsional dysfunction, flow continues to block 310. If the compact torsional behavior array does not indicate torsional dysfunction, flow continues to block 320.

At block 310, the dysfunction identifier determines if the compact torsional behavior array also indicates axial dysfunction. If the compact torsional behavior array indicates axial dysfunction, flow continues to block 330. If the compact torsional behavior array does not indicate axial dysfunction, flow continues to block 340.

At block 320, the dysfunction identifier determines if the compact torsional behavior array indicates rotational dysfunction. If the compact torsional behavior array indicates rotational dysfunction, flow continues to block 321. If the compact torsional behavior array does not indicate rotational dysfunction, flow continues to block 323. Optionally, the dysfunction identifier can also determine if the compact torsional behavior array indicates axial dysfunction. In some embodiments, when the dysfunction identifier determines that the compact torsional behavior array does not indicate torsional dysfunction, the dysfunction identifier does not determine if the array indicates axial dysfunction. In either case, the dysfunction identifier can disregard the determination of axial dysfunction for a number of reasons. Pure axial dysfunction is often transitory, degenerating to another identifiable dysfunction occurring across axes. Axial dysfunction in the absence of torsional and rotational dysfunction can correspond to bit bouncing, where a drill bit bounces up and down in the wellbore or bounces off the formation at the bottom of the wellbore. Bit bouncing often becomes a coupled dysfunction—such as three-dimensional coupled vibrations—as the bouncing (and resultant energy stored in the string constant of the drill string) causes excitation of coupled vibrational modes. Pure axial dysfunction can also degenerate into stick-slip, where drill bit rotation is impeded by collision with the formation at the bottom of the wellbore. Likewise, axial dysfunction and rotational dysfunction in the absence of torsional dysfunction collapse into other identifiable forms of dysfunction such as stick-slip and other coupled vibrations with distinctive torsional and rotational behaviors. In most cases, if no torsional dysfunction is present, no axial dysfunction is present—neither friction-induced stick-slip nor normal drilling or high frequency noise exhibit characteristic axial dysfunction.

At block 321, the dysfunction identifier determines that the array indicates rotational dysfunction and no torsional dysfunction. The dysfunction identifier may or may not determine that the array indicates axial dysfunction or no axial dysfunction.

At block 322, the dysfunction identifier identifies friction-induced stick-slip. The dysfunction identifier can communicate the identified drill bit behavior type— friction-induced stick-slip—to an operator or controller for mitigation of friction-induced stick-slip.

At block 323, the dysfunction identifier determines that the array indicates no torsional or rotational dysfunction. The dysfunction identifier may or may not determine that the array indicates axial dysfunction or no axial dysfunction.

At block 324, the dysfunction identifier identifies normal drilling or high frequency torsional noise. High frequency torsional noise can be a subset of normal drilling behavior and is typically less destructive to the drill bit and associated drill equipment such that mitigation is not required or recommended. The dysfunction identifier can communicate the identified drill bit behavior type—normal drilling behavior or high frequency torsional noise—to an operator or controller for continued drilling.

At block 330, the dysfunction identifier determines if the compact torsional behavior array also indicates rotational dysfunction. If the compact torsional behavior array indicates rotational dysfunction, flow continues to block 331. If the compact torsional behavior array does not indicate rotational dysfunction, flow continues to block 333.

At block 331, the dysfunction identifier determines that the array indicates torsional, axial, and rotational dysfunction.

At block 332, the dysfunction identifier identifies cutting-induced stick-slip. The dysfunction identifier can communicate the identified drill bit behavior type— cutting-induced stick-slip—to an operator or controller for mitigation of cutting-induced stick-slip.

At block 333, the dysfunction identifier determines that the array indicates torsional and axial dysfunction. From block 333, flow continues to transition point A relating to various embodiments described in FIGS. 3B, 3C, and 3D, each of which represents a different possible operational/ program flow from block 333 for various embodiments that indicate additional behavior information in the torsional behavior array.

At block 340, the dysfunction identifier determines if the compact torsional behavior array also indicates rotational dysfunction. If the compact torsional behavior array also indicates rotational dysfunction, flow continues to block 341. If the compact torsional behavior array does not indicate rotational dysfunction, flow continues to block 343.

At block 341, the dysfunction identifier determines that the array indicates torsional and rotational dysfunction.

At block 342, the dysfunction identifier identifies cutting-induced stick-slip. The dysfunction identifier can communicate the identified drill bit behavior type—cutting-induced stick-slip—to an operator or controller for mitigation of cutting-induced stick-slip.

At block 343, the dysfunction identifier determines that the array indicates only torsional dysfunction.

At block 344, the dysfunction identifier identifies high frequency torsional oscillations (HFTO) or high frequency 3D coupled oscillations. The dysfunction identifier can communicate the identified drill bit behavior type—HFTO or high frequency 3D coupled oscillations—to an operator or controller for mitigation.

Figure 3B:
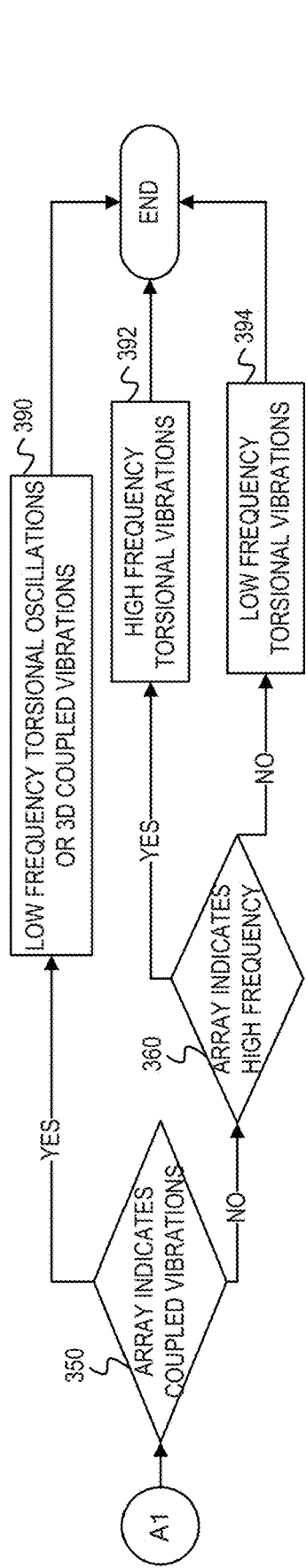
Figure 3C:
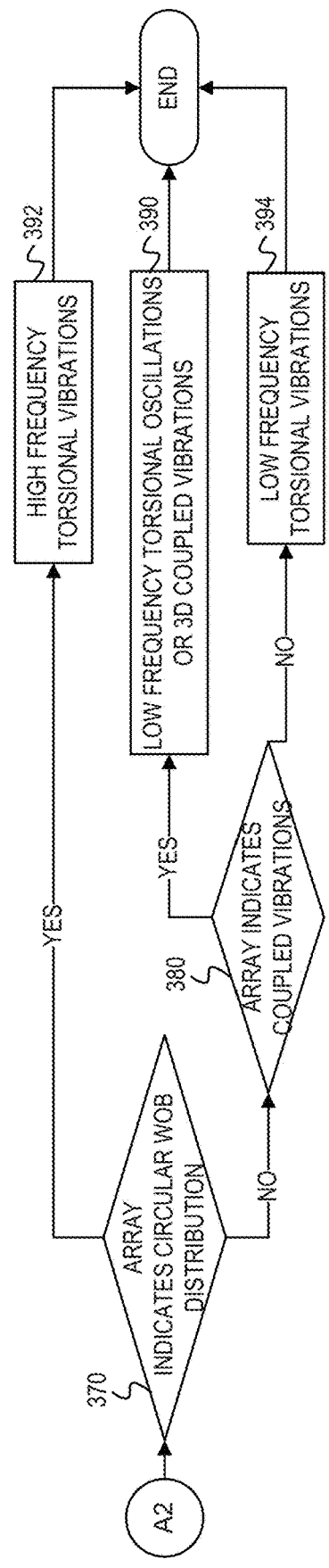
Figure 3D:
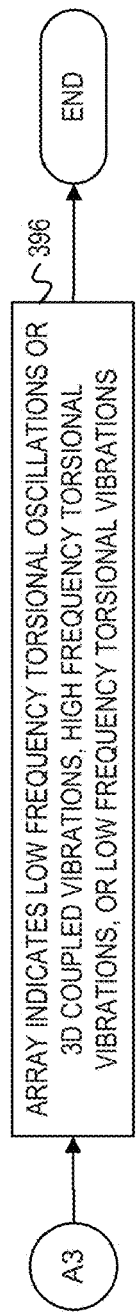

From transition point A, flow continues to transition point A1 of FIG. 3B, transition point A2 of FIG. 3C, or transition point A3 of FIG. 3D. Each of the three flowcharts (FIG. 3B, 3C, or 3D) represent different embodiments to identify drill bit dysfunctions corresponding to torsional and axial dysfunction without rotational dysfunction. The decision trees shown in FIG. 3A-3D are examples, and other decision trees or algorithms can be used. The dysfunction identifier can be programmed according to any of the embodiments represented by FIG. 3B, 3C or 3D. Optionally, the dysfunction identifier can be programmed to use two or more of the decision trees shown—for example using the algorithm represented by FIG. 3D if the array contains only information about torsional and axial dysfunction and by using the algorithm represented by FIG. 3B if the array contains information about the presence or absence of coupled vibrations and high frequency or low frequency vibrations.

In FIG. 3B, flow continues from transition point A1 to block 350. At block 350, the dysfunction identifier determines if the compact torsional behavior array indicates coupled vibrations. The compact torsional behavior array can contain information in addition to indications of torsional, axial, and rotational dysfunction. In some embodiments, the behavior detector can determine if the distribution of RPM together with another measure of movement indicate coupled vibrations across two or more axes. Additional measures of movement can include at least one of lateral displacement, lateral velocity, lateral acceleration, axial displacement, axial velocity, axial acceleration, bit bending moment, etc. The behavior detector can determine if the distribution of RPM indicates coupled vibration based on a transform, i.e., in frequency-space, or based on other characteristic movement. The behavior detector can determine if the distribution of RPM indicates coupled vibration by determining a best fit between the distribution of RPM as a function of time and a set of behavior curves for RPM data points. The behavior detector can further transmit information about coupled vibrations to a surface device within the compact torsional behavior array, for example in additional or optional bits. In some embodiments, a characteristic frequency of the coupled vibrations could also be transmitted within the compact torsional behavior array. If the compact torsional behavior array indicates coupled vibrations, flow continues to block 390. If the compact torsional behavior array does not indicate coupled vibrations, flow continues to block 360.

At block 360, the dysfunction identifier determines if the compact torsional behavior array indicates high frequency vibrations. Optionally the compact torsional behavior array can contain information about vibrational frequency in addition to indications of torsional, axial, rotational, and coupled vibration dysfunctions. In some embodiments, the behavior detector can determine a dominant frequency based on the distribution of RPM in frequency-space (i.e., through use of a transform) or based on sinusoidal or other waveform fitting. The behavior detector can determine the dominant frequency of the distribution of RPM by determining a best fit between the distribution of RPM and a set of predetermined drill bit dysfunction characteristic frequency curves for RPM data points. The dominant frequency can be compared to a frequency threshold, such that the dysfunction identifier determines that dominant frequencies above the threshold correspond to high frequency vibrations and that dominant frequencies smaller than the threshold correspond to low frequency vibrations. The high frequency threshold need not be large—for example 5 Hz or a frequency threshold of similar order of magnitude (such as 1 Hz, 2 Hz, etc.) can be used. Alternatively, a wavelength, period, or other cyclic parameter can be used in place of frequency. The behavior detector can further transmit information about frequency of vibrations to a surface device within the compact torsional behavior array, for example in addition or optional bits. If the compact torsional behavior array indicates high frequency vibration, flow continues to block 392. If the compact torsional behavior array does not indicate high frequency vibration, flow continues to block 394.

At block 390, the dysfunction identifier identifies low frequency torsional oscillations (LFTO) or low frequency 3D coupled oscillations. The dysfunction identifier can communicate the identified drill bit behavior type—LFTO or low frequency 3D coupled oscillations—to an operator or controller for mitigation.

At block 392, the dysfunction identifier identifies high frequency torsional vibrations. The dysfunction identifier can communicate the identified drill bit behavior type—high frequency torsional vibrations—to an operator or controller for mitigation.

At block 394, the dysfunction identifier identifies low frequency torsional vibrations. The dysfunction identifier can communicate the identified drill bit behavior type—low frequency torsional vibrations—to an operator or controller for mitigation.

In FIG. 3C, alternatively, flow continues from transition point A2 to block 370. At block 370, the dysfunction identifier determines if the compact torsional behavior array indicates that the distribution of WOB is circular. Optionally, the compact torsional behavior array can contain information about shape of the WOB-and-RPM distribution, in addition to indications of axial dysfunction. In some embodiments, the behavior detector determines if the distribution of WOB is circular by determining a best fit between the distribution of WOB as a function of RPM and a set of circular predetermined behavior curves for WOB-and-RPM data points (e.g., two dimensional circular shapes). Alternatively, the behavior detector can determine whether the distribution of WOB is circular using any appropriate method, including those described in reference to block 230 of FIG. 2. If the compact torsional behavior array indicates that the distribution of WOB is circular, flow continues to block 392. If the compact torsional behavior array does not indicate that the distribution of WOB is circular, flow continues to block 380.

At block 392, the dysfunction identifier identifies high frequency torsional vibrations, as previously described in reference to block 392 of FIG. 3B.

At block 380, the dysfunction identifier determines if the compact torsional behavior array indicates that the distribution of RPM indicates coupled vibrations. The dysfunction identifier can determine if the compact torsional behavior array indicates coupled vibrations using any appropriate method, such as those described in relationship to block 350 of FIG. 3B. If the distribution of RPM indicates coupled vibrations, flow continues to block 390. If the distribution of RPM does not indicate coupled vibrations, flow continues to block 394.

At block 390, the dysfunction identifier identifies LFTO or low frequency 3D coupled oscillations, as previously described in reference to block 390 of FIG. 3B.

At block 394, the dysfunction identifier identifies low frequency torsional vibrations, as previously described in refence to block 394 of FIG. 3B.

In FIG. 3D, alternatively, flow continues from transition point A3 to block 396. At block 396, the dysfunction identifier determines that the array indicates low frequency torsional oscillations (LFTO) or 3D coupled vibrations; high frequency torsional vibrations; or low frequency torsional vibrations. The dysfunction identifier can communicate the identified drill bit behavior types to an operator or controller for mitigation. These drill bit dysfunctions can be considered a single class or drill bit dysfunction classification and mitigated together without further information to distinguish between individual drill bit dysfunctions. Both high frequency torsional oscillation and low frequency torsional oscillation are among the more destructive types of drill bit dysfunctions which can cause greatest drill bit damage (along with cutting-induced stick-slip).

Figure 4A:
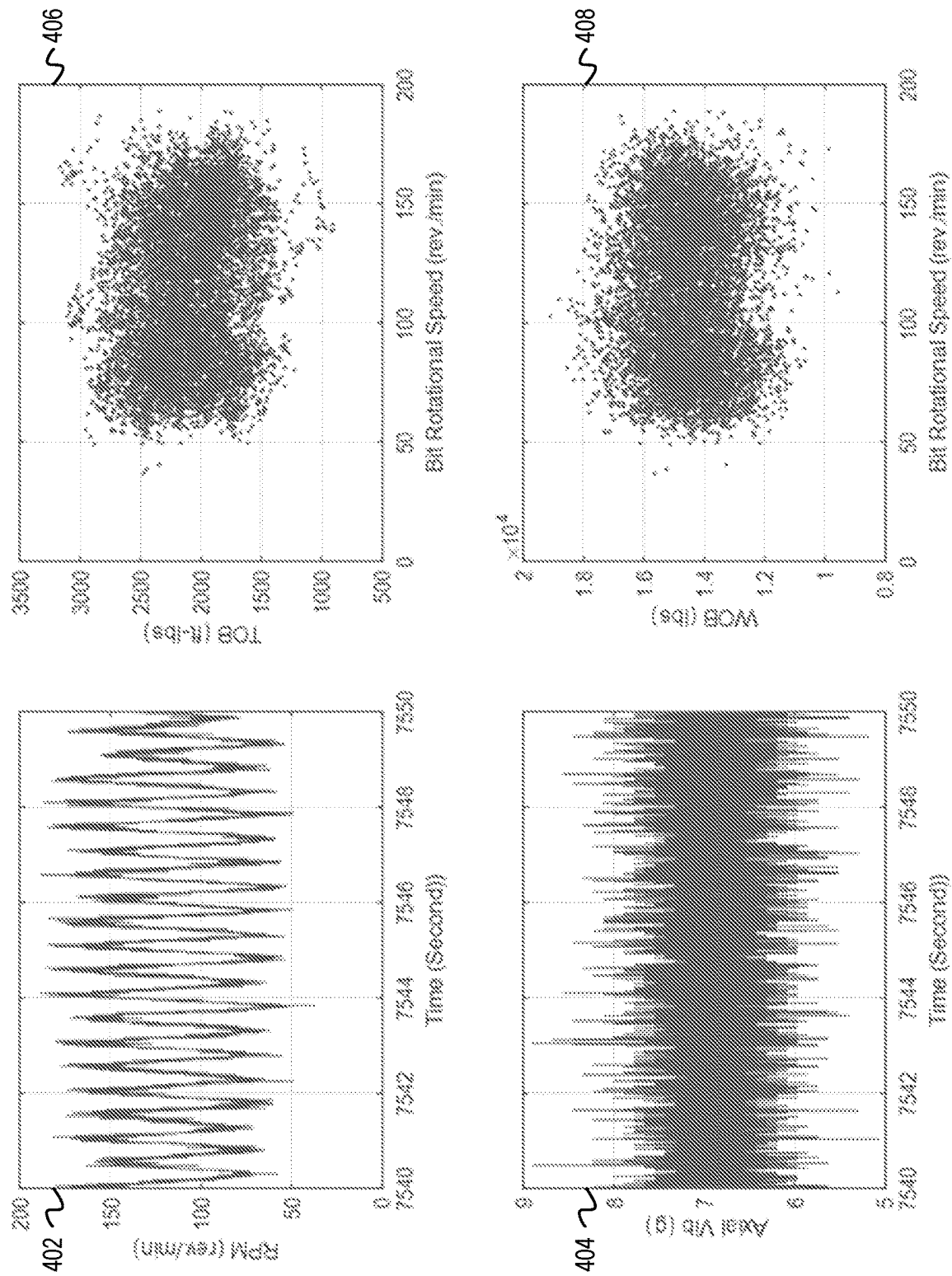
FIGS. 4A-4B depict graphs corresponding to two example instances of normal drilling behavior.
Figure 4B:
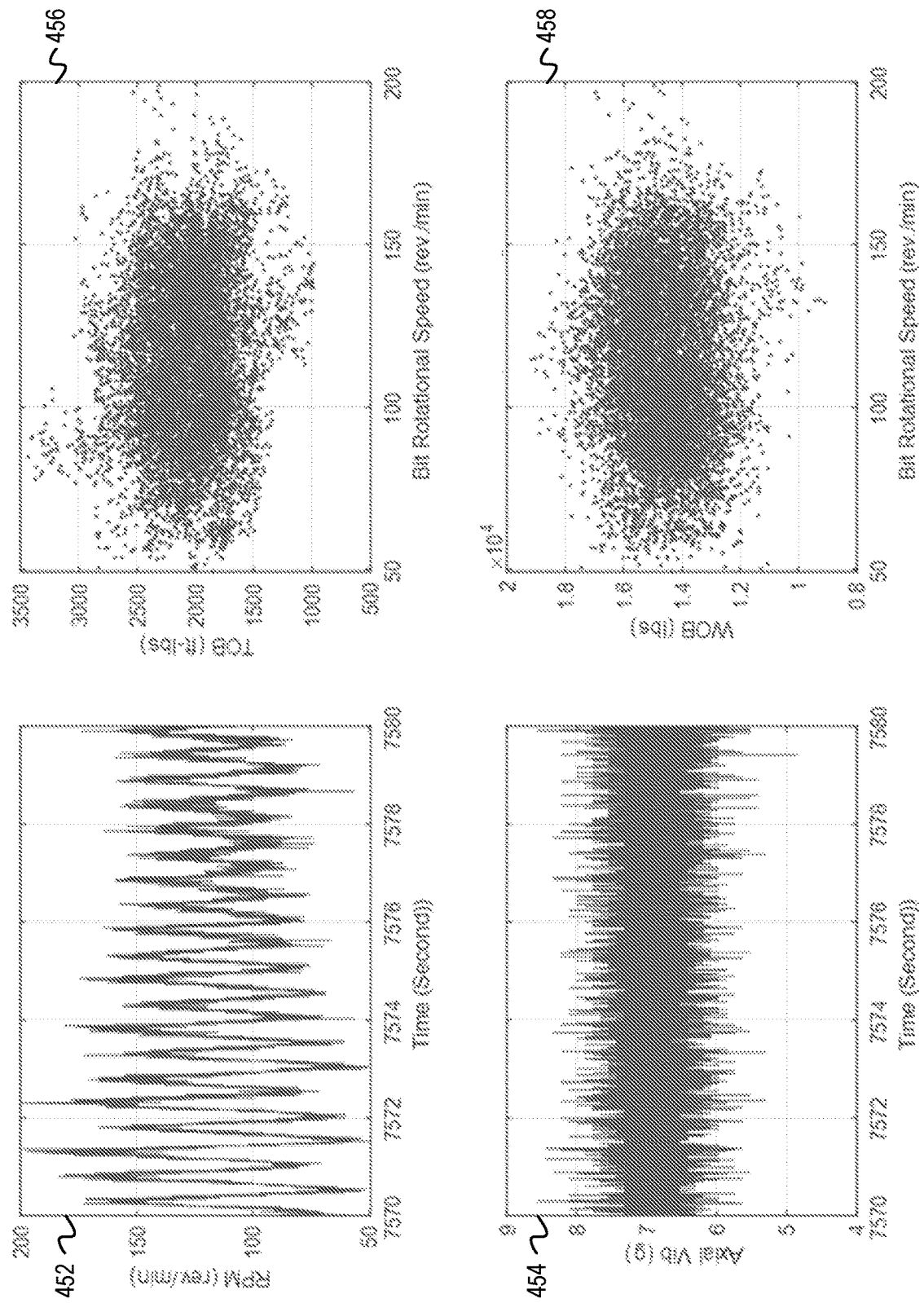

FIGS. 4A-4B depict graphs corresponding to two example instances of normal drilling behavior. FIG. 4A includes graph 402 depicting RPM in rev/min as a function of time in sec for a 10 sec interval. The graph 402 displays a maximum RPM of approximately 190 rev/min and a minimum RPM of approximately 40 rev/min. RPM exhibits a periodicity with approximately 20 maximums over the time period shown for a period of approximately 0.5 sec. FIG. 4A also includes graph 404, which depicts axial vibration in units of the gravitational acceleration constant (g) as a function of time for the same 10 sec interval shown in the graph 402. The graph 404 displays a maximum axial vibration of approximately 9 g and a minimum axial vibration of approximately 5 g. The axial vibration does not exhibit periodicity visible on the scale of the graph 404. FIG. 4A further includes graph 406 depicting TOB in ft-lbs as a function of RPM in rev/min and graph 408 depicting WOB in lbs as a function of RPM in rev/min for the same 10 sec interval shown in the graphs 402 and 404. The graphs 406 displays TOB clustered between 1000 and 3000 ft-lbs and 50 and 190 rev/min. The distribution of points within the rectangle bounded by the maximum and minimum TOB and RPM (i.e., rev/min) values is relatively even with sparser data points near the outer edges of the rectangle. The graph 408 displays WOB clustered between 10,000 and 20,000 lbs and 50 to 190 rev/min. The distribution of points within the rectangle bounded by the maximum and minimum WOB and RPM values is again relatively even, with sparser points near and outside the outer edges of the rectangle. No velocity weakening effect is observed in the graphs 406 and 408, nor any other trend in TOB and WOB values as a function of RPM.

FIG. 4B includes graph 452 depicting RPM in rev/min as a function of time in sec for a 10 sec interval. The graph 452 displays a maximum RPM of approximately 200 rev/min and a minimum RPM of approximately 50 rev/min. RPM exhibits a periodicity with approximately 20 maximums over the time period shown, with variable amplitude. FIG. 4B also includes graph 454 depicting axial vibration in g as a function of time for the same 10 sec interval shown in the graph 452. The graph 454 displays a maximum axial vibration of approximately 8.5 g and a minimum axial vibration of approximately 5 g. The axial vibration does not exhibit periodicity visible on the scale of the graph 454. FIG. 4B further includes graph 456 depicting TOB in ft-lbs as a function of RPM in rev/min and graph 458 depicting WOB in lbs as a function of RPM in rev/min for the same 10 sec interval shown in the graphs 452 and 454. The graphs 456 displays TOB clustered between 1000 and 3500 ft-lbs and 50 and 200 rev/min. The distribution of points within a rectangle bounded by 1500 and 3000 ft-lbs and 50 and 175 rev/min is relatively even with sparser data points near the minimum and maximum values of TOB and RPM. The graph 458 displays WOB clustered between 10,000 and 19,500 lbs and 50 to 200 rev/min. The distribution of points within the rectangle bounded by 11,000 and 17,000 lbs and between 50 and 175 rev/min is again relatively even, with sparser points outside the outer edges of the rectangle and near the minimum and maximum WOB and RPM values. No velocity weakening effect is observed in the graphs 456 and 458, nor any other trend in TOB and WOB values as a function of RPM. It is possible that the distribution of points displays with two or more different dispersion distributions, but all distributions appear to center on the same area.

Figure 5A:
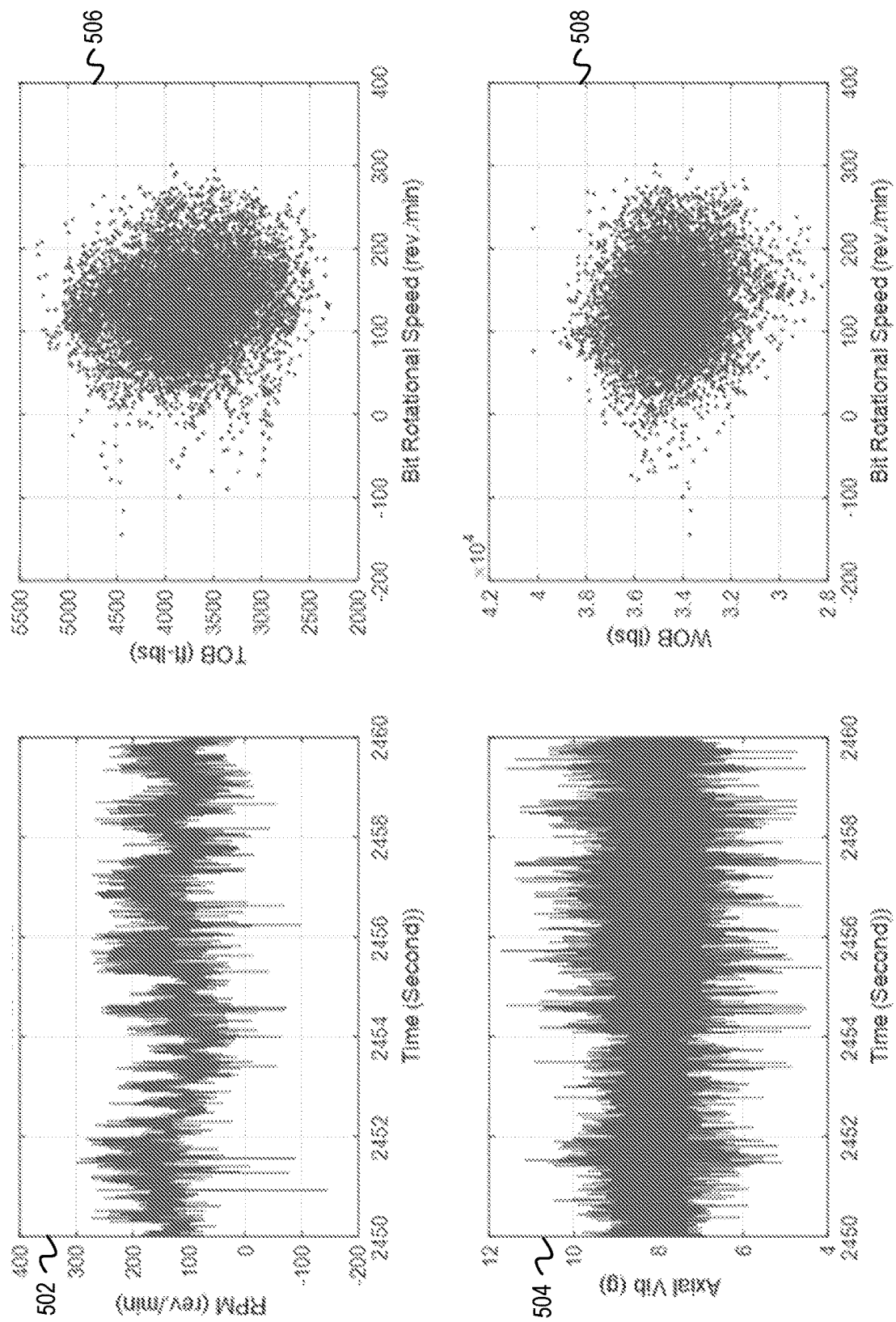
FIGS. 5A-5B depict graphs corresponding to two example instances of high frequency torsional noise.
Figure 5B:
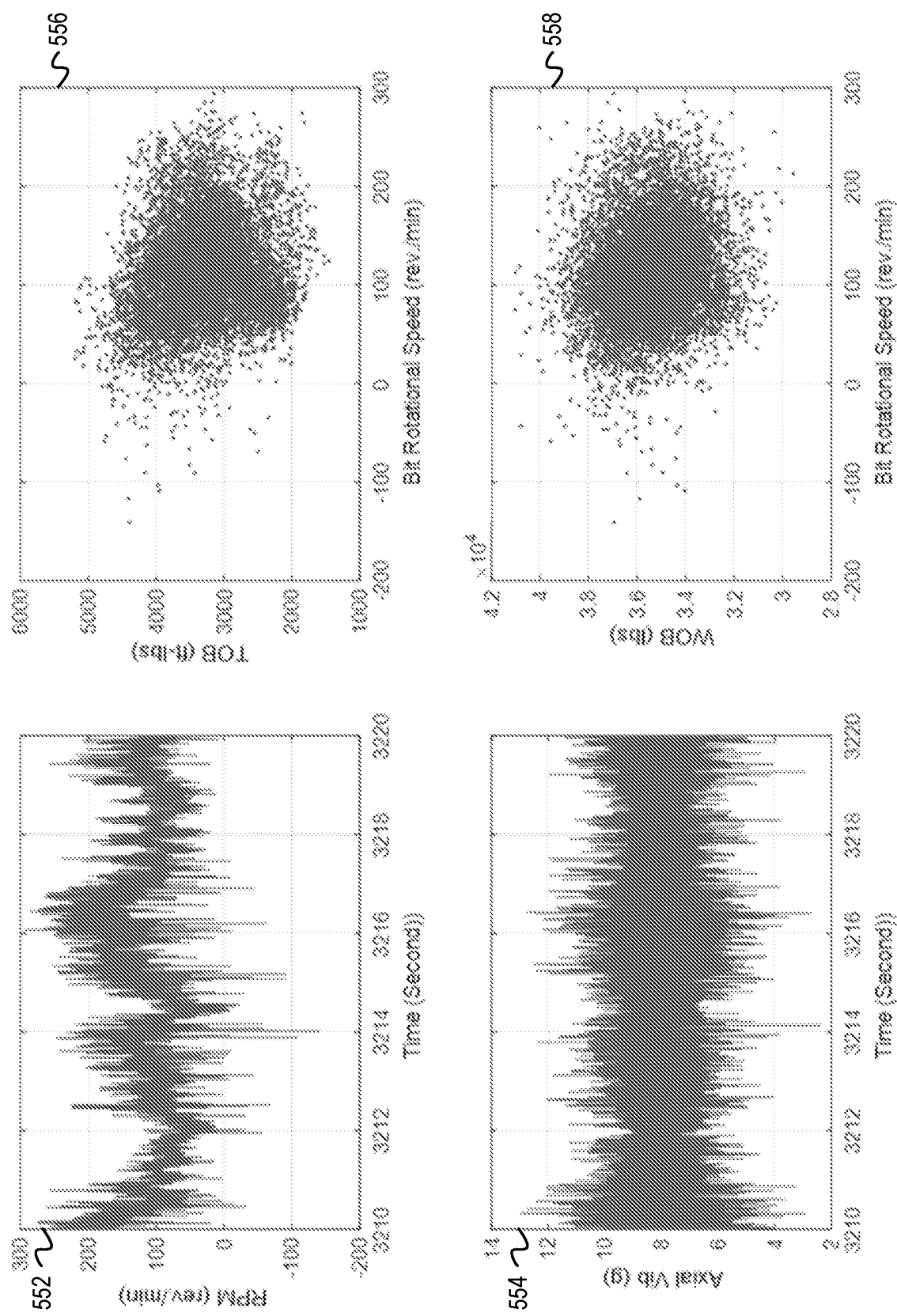

FIGS. 5A-5B depict graphs corresponding to two example instances of high frequency torsional noise. FIG. 5A includes graph 502 depicting RPM in rev/min as a function of time in sec for a 10 sec interval. The graph 502 displays a maximum RPM of approximately 300 rev/min and a minimum RPM of approximately −150 rev/min, where most of the RPM values are greater than zero. The RPM values exhibit some periodicity with variable periods— shorter periods are evident between 2452 and 2454 sec with longer periods evident between 2456 and 2460 sec. The predominant RPM feature is noise, where RPM values are highly variable between 300 and 0 rev/min. FIG. 5A also includes graph 504, which depicts axial vibration in g as a function of time for the same 10 sec interval shown in the graph 502. The graph 504 displays a maximum axial vibration of approximately 11 g and a minimum axial vibration of approximately 4 g. The axial vibration does not exhibit periodicity visible on the scale of the graph 504. FIG. 5A further includes graph 506 depicting TOB in ft-lbs as a function of RPM in rev/min and graph 508 depicting WOB in lbs as a function of RPM in rev/min for the same 10 sec interval shown in the graphs 502 and 504. The graphs 506 displays TOB clustered between 2500 and 5000 ft-lbs and 0 and 300 rev/min. The distribution of points is bound by an oval centered on 150 rev/min and 3750 ft-lbs, with sparsely distributed outlying points. The graph 508 displays WOB clustered between 28,000 and 39,000 lbs and 0 to 300 rev/min. The distribution of points is bound by a circle centered on 150 rev/min and 35,000 lbs, with sparsely distributed outliers. No velocity weakening effect is observed in the graphs 506 and 508, nor any other trend in TOB and WOB values as a function of RPM. It is possible that there is a relationship relating TOB (and WOB values) and RPM values which causes closer grouping of TOB (or WOB) values, but such a relationship appears to be distributed around an average or median value and is symmetrical.

FIG. 5B includes graph 552 depicting RPM in rev/min as a function of time in sec for a 10 sec interval. The graph 552 displays a maximum RPM of approximately 300 rev/min and a minimum RPM of approximately −100 rev/min, where most of the RPM values are greater than zero. The RPM values negligible periodicity with on the time scale of the graph 552. The predominant RPM feature is noise, where RPM values are highly variable between 300 and 0 rev/min. FIG. 5B also includes graph 554, which depicts axial vibration in g as a function of time for the same 10 sec interval shown in the graph 552. The graph 554 displays a maximum axial vibration of approximately 13 g and a minimum axial vibration of approximately 3 g. The axial vibration does not exhibit periodicity visible on the scale of the graph 554. FIG. 5B further includes graph 556 depicting TOB in ft-lbs as a function of RPM in rev/min and graph 558 depicting WOB in lbs as a function of RPM in rev/min for the same 10 sec interval shown in the graphs 552 and 554. The graphs 556 displays TOB clustered between 2000 and 5000 ft-lbs and 0 and 300 rev/min. The distribution of points is centered on approximately 100 rev/min and 3000 ft-lbs, with sparsely distributed outlying points. The distribution is compact, but not distinctively elliptical or round. The graph 558 displays WOB clustered between 30,000 and 50,000 lbs and 0 to 300 rev/min. The distribution of points is bound by a circle centered on 150 rev/min and 35,000 lbs, with sparsely distributed outliers. No velocity weakening effect is observed in the graphs 556 and 558, nor any other trend in TOB and WOB values as a function of RPM. It is possible that there is a relationship relating TOB (and WOB values) and RPM values as described in FIG. 5A, but any such relationship appears to be distributed around the average or median values.

Figure 6A:
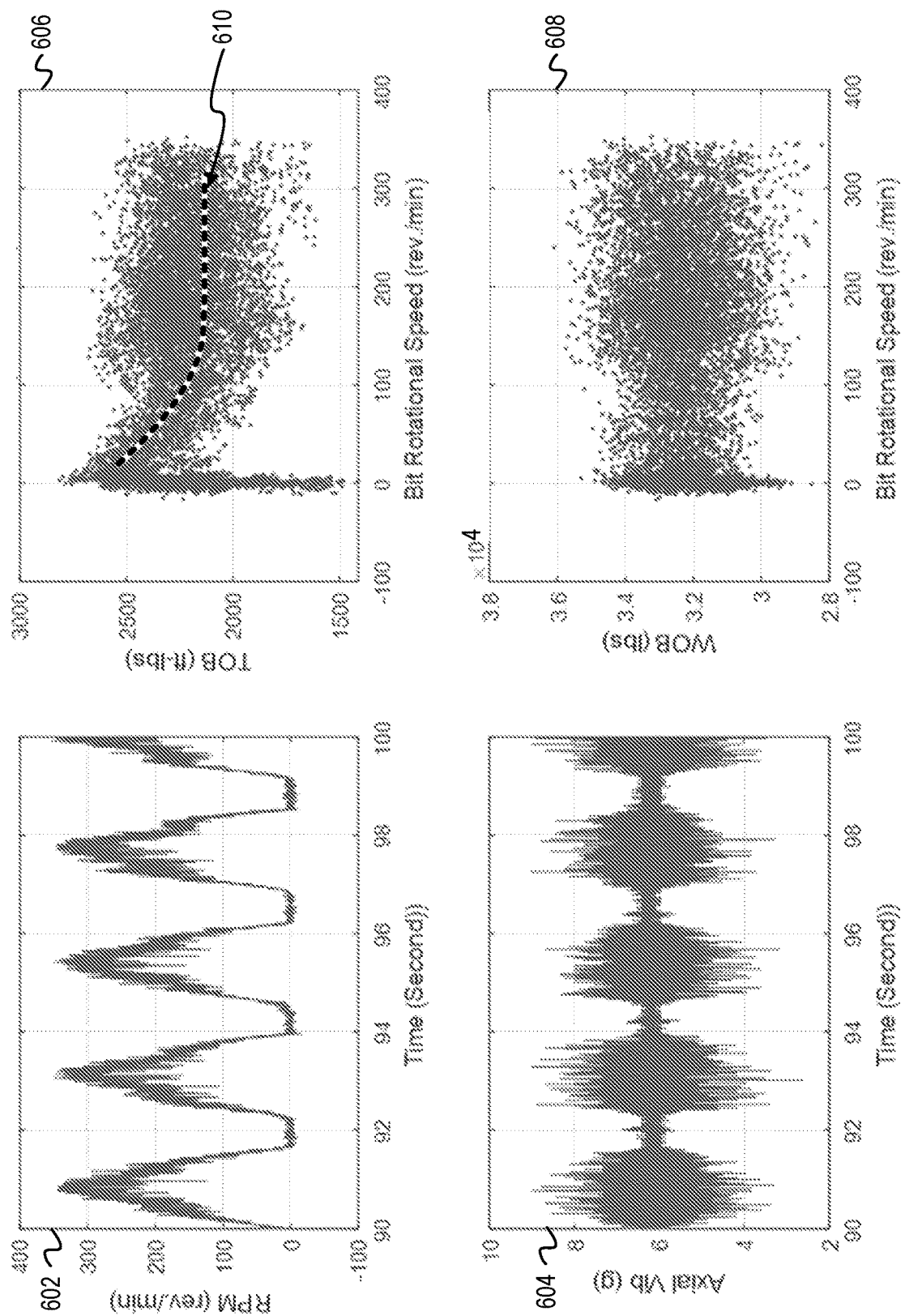
FIGS. 6A-6B depict graphs corresponding to two example instances of cutting-induced stick-slip.
Figure 6B:
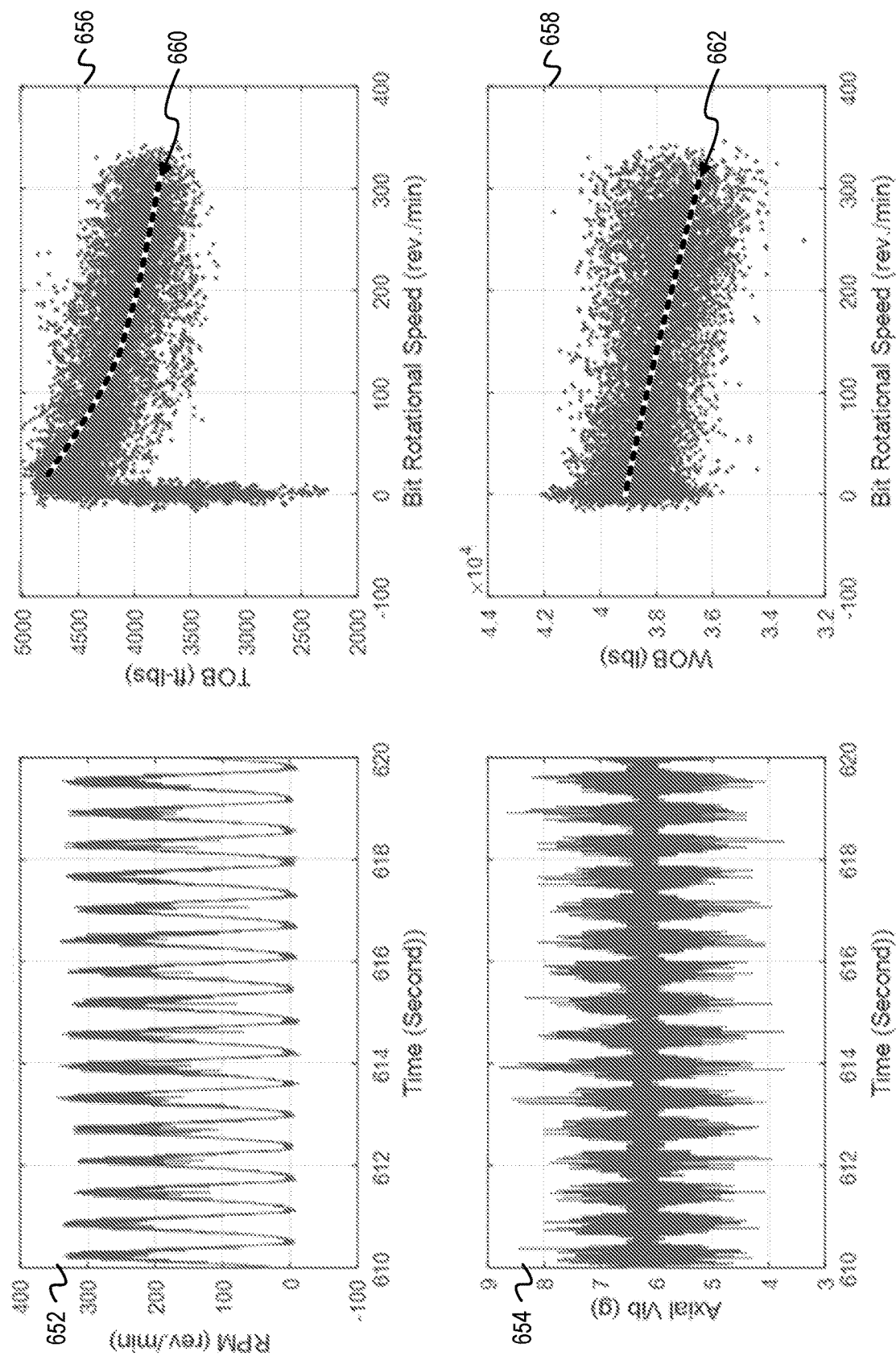

FIGS. 6A-6B depict graphs corresponding to two example instances of cutting-induced stick-slip. FIG. 6A depicts graphs corresponding to an example instance of low-frequency cutting-induced stick-clip. FIG. 6A includes graph 602 depicting RPM in rev/min as a function of time in sec for a 10 sec interval. The graph 602 displays slip periods with maximum RPM of approximately 350 rev/min and stick periods with minimum RPM of approximately 0 rev/min. The stick slip phases exhibit periodicity with relatively constant approximately 2.2 sec periods, which corresponds to a frequency of less than 1 Hz. Slip phases last about 1.8 seconds and vary between RPM values of 0 to 350 with a triangular shape. RPM exhibits more variability during slip phases, with stick phases having RPM values distributed close to 0 rev/min. FIG. 6A also includes graph 604, which depicts axial vibration in g as a function of time for the same 10 sec interval shown in the graph 602. The graph 604 displays a maximum axial vibration of approximately 9 g and a minimum axial vibration of approximately 3 g. The axial vibration exhibits periodicity on the same scale as that of the stick and slip phases depicted in the graph 602. During slip phases, axial vibration varies between 9 and 3 g, while during stick phases axial vibration is approximately 6 g with low dispersion. FIG. 6A further includes graph 606 depicting TOB in ft-lbs as a function of RPM in rev/min and graph 608 depicting WOB in lbs as a function of RPM in rev/min for the same 10 sec interval shown in the graphs 602 and 604.

The graph 606 displays a torsional dysfunction in TOB, where TOB is grouped into two (or more) distributions. A first set of points are clustered at approximately 0 RPM (i.e., corresponding to the stick phases) with TOB values between 1500 and 2750 ft-lbs. A second set of points are clustered at RPM values greater than zero with TOB ranging between 1750 and 2750 ft-lbs. The second set of points, which correspond to the slip phases, also exhibit a general decrease in TOB as a function of increasing RPM which is the velocity weakening effect. A dotted line 610, which represents the approximate median TOB value as a function of RPM, is superimposed on the data points of the graph 606. The dotted line 610 displays a negative trend of TOB value with increased RPM value. The graph 608 displays WOB clustered in two distributions, where a first grouping of data points are clustered about 0 RPM between 30,000 and 35,000 lbs and a second grouping of data points occupies the space for 0<RPM≤350 rev/min and between 29,000 and 36,000 lbs. Both distributions are symmetric about approximately 32,000 lbs in the WOB direction with no noticeable decrease in WOB as a function of RPM.

FIG. 6B depicts graphs corresponding to an example instance of high-frequency cutting-inducted stick-slip. FIG. 6B includes graph 652 depicting RPM in rev/min as a function of time in sec for a 10 sec interval. The graph 652 displays slip periods with maximum RPM of approximately 325 rev/min and stick periods with minimum RPM of approximately 0 rev/min. The stick slip phases exhibit periodicity with relatively constant approximately 0.6 sec periods, which corresponds to a frequency of approximately 1.6 Hz. Slip phases last about 0.3 seconds and vary between RPM values of 0 to 325 with a triangular shape, although neither stick nor slip phases exhibit steady state RPM values. Stick phases having RPM values distributed close to 0 rev/min and are of less than 0.1 sec duration. FIG. 6B also includes graph 654, which depicts axial vibration in g as a function of time for the same 10 sec interval shown in the graph 652. The graph 654 displays a maximum axial vibration of approximately 9 g and a minimum axial vibration of approximately 4 g. The axial vibration exhibit periodicity on the same scale as that of the stick and slip phases depicted in the graph 652. During slip phases, axial vibration varies between 8 and 4 g, while during stick phases axial vibration is approximately 6.3 g with low dispersion. FIG. 6B further includes graph 656 depicting TOB in ft-lbs as a function of RPM in rev/min and graph 658 depicting WOB in lbs as a function of RPM in rev/min for the same 10 sec interval shown in the graphs 652 and 654.

The graph 656 displays a torsional dysfunction in TOB, where TOB is grouped into two (or more) distributions. A first set of points are clustered at approximately 0 RPM (i.e., corresponding to the stick phases) with TOB values between 2250 and 5000 ft-lbs. A second set of points are clustered at RPM values greater than zero with TOB ranging between 3500 and 5000 ft-lbs. The second set of points, which correspond to the slip phases, also exhibit a decrease in TOB as a function of increasing RPM corresponding to the velocity weakening effect. A dotted line 660, which represents the approximate median TOB value as a function of RPM, is superimposed on the data points of the graph 656. The dotted line 660 displays a negative trend of TOB value with increased RPM value. The graph 668 displays minor torsional dysfunction in WOB. WOB is clustered in two distributions, where a first grouping of data points are clustered about 0 RPM between 36,000 and 42,000 lbs and a second grouping of data points occupies the space for 0<RPM≤325 rev/min and between 36,000 and 40,000 lbs. A dotted line 662 is superimposed on the data points of the graph 658. The dotted line 662 displays a negative trend of WOB with increased RPM value.

Figure 7A:
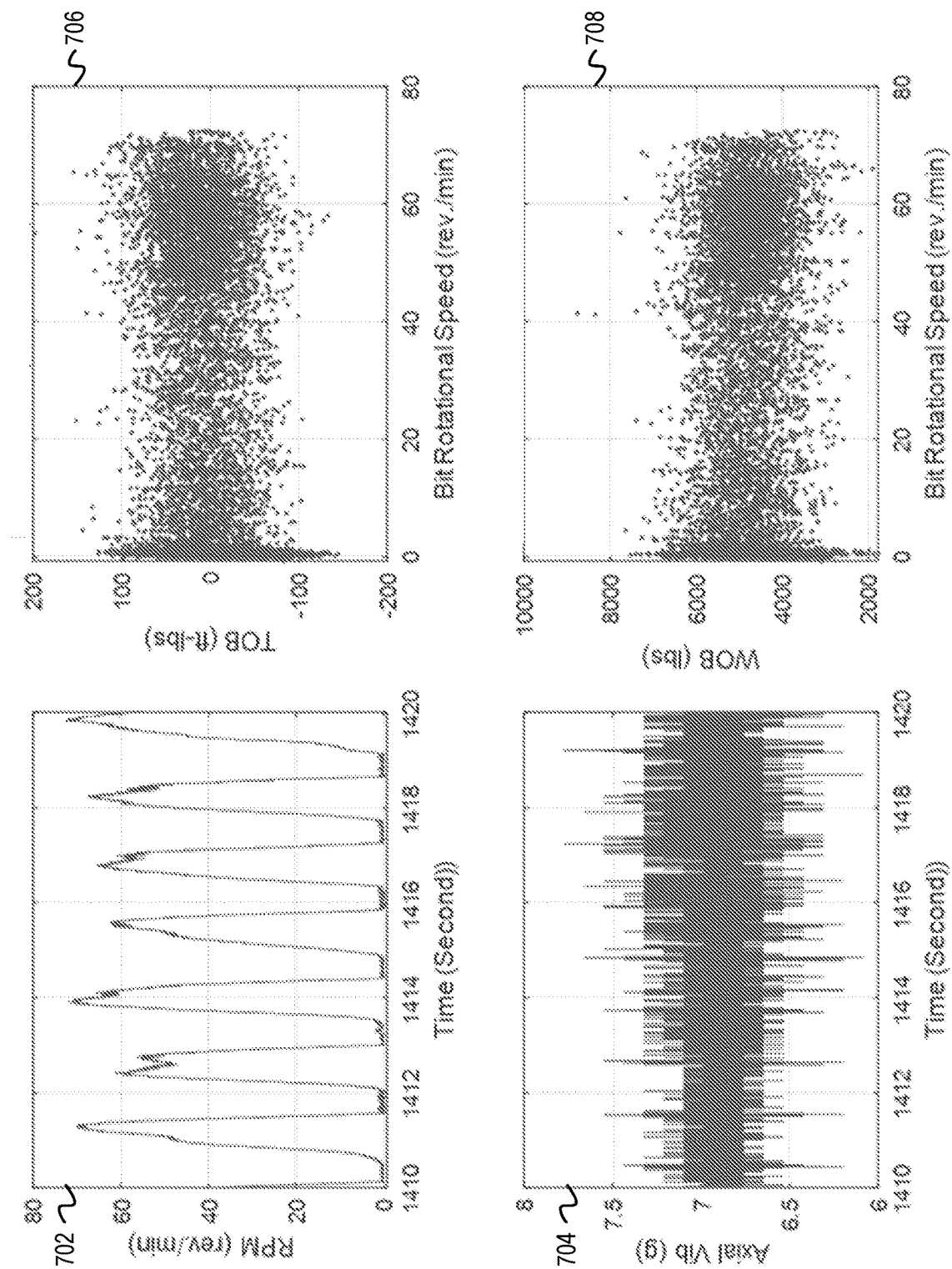
FIGS. 7A-7B depict graphs corresponding to two example instances of friction-induced stick-slip.
Figure 7B:
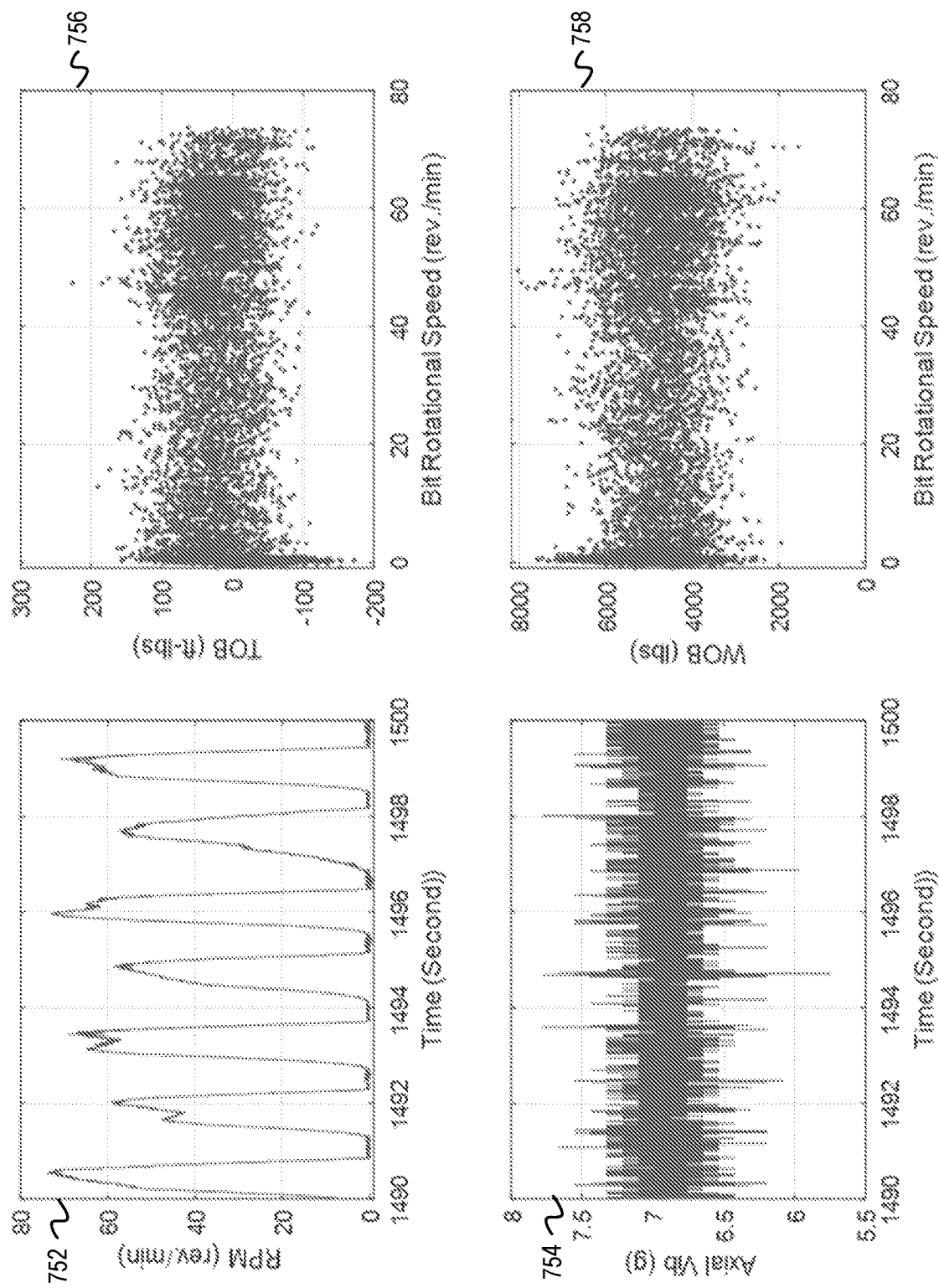

FIGS. 7A-7B depict graphs corresponding to two example instances of friction-induced stick-slip. FIG. 7A includes graph 702 depicting RPM in rev/min as a function of time in sec for a 10 sec interval. The graph 702 displays slip periods with maximum RPM of approximately 70 rev/min and stick periods with minimum RPM of approximately 0 rev/min. The stick slip phases exhibit periodicity with relatively constant approximately 1.4 sec periods, which corresponds to a frequency of less than 1 Hz. Slip phases last about 1 sec and vary between RPM values of 0 to 70 with a triangular shape and slight flattening about the maximum RPM of 70 rev/min. RPM exhibits more variability during slip phases, with stick phases having RPM values approximately equal to 0 rev/min. FIG. 7A also includes graph 704, which depicts axial vibration in g as a function of time for the same 10 sec interval shown in the graph 702. The graph 704 displays a maximum axial vibration of approximately 7.75 g and a minimum axial vibration of approximately 6 g. The axial vibration exhibits no periodicity on the same scale as that of the stick and slip phases depicted in the graph 702. The major feature of the axial vibration is noise, where the variation in axial vibration values appears to change over time. The variance is larger for axial vibration between 1416 and 1418 sec than between 1410 and 1412 sec. FIG. 7A further includes graph 706 depicting TOB in ft-lbs as a function of RPM in rev/min and graph 708 depicting WOB in lbs as a function of RPM in rev/min for the same 10 sec interval shown in the graphs 702 and 704.

The graph 706 displays TOB is grouped into two (or more) distributions as a function of RPM, but not a torsional dysfunction. A first set of points are clustered at approximately 0 RPM (i.e., corresponding to the stick phases) with TOB values between −100 and 100 ft-lbs. A second set of points are clustered at RPM values greater than zero with TOB ranging again between −100 and 100 ft-lbs. The second set of points, which correspond to the slip phases, also exhibit no velocity weakening effect or any decrease in TOB with increase in RPM. TOB values are arranged symmetrically about approximately 0 ft-lbs in the TOB direction. The graph 708 displays WOB clustered in two distributions, where a first grouping of data points are clustered about 0 RPM between 2,000 and 8,000 lbs and a second grouping of data points occupies the space for 0<RPM≤70 rev/min and between 2,000 and 8,000 lbs. Both distributions are symmetric about approximately 5,000 lbs in the WOB direction with no noticeable decrease in WOB as a function of RPM.

FIG. 7B includes graph 752 depicting RPM in rev/min as a function of time in sec for a 10 sec interval. The graph 752 displays slip periods with maximum RPM of approximately 70 rev/min and stick periods with minimum RPM of approximately 0 rev/min. The stick slip phases exhibit periodicity with relatively constant approximately 1.4 sec periods, which corresponds to a frequency of less than 1 Hz. Slip phases last about 1 sec and vary between RPM values of 0 to 70 with a semi-rectangular shape and flattening about the maximum RPM of between 60 and 70 rev/min. RPM exhibits more variability during slip phases, with stick phases having RPM values approximately equal to 0 rev/min. FIG. 7B also includes graph 754, which depicts axial vibration in g as a function of time for the same 10 sec interval shown in the graph 752. The graph 754 displays a maximum axial vibration of approximately 7.75 g and a minimum axial vibration of approximately 5.75 g. The axial vibration exhibits no periodicity on the same scale as that of the stick and slip phases depicted in the graph 752. The major feature of the axial vibration is noise which has a relatively constant variation over time. FIG. 7B further includes graph 756 depicting TOB in ft-lbs as a function of RPM in rev/min and graph 758 depicting WOB in lbs as a function of RPM in rev/min for the same 10 sec interval shown in the graphs 752 and 754.

The graph 756 displays TOB is grouped into two (or more) distributions as a function of RPM, but not a torsional dysfunction. A first set of points are clustered at approximately 0 RPM (i.e., corresponding to the stick phases) with TOB values between −200 and 200 ft-lbs. A second set of points are clustered at RPM values greater than zero with TOB ranging again between −150 and 200 ft-lbs. The second set of points, which correspond to the slip phases, exhibit no velocity weakening effect or any decrease in TOB with increase in RPM. TOB values are arranged symmetrically about approximately 25 ft-lbs in the TOB direction. The graph 758 displays WOB clustered in two distributions, where a first grouping of data points are clustered about 0 RPM between 2,000 and 8,000 lbs and a second grouping of data points occupies the space for 0<RPM≤70 rev/min and between 1,500 and 8,000 lbs. Both distributions are symmetric about approximately 5,000 lbs in the WOB direction with no noticeable decrease in WOB as a function of RPM.

Figure 8A:
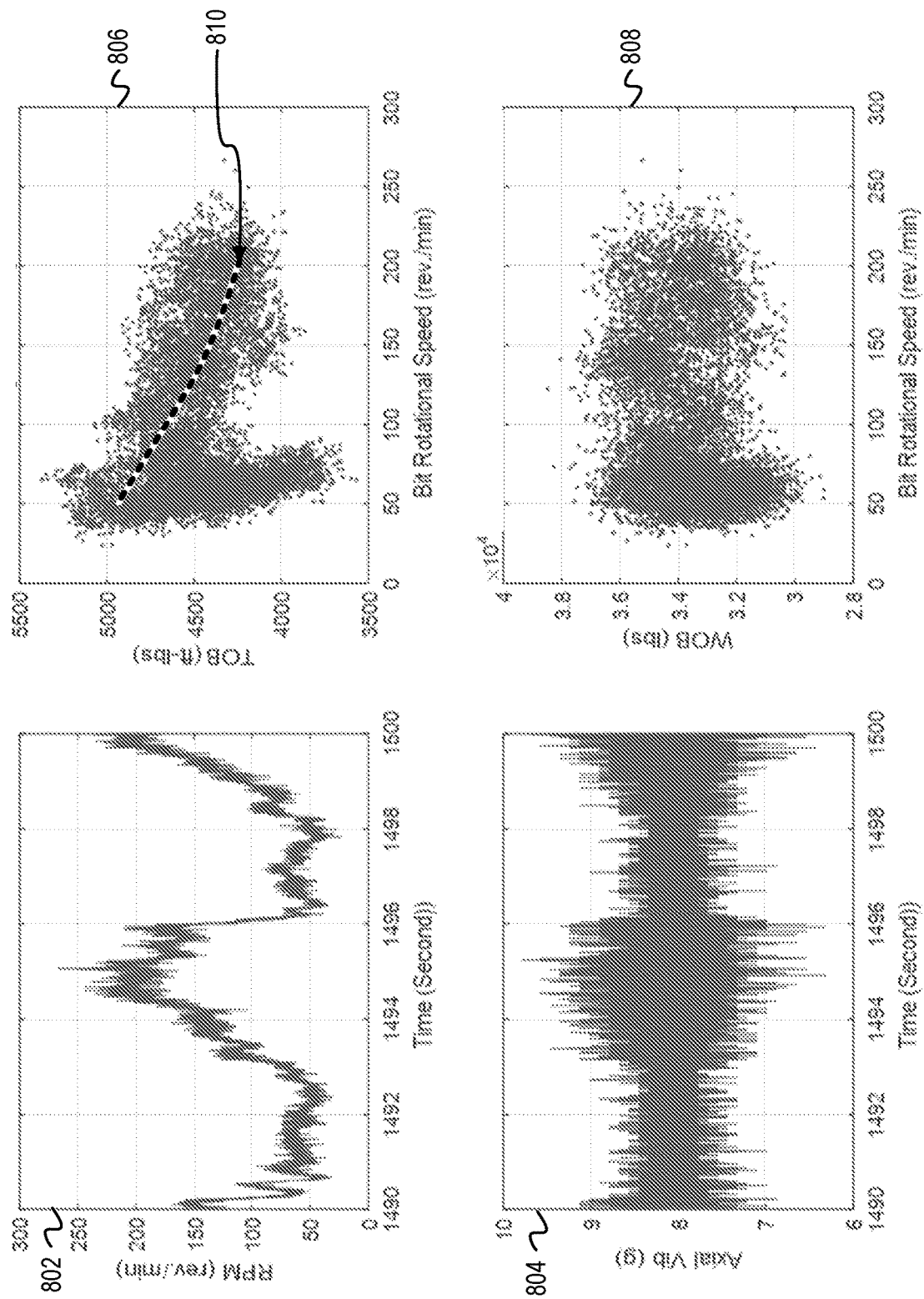
FIGS. 8A-8B depict graphs corresponding to two example instances of pipe-induced stick-slip.
Figure 8B:
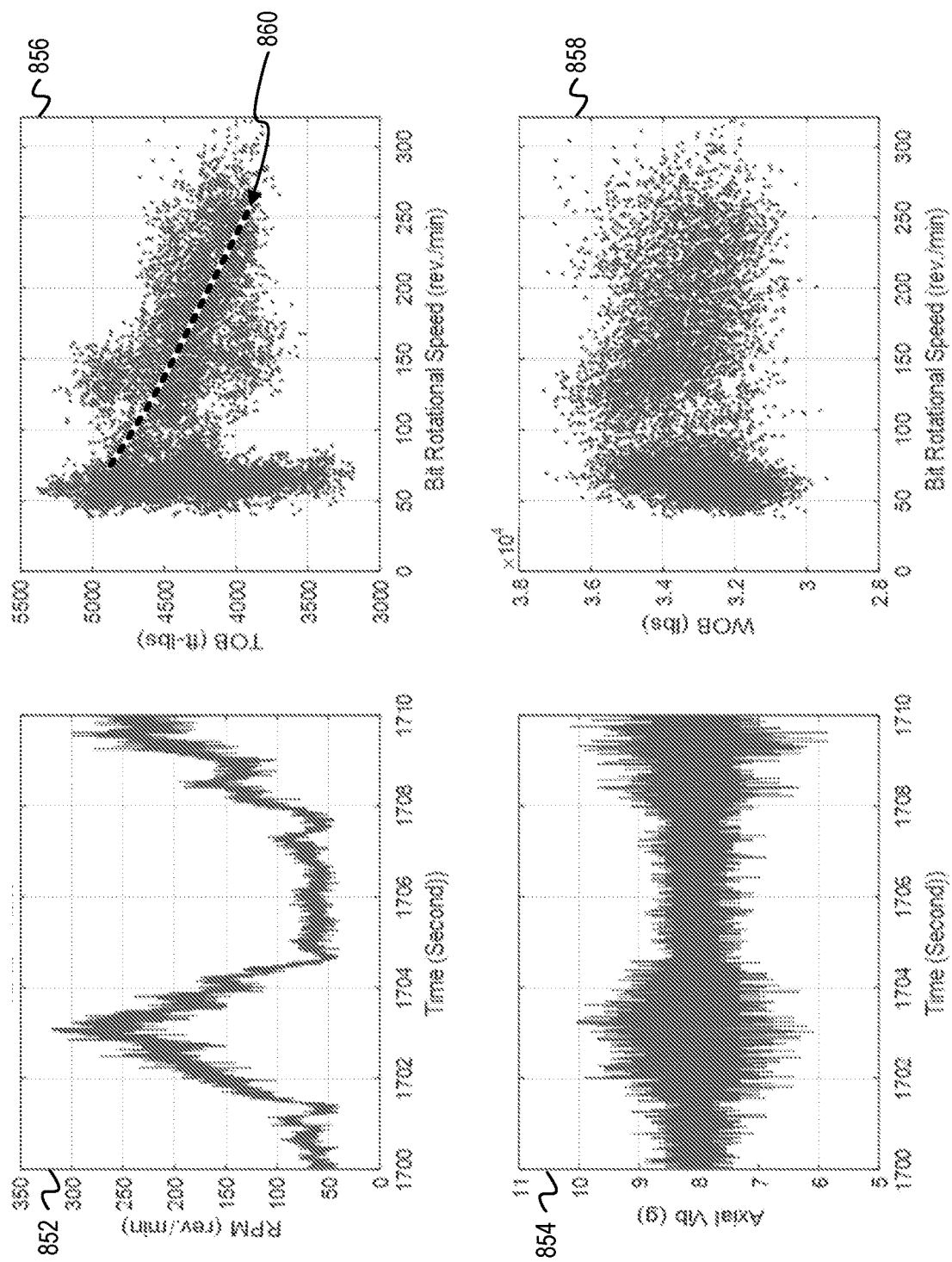

FIGS. 8A-8B depict graphs corresponding to two example instances of pipe-induced stick-slip. FIG. 8A includes graph 802 depicting RPM in rev/min as a function of time in sec for a 10 sec interval. The graph 802 displays slip periods with maximum RPM of approximately 250 rev/min and quasi-stick periods with minimum RPM of approximately 50 rev/min. The stick slip phases appear to exhibit periodicity with approximately 6 sec periods, which corresponds to a frequency of much less than 1 Hz. Slip phases last about 2 seconds and vary between RPM values of 50 to 250 with a sawtooth shape. Quasi-stick phases also last about 2 seconds. RPM exhibits similar variability during both slip and quasi-stick phases. FIG. 8A also includes graph 804, which depicts axial vibration in g as a function of time for the same 10 sec interval shown in the graph 802. The graph 804 displays a maximum axial vibration of approximately 10 g and a minimum axial vibration of approximately 6.5 g. The axial vibration exhibit periodicity on the same scale as that of the quasi-stick and slip phases depicted in the graph 602. During slip phases, axial vibration varies between 6.5 and 9.5 g, while during quasi-stick phases axial vibration is approximately 8 g with lower variation between 7.5 and 8.5 g. FIG. 8A further includes graph 806 depicting TOB in ft-lbs as a function of RPM in rev/min and graph 808 depicting WOB in lbs as a function of RPM in rev/min for the same 10 sec interval shown in the graphs 802 and 804.

The graph 806 displays a torsional dysfunction in TOB, where TOB is grouped into two (or more) distributions. A first set of points are clustered at approximately 50 RPM (i.e., corresponding to the quasi-stick phases) with TOB values between 3750 and 5250 ft-lbs. A second set of points are clustered at RPM values between 75 and 250 rev/min with TOB ranging between 4000 and 5000 ft-lbs. The second set of points, which correspond to the slip phases, also exhibit a general decrease in TOB as a function of increasing RPM signifying the velocity weakening effect. A dotted line 810, which represents the approximate median TOB value as a function of RPM, is superimposed on the data points of the graph 806. The dotted line 810 displays a negative trend of TOB value with increased RPM value. The graph 808 displays WOB clustered in two distributions, where a first grouping of data points are clustered about 50

RPM between 30,000 and 38,000 lbs and a second grouping of data points occupies the space for 75<RPM≤250 rev/min and between 30,000 and 38,000 lbs. Both distributions are symmetric—the quasi-stick distribution is symmetrical about approximately 33,000 lbs and the slip distribution is symmetrical about approximately 34,000 lbs in the WOB direction—and neither displays any noticeable decrease in WOB as a function of RPM.

FIG. 8B includes graph 852 depicting RPM in rev/min as a function of time in sec for a 10 sec interval. The graph 852 displays slip periods with maximum RPM of approximately 300 rev/min and quasi-stick periods with minimum RPM of approximately 50 rev/min. The stick slip phases appear to exhibit periodicity with approximately 7 sec periods, which corresponds to a frequency of much less than 1 Hz. Slip phases last about 5 seconds and vary between RPM values of 50 to 300 with a triangular shape. Quasi-stick phases last about 3 seconds. RPM exhibits similar variability during both slip and quasi-stick phases. FIG. 8B also includes graph 854, which depicts axial vibration in g as a function of time for the same 10 sec interval shown in the graph 852. The graph 854 displays a maximum axial vibration of approximately 10 g and a minimum axial vibration of approximately 6 g. The axial vibration exhibit periodicity on the same scale as that of the quasi-stick and slip phases depicted in the graph 652. During slip phases, axial vibration varies between 6 and 10 g, while during quasi-stick phases axial vibration is approximately 8 g with lower variations between 7.5 and 8.5 g. FIG. 8B further includes graph 856 depicting TOB in ft-lbs as a function of RPM in rev/min and graph 858 depicting WOB in lbs as a function of RPM in rev/min for the same 10 sec interval shown in the graphs 852 and 854.

The graph 856 displays a torsional dysfunction in TOB, where TOB is grouped into two (or more) distributions. A first set of points are clustered at approximately 50 RPM (i.e., corresponding to the quasi-stick phases) with TOB values between 3250 and 5250 ft-lbs. A second set of points are clustered at RPM values between 75 and 300 rev/min with TOB ranging between 3500 and 5250 ft-lbs. The second set of points, which correspond to the slip phases, also exhibit a general decrease in TOB as a function of increasing RPM corresponding to the velocity weakening effect. A dotted line 860, which represents the approximate median TOB value as a function of RPM, is superimposed on the data points of the graph 856. The dotted line 860 displays a negative trend of TOB value with increased RPM value. The graph 858 displays WOB clustered in two distributions, where a first grouping of data points are clustered about 50 RPM between 30,000 and 38,000 lbs and a second grouping of data points occupies the space for 75<RPM≤300 rev/min and between 30,000 and 37,000 lbs. Both distributions are symmetric about approximately 33,000 lbs in the WOB direction and neither displays any noticeable decrease in WOB as a function of RPM.

Figure 9A:
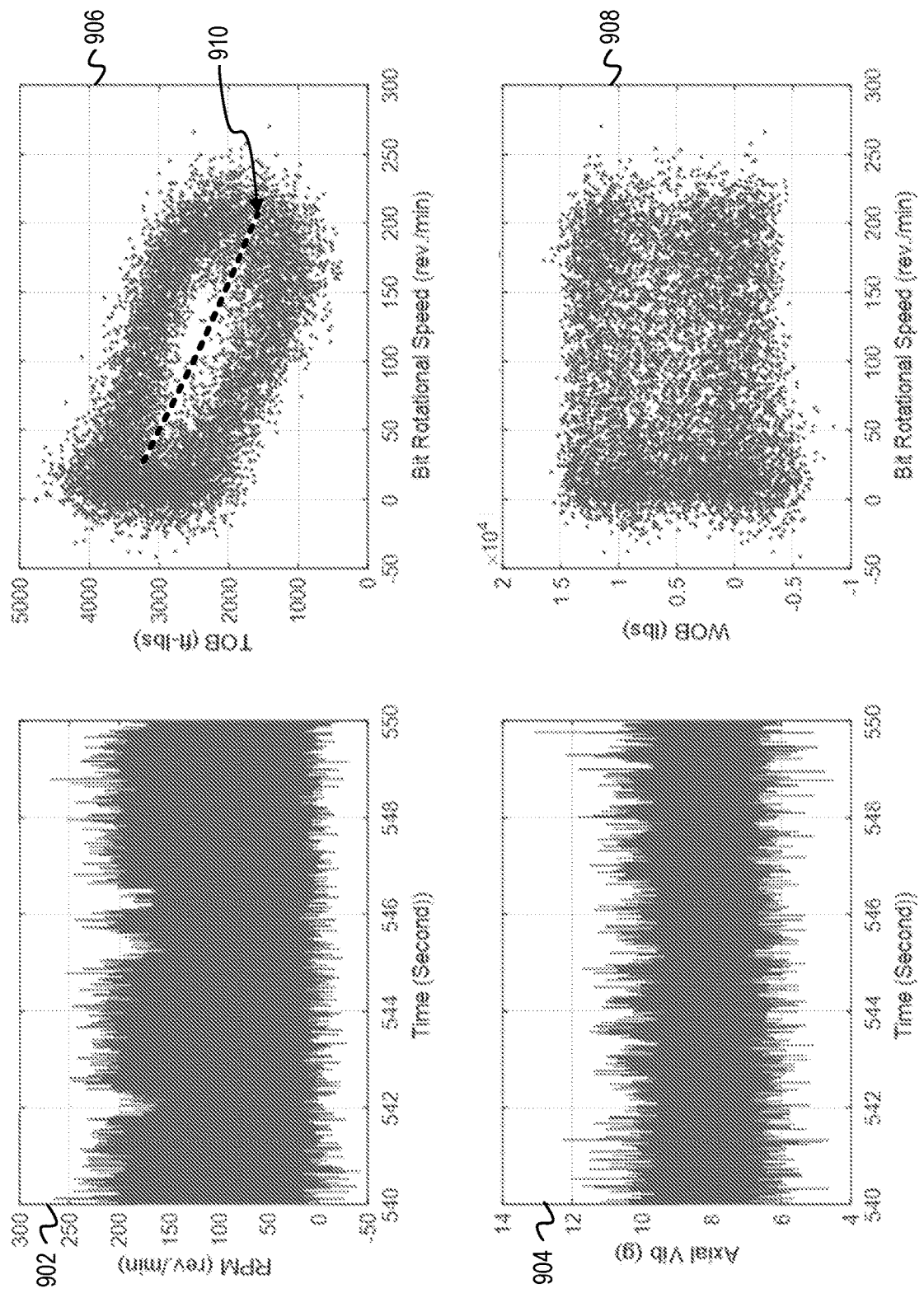
FIGS. 9A-9B depict graphs corresponding to two example instances of three-dimensional (3D) coupled vibrations or high frequency torsional oscillations.
Figure 9B:
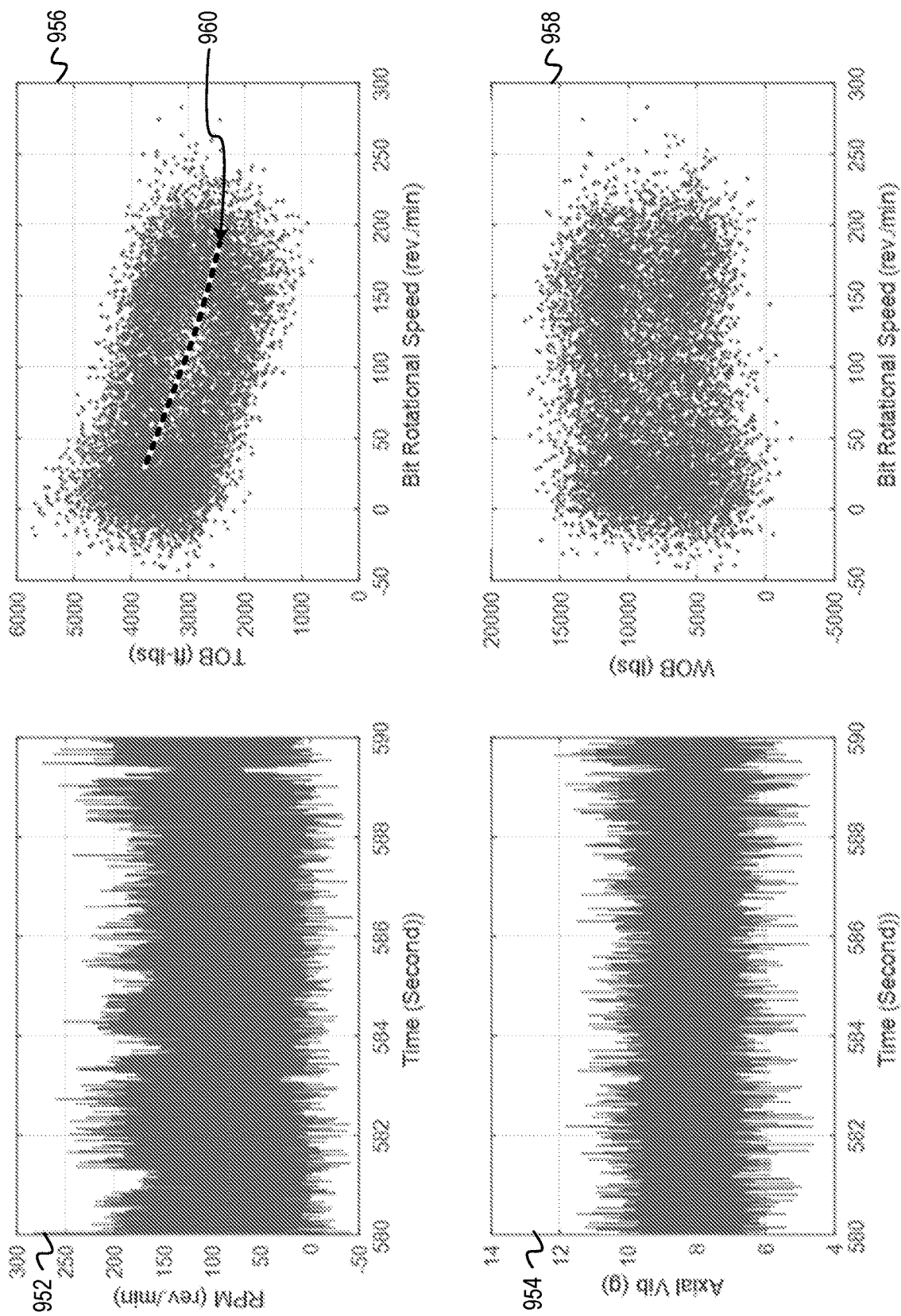

FIGS. 9A-9B depict graphs corresponding to two example instances of three-dimensional (3D) coupled vibrations or high frequency torsional oscillations HFTO). FIG. 9A includes graph 902 depicting RPM in rev/min as a function of time in sec for a 10 sec interval. The graph 902 displays a maximum RPM of approximately 250 rev/min and a minimum RPM of approximately −50 rev/min. RPM exhibits high frequency oscillations. FIG. 9A also includes graph 904, which depicts axial vibration in units of the g as a function of time for the same 10 sec interval shown in the graph 902. The graph 904 displays a maximum axial vibration of approximately 5 g and a minimum axial vibration of approximately 13 g. The axial vibration exhibits high frequency oscillations like the RPM of the graph 902. FIG. 9A further includes graph 906 depicting TOB in ft-lbs as a function of RPM in rev/min and graph 908 depicting WOB in lbs as a function of RPM in rev/min for the same 10 sec interval shown in the graphs 902 and 904.

The graph 906 displays a torsional dysfunction in TOB, where TOB is grouped into a closed loop distribution. A first set of points are clustered at approximately 0 RPM with TOB values between 2000 and 4500 ft-lbs. The set of points making up the rest of the closed loop are clustered about an exclusionary one or area of unallowed TOB and RPM values centered about 2500 ft-lbs and 100 rev/min. The closed loop resembles a tilted ellipse with major axis corresponding to a decrease in TOB with increasing RPM. A dotted line 910, which represents the approximate median TOB value as a function of RPM, is superimposed on the data points of the graph 906. The dotted line 910 displays a negative trend of TOB value with increased RPM value. The graph 908 displays WOB clustered in two distributions, where a first grouping of data points are clustered about 0 RPM between −5,000 and 15,000 lbs and a second, more disperse grouping of data points occupies the space for 25<RPM<250 rev/min and between −5,000 and 15,000 lbs. Both distributions are symmetric about approximately 5,000 lbs in the WOB direction and neither displays any noticeable decrease in WOB as a function of RPM.

FIG. 9B includes graph 952 depicting RPM in rev/min as a function of time in sec for a 10 sec interval. The graph 952 displays a maximum RPM of approximately 275 rev/min and a minimum RPM of approximately −50 rev/min. RPM exhibits periodicity corresponding to high frequency oscillations. FIG. 9B also includes graph 954, which depicts axial vibration in units of the g as a function of time for the same 10 sec interval shown in the graph 952. The graph 954 displays a maximum axial vibration of approximately 4 g and a minimum axial vibration of approximately 12 g. The axial vibration exhibits high frequency oscillation like the RPM of the graph 952. FIG. 9B further includes graph 956 depicting TOB in ft-lbs as a function of RPM in rev/min and graph 958 depicting WOB in lbs as a function of RPM in rev/min for the same 10 sec interval shown in the graphs 952 and 954.

The graph 956 displays a torsional dysfunction in TOB, where TOB is grouped into a closed loop distribution. A first set of points are clustered at approximately 0 RPM with TOB values between 3000 and 5000 ft-lbs. The set of points making up the rest of the closed loop are clustered about an exclusionary one or area of unallowed TOB and RPM values centered about 3000 ft-lbs and 100 rev/min. The closed loop resembles a tilted ellipse with major axis corresponding to a decrease in TOB with increasing RPM. A dotted line 960, which represents the approximate median TOB value as a function of RPM, is superimposed on the data points of the graph 956. The dotted line 960 displays a negative trend of TOB value with increased RPM value. The graph 958 displays WOB clustered in two distributions, where a first grouping of data points are clustered about 0 RPM between 0 and 15,000 lbs and a second, more disperse grouping of data points occupies the space for 25<RPM<250 rev/min and between 0 and 15,000 lbs. Both distributions are symmetric about approximately 7,500 lbs in the WOB direction and neither displays any noticeable decrease in WOB as a function of RPM.

Figure 10A:
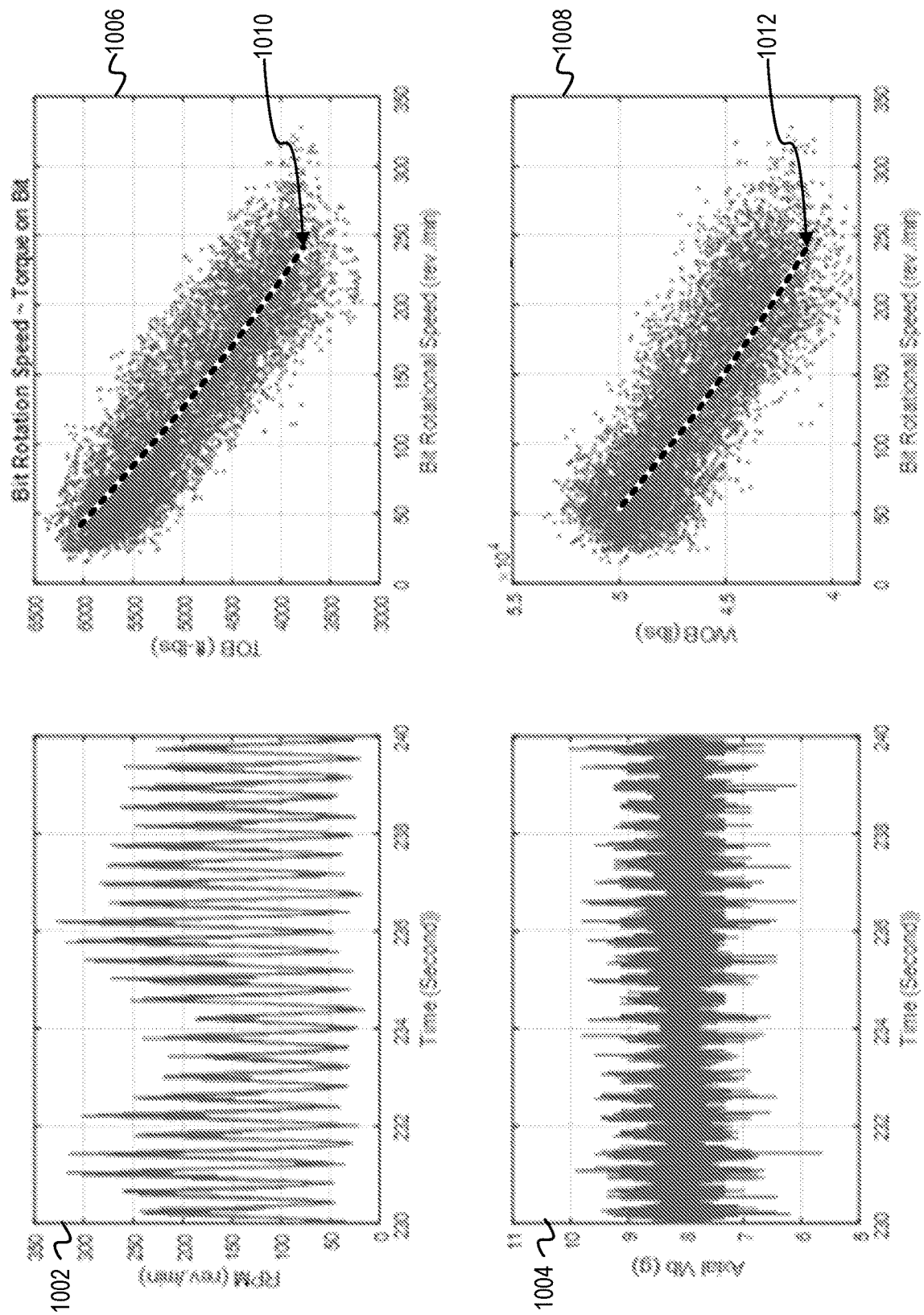
FIGS. 10A-10B depict graphs corresponding to two example instances of 3D coupled vibrations or low frequency torsional oscillations.
Figure 10B:
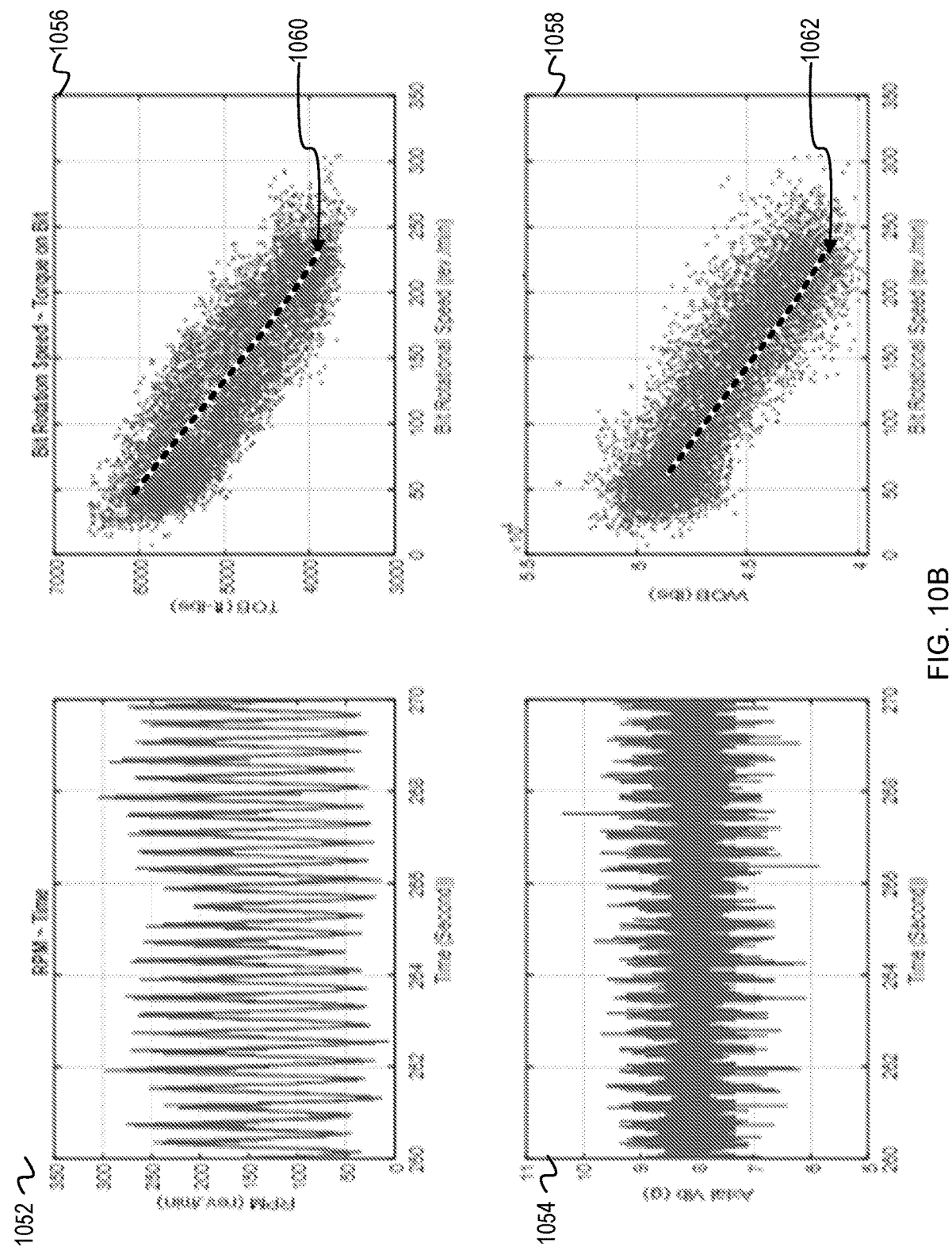

FIGS. 10A-10B depict graphs corresponding to two example instances of 3D coupled vibrations or low frequency torsional oscillations (LFTO). FIG. 10A includes graph 1002 depicting RPM in rev/min as a function of time in sec for a 10 sec interval. The graph 1002 displays a maximum RPM of approximately 320 rev/min and a minimum RPM of approximately 20 rev/min. RPM exhibits a periodicity with approximately 25 maximums over the time period shown, which gives a frequency of about 2.5 Hz. FIG. 10A also includes graph 1004, which depicts axial vibration in units g as a function of time for the same 10 sec interval shown in the graph 1002. The graph 1004 displays a maximum axial vibration of approximately 10 g and a minimum axial vibration of approximately 5.5 g. The axial vibration exhibits periodicity at the same frequency as the RPM of the graph 1002. FIG. 10A further includes graph 1006 depicting TOB in ft-lbs as a function of RPM in rev/min and graph 1008 depicting WOB in lbs as a function of RPM in rev/min for the same 10 sec interval shown in the graphs 1002 and 1004.

The graph 1006 displays a torsional dysfunction in TOB, where TOB displays a strong velocity weakening effect where TOB decreases with increasing RPM. TOB ranges from approximately 6500 ft lbs for RPM of approximately 25 rev/min to 3250 ft-lbs for RPM of approximately 300 rev/min. A dotted line 1010, which represents the approximate median TOB value as a function of RPM, is superimposed on the data points of the graph 1006. The dotted line 1010 displays a negative trend of TOB value with increased RPM value. The graph 1008 displays a torsional dysfunction in WOB, where WOB displays a strong velocity weakening effect where WOB decreases with increasing RPM. WOB ranges from approximately 52,500 lbs for RPM of approximately 25 rev/min to 40,000 lbs for RPM of approximately 300 rev/min. A dotted line 1012, which represents the approximate median WOB value as a function of RPM, is superimposed on the data points of the graph 1008. The dotted line 1012 displays a negative trend of WOB value with increasing RPM value.

FIG. 10B includes graph 1052 depicting RPM in rev/min as a function of time in sec for a 10 sec interval. The graph 1052 displays a maximum RPM of approximately 300 rev/min and a minimum RPM of approximately 0 rev/min. RPM exhibits a periodicity with approximately 25 maximums over the time period shown, which corresponds to a frequency of about 2.5 Hz. FIG. 10B also includes graph 1054, which depicts axial vibration in units g as a function of time for the same 10 sec interval shown in the graph 1052. The graph 1054 displays a maximum axial vibration of approximately 10.5 g and a minimum axial vibration of approximately 6 g. The axial vibration exhibits periodicity at the same frequency as the RPM of the graph 1052. FIG. 10B further includes graph 1056 depicting TOB in ft-lbs as a function of RPM in rev/min and graph 1058 depicting WOB in lbs as a function of RPM in rev/min for the same 10 sec interval shown in the graphs 1052 and 1054.

The graph 1056 displays a torsional dysfunction in TOB, where TOB displays a strong velocity weakening effect where TOB decreases with increasing RPM. TOB ranges from approximately 6,500 ft lbs for RPM of approximately 25 rev/min to 3,500 ft-lbs for RPM of approximately 275 rev/min. A dotted line 1060, which represents the approximate median TOB value as a function of RPM, is superimposed on the data points of the graph 1056. The dotted line 1060 displays a negative trend of TOB value with increased RPM value. The graph 1058 displays a torsional dysfunction in WOB, where WOB displays a strong velocity weakening effect where WOB decreases with increasing RPM. WOB ranges from approximately 52,500 lbs for RPM of approximately 25 rev/min to 40,000 lbs for RPM of approximately 275 rev/min. A dotted line 1062, which represents the approximate median WOB value as a function of RPM, is superimposed on the data points of the graph 1008. The dotted line 1062 displays a negative trend of WOB value with increasing RPM value.

Figure 11A:
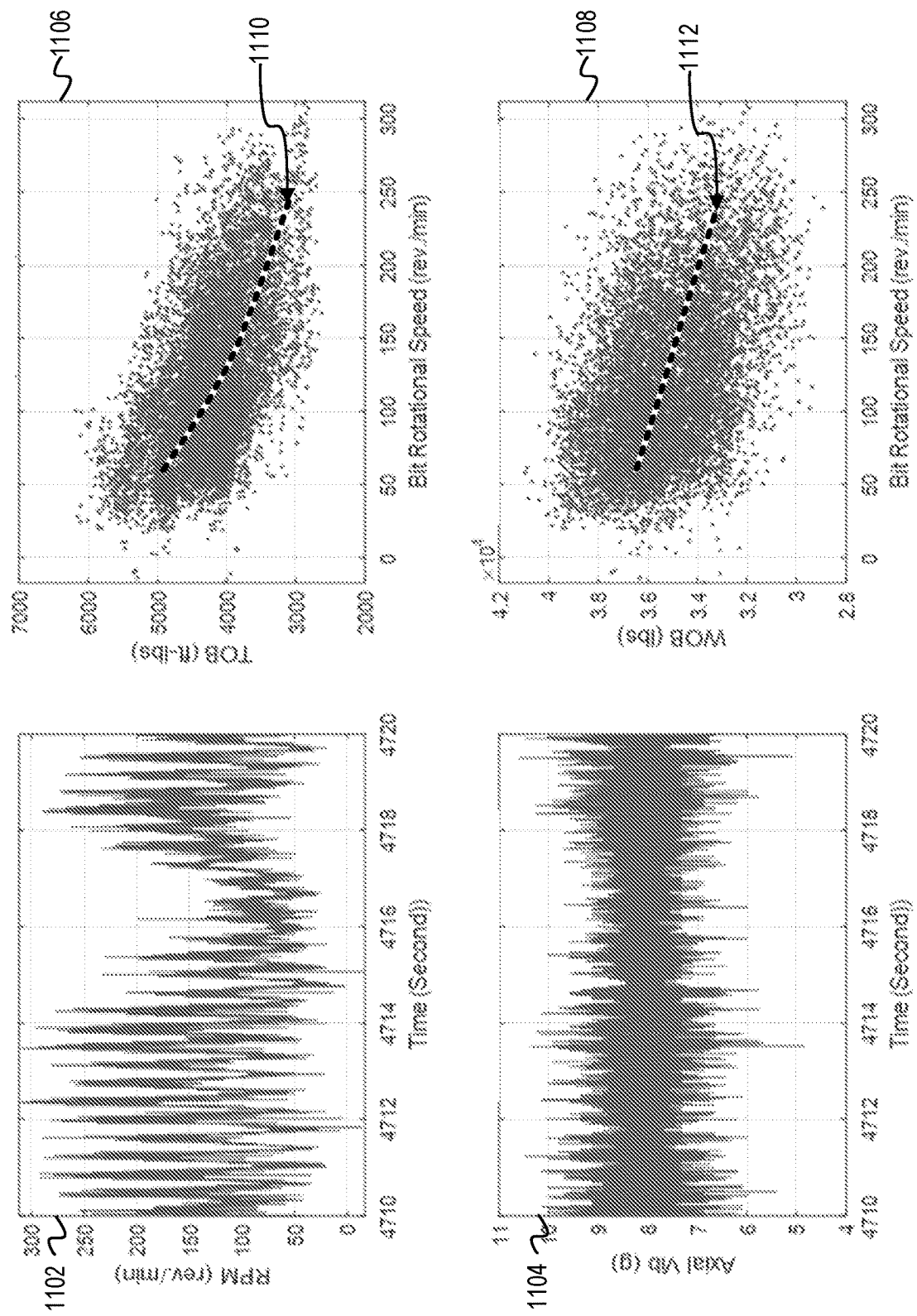
FIGS. 11A, 11B, 11C, and 11D depict graphs corresponding to four example instances of low frequency torsional vibration.

FIGS. 11A, 11B, 11C, and 11D depict graphs corresponding to four example instances of low frequency torsional vibration. FIG. 11A includes graph 1102 depicting RPM in rev/min as a function of time in sec for a 10 sec interval. The graph 1102 displays a maximum RPM of approximately 300 rev/min and a minimum RPM of approximately 0 rev/min. RPM exhibits a periodicity with approximately 27 maximums over the time period shown, which gives a frequency of about 2.7 Hz. FIG. 11A also includes graph 1104, which depicts axial vibration in units g as a function of time for the same 10 sec interval shown in the graph 1102. The graph 1104 displays a maximum axial vibration of approximately 10.5 g and a minimum axial vibration of approximately 5.5 g. The axial vibration exhibits periodicity at the same frequency as the RPM of the graph 1102. FIG. 11A further includes graph 1106 depicting TOB in ft-lbs as a function of RPM in rev/min and graph 1108 depicting WOB in lbs as a function of RPM in rev/min for the same 10 sec interval shown in the graphs 1102 and 1104.

The graph 1106 displays a torsional dysfunction in TOB, where TOB displays a strong velocity weakening effect where TOB decreases with increasing RPM. TOB ranges from approximately 6000 ft lbs for RPM of approximately 50 rev/min to 2750 ft-lbs for RPM of approximately 250 rev/min. A dotted line 1110, which represents the approximate median TOB value as a function of RPM, is superimposed on the data points of the graph 1106. The dotted line 1110 displays a negative trend of TOB value with increased RPM value. The graph 1108 displays a torsional dysfunction in WOB, where WOB displays a velocity weakening effect greater than dispersion where WOB decreases with increasing RPM. WOB ranges from approximately 40,000 lbs for RPM of approximately 50 rev/min to 30,000 lbs for RPM of approximately 250 rev/min. A dotted line 1112, which represents the approximate median WOB value as a function of RPM, is superimposed on the data points of the graph 1108. The dotted line 1112 displays a negative trend of WOB value with increasing RPM value.

Figure 11B:
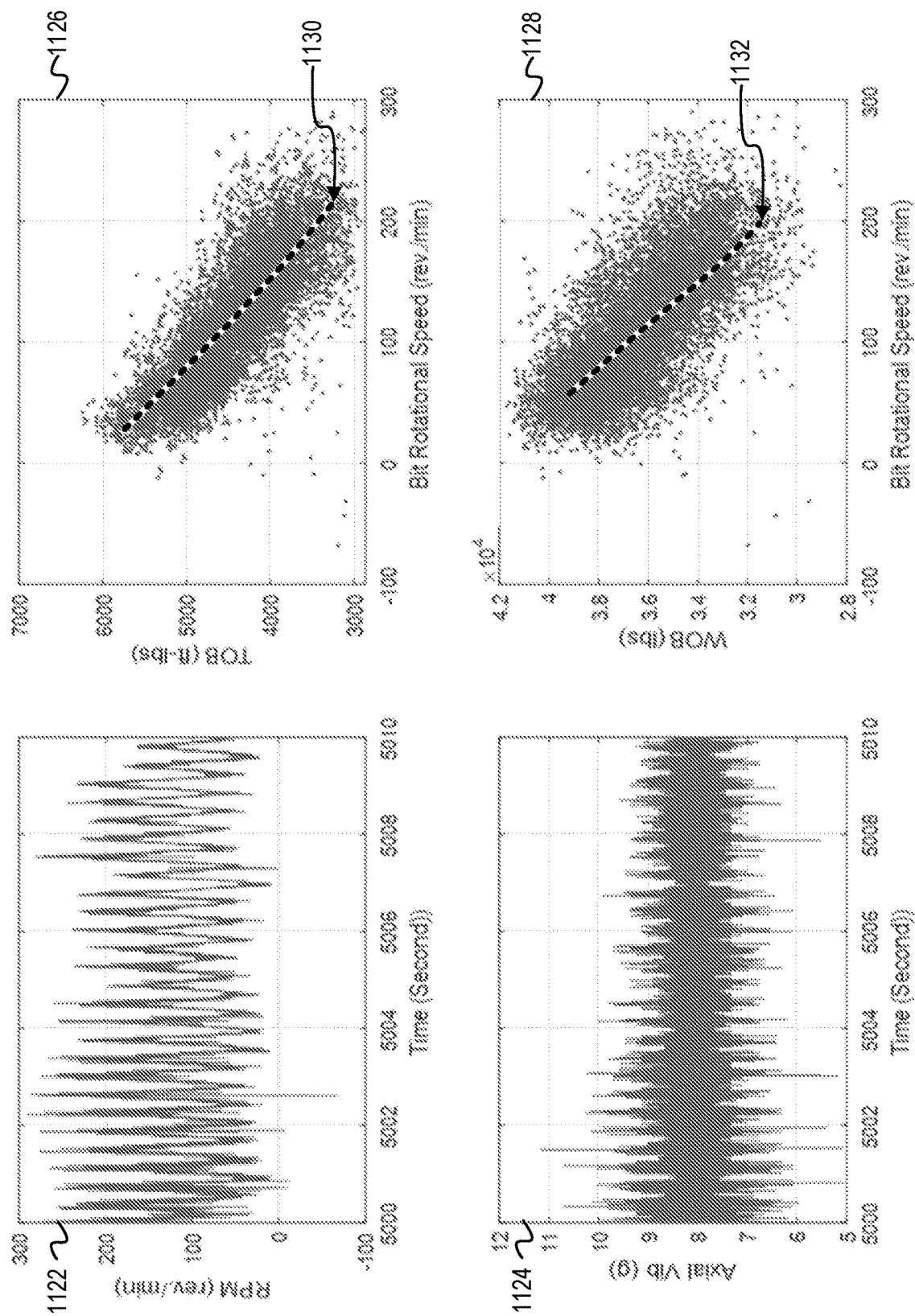

FIG. 11B includes graph 1122 depicting RPM in rev/min as a function of time in sec for a 10 sec interval. The graph 1122 displays a maximum RPM of approximately 300 rev/min and a minimum RPM of approximately −50 rev/min. RPM exhibits a periodicity with approximately 27 maximums over the time period shown, which gives a frequency of about 2.7 Hz. FIG. 11B also includes graph 1124, which depicts axial vibration in units g as a function of time for the same 10 sec interval shown in the graph 1122. The graph 1124 displays a maximum axial vibration of approximately 11 g and a minimum axial vibration of approximately 5 g. The axial vibration exhibits periodicity at the same frequency as the RPM of the graph 1122. FIG. 11B further includes graph 1126 depicting TOB in ft-lbs as a function of RPM in rev/min and graph 1128 depicting WOB in lbs as a function of RPM in rev/min for the same 10 sec interval shown in the graphs 1122 and 1124.

The graph 1126 displays a torsional dysfunction in TOB, where TOB displays a strong velocity weakening effect where TOB decreases with increasing RPM. TOB ranges from approximately 6000 ft lbs for RPM of approximately 25 rev/min to 3000 ft-lbs for RPM of approximately 225 rev/min. A dotted line 1130, which represents the approximate median TOB value as a function of RPM, is superimposed on the data points of the graph 1126. The dotted line 1130 displays a negative trend of TOB value with increased RPM value. The graph 1128 displays a torsional dysfunction in WOB, where WOB displays a strong velocity weakening and WOB decreases with increasing RPM. WOB ranges from approximately 41,000 lbs for RPM of approximately 25 rev/min to 32,000 lbs for RPM of approximately 225 rev/min. A dotted line 1132, which represents the approximate median WOB value as a function of RPM, is superimposed on the data points of the graph 1128. The dotted line 1132 displays a negative trend of WOB value with increasing RPM value.

Figure 11C:
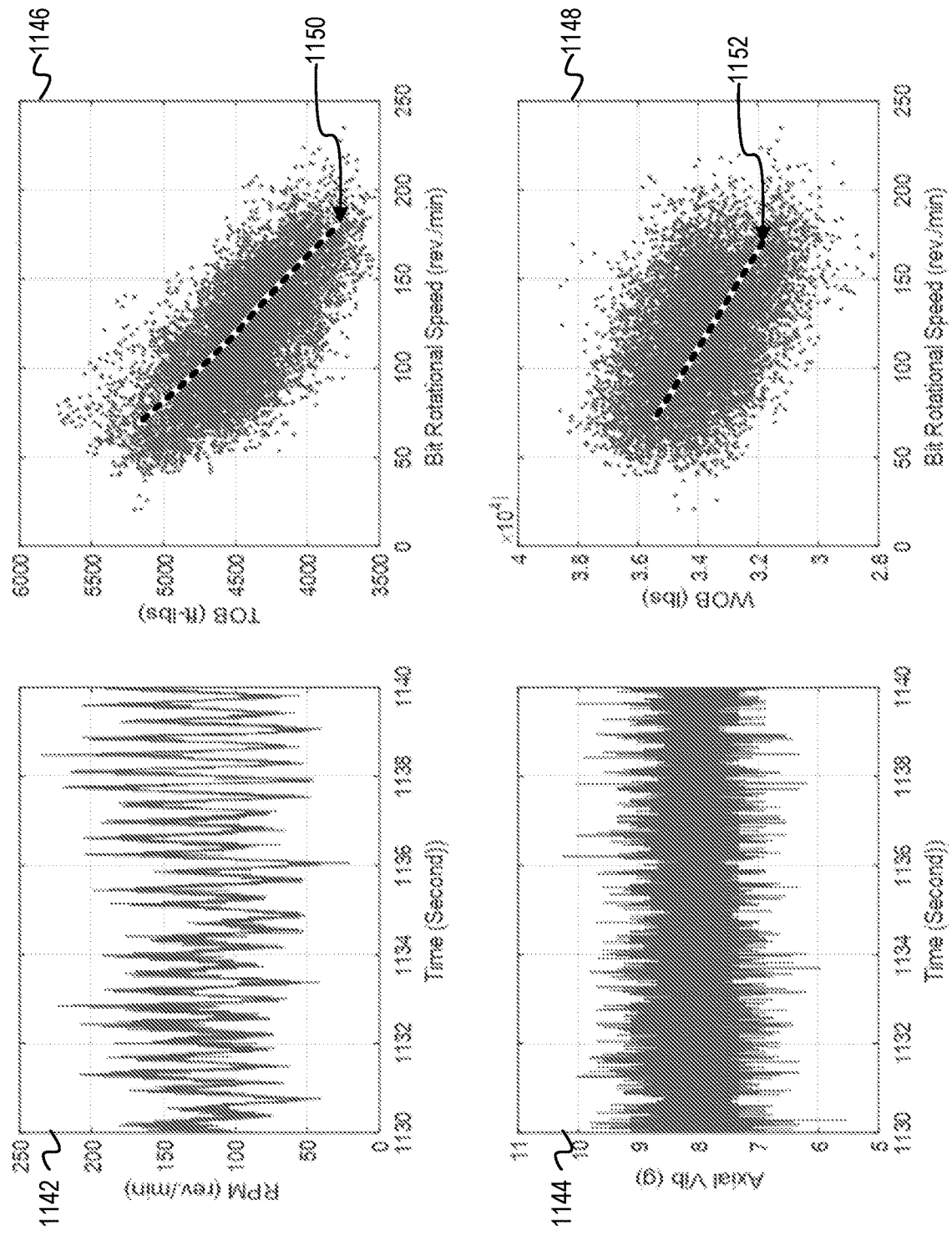

FIG. 11C includes graph 1142 depicting RPM in rev/min as a function of time in sec for a 10 sec interval. The graph 1142 displays a maximum RPM of approximately 225 rev/min and a minimum RPM of approximately 25 rev/min. RPM exhibits a periodicity with approximately 27 maximums over the time period shown, which gives a frequency of about 0.4 Hz. FIG. 11C also includes graph 1144, which depicts axial vibration in units g as a function of time for the same 10 sec interval shown in the graph 1142. The graph 1144 displays a maximum axial vibration of approximately 10 g and a minimum axial vibration of approximately 6 g. The axial vibration exhibits periodicity at the same frequency as the RPM of the graph 1142. FIG. 11C further includes graph 1146 depicting TOB in ft-lbs as a function of RPM in rev/min and graph 1148 depicting WOB in lbs as a function of RPM in rev/min for the same 10 sec interval shown in the graphs 1142 and 1144.

The graph 1146 displays a torsional dysfunction in TOB, where TOB displays a strong velocity weakening effect where TOB decreases with increasing RPM. TOB ranges from approximately 5500 ft lbs for RPM of approximately 50 rev/min to 3750 ft-lbs for RPM of approximately 200 rev/min. A dotted line 1150, which represents the approximate median TOB value as a function of RPM, is superimposed on the data points of the graph 1146. The dotted line 1150 displays a negative trend of TOB value with increased RPM value. The graph 1148 displays a torsional dysfunction in WOB, where WOB displays a strong velocity weakening and WOB decreases with increasing RPM. WOB ranges from approximately 38,000 lbs for RPM of approximately 50 rev/min to 31,000 lbs for RPM of approximately 200 rev/min. A dotted line 1152, which represents the approximate median WOB value as a function of RPM, is superimposed on the data points of the graph 1148. The dotted line 1152 displays a negative trend of WOB value with increasing RPM value.

Figure 11D:
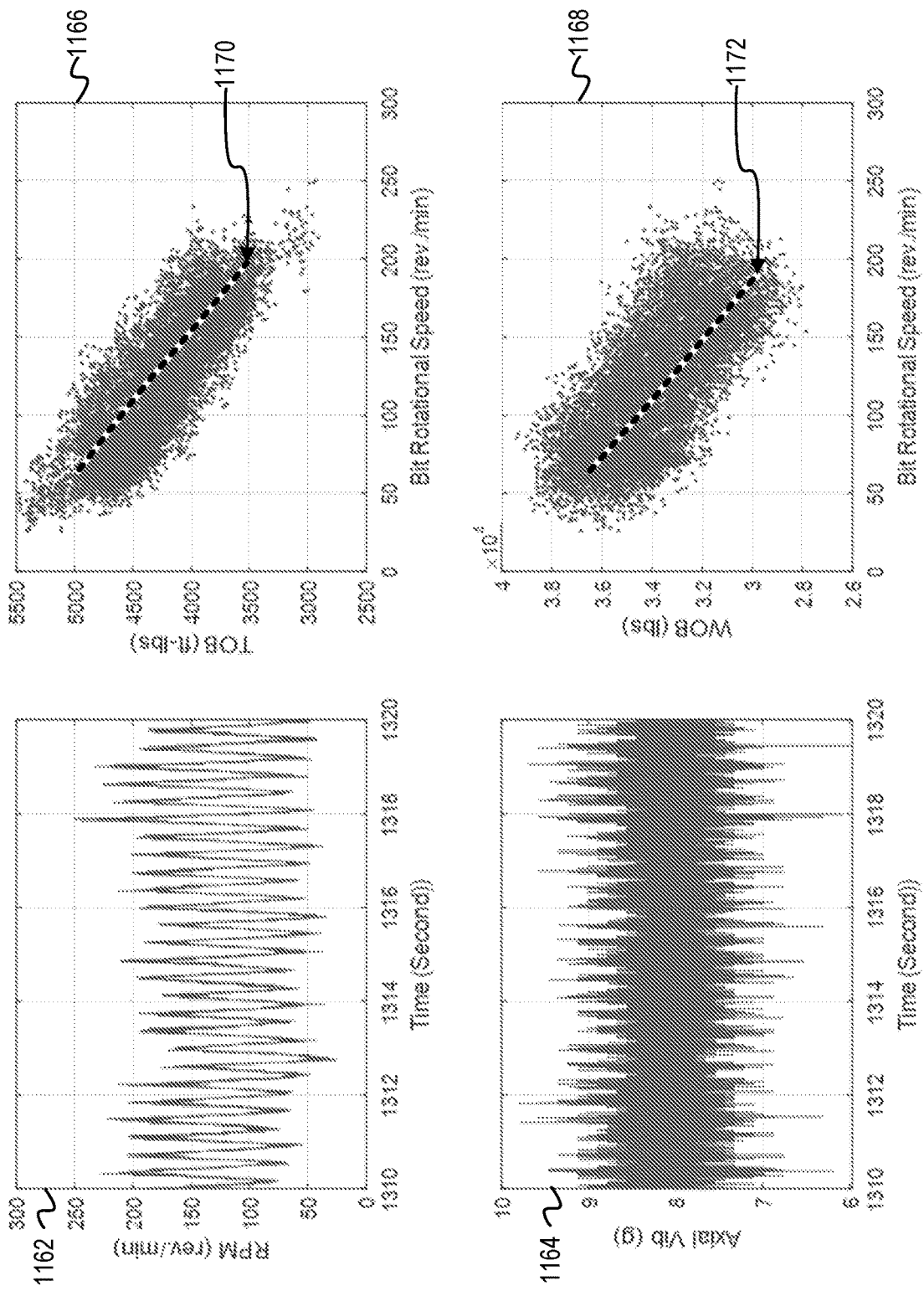

FIG. 11D includes graph 1162 depicting RPM in rev/min as a function of time in sec for a 10 sec interval. The graph 1162 displays a maximum RPM of approximately 250 rev/min and a minimum RPM of approximately 25 rev/min. RPM exhibits a periodicity with approximately 26 maximums over the time period shown, which gives a frequency of a about 2.6 Hz. FIG. 11D also includes graph 1164, which depicts axial vibration in units g as a function of time for the same 10 sec interval shown in the graph 1162. The graph 1164 displays a maximum axial vibration of approximately 10 g and a minimum axial vibration of approximately 6 g. The axial vibration exhibits periodicity at the same frequency as the RPM of the graph 1162. FIG. 11D further includes graph 1166 depicting TOB in ft-lbs as a function of RPM in rev/min and graph 1168 depicting WOB in lbs as a function of RPM in rev/min for the same 10 sec interval shown in the graphs 1162 and 1164.

The graph 1166 displays a torsional dysfunction in TOB, where TOB displays a strong velocity weakening effect where TOB decreases with increasing RPM. TOB ranges from approximately 5500 ft lbs for RPM of approximately 50 rev/min to 3000 ft-lbs for RPM of approximately 200 rev/min. A dotted line 1170, which represents the approximate median TOB value as a function of RPM, is superimposed on the data points of the graph 1166. The dotted line 1170 displays a negative trend of TOB value with increased RPM value. The graph 1168 displays a torsional dysfunction in WOB, where WOB displays a strong velocity weakening and WOB decreases with increasing RPM. WOB ranges from approximately 38,000 lbs for RPM of approximately 50 rev/min to 29,000 lbs for RPM of approximately 200 rev/min. A dotted line 1172, which represents the approximate median WOB value as a function of RPM, is superimposed on the data points of the graph 1168. The dotted line 1172 displays a negative trend of WOB value with increasing RPM value.

Figure 12A:
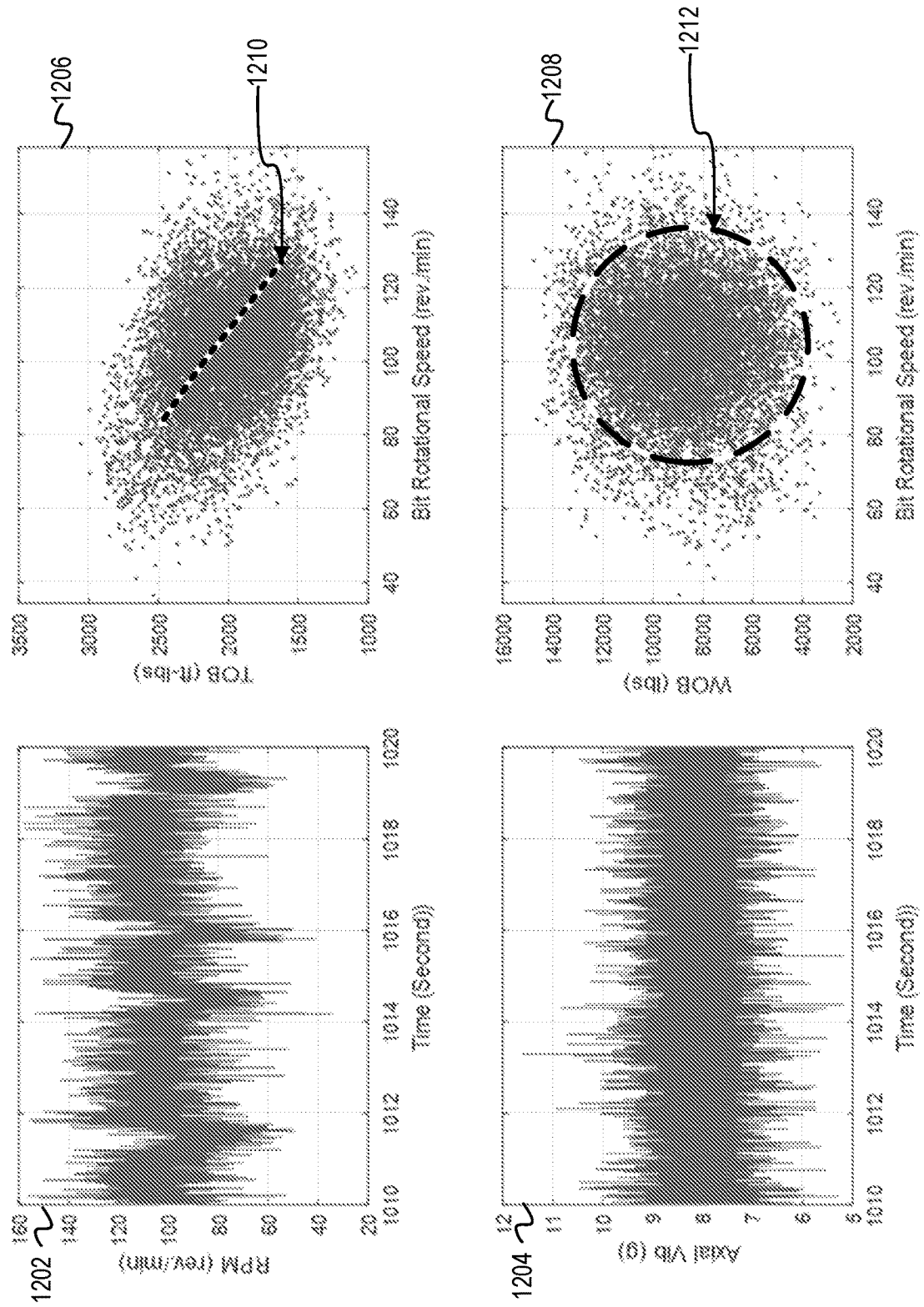
FIGS. 12A-12B depict graphs corresponding to two example instances of high frequency torsional vibrations.
Figure 12B:
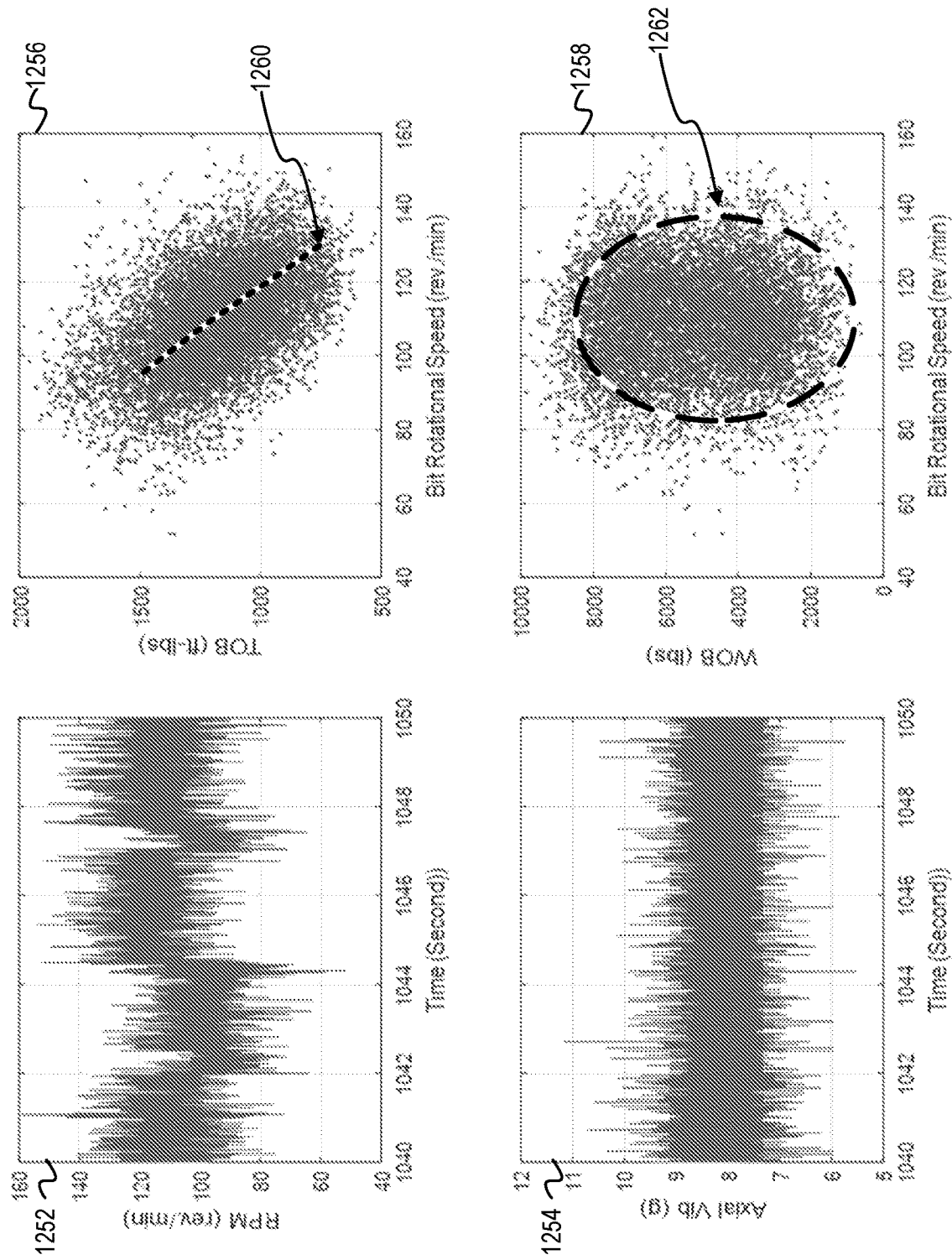

FIGS. 12A-12B depict graphs corresponding to two example instances of high frequency torsional vibrations. FIG. 12A includes graph 1202 depicting RPM in rev/min as a function of time in sec for a 10 sec interval. The graph 1202 displays a maximum RPM of approximately 160 rev/min and a minimum RPM of approximately 40 rev/min. RPM exhibits noise, which corresponds to high frequency oscillation not discernable on the time scale of the graph 1202. FIG. 12A also includes graph 1204, which depicts axial vibration in units g as a function of time for the same 10 sec interval shown in the graph 1202. The graph 1204 displays a maximum axial vibration of approximately 11.5 g and a minimum axial vibration of approximately 5 g. The axial vibration exhibits high noise—corresponding to high frequency vibrations—on the same time scale as the RPM of the graph 1202. FIG. 12A further includes graph 1206 depicting TOB in ft-lbs as a function of RPM in rev/min and graph 1208 depicting WOB in lbs as a function of RPM in rev/min for the same 10 sec interval shown in the graphs 1202 and 1204.

The graph 1206 displays a torsional dysfunction in TOB, where TOB displays a velocity weakening effect stronger than the measurement variance where TOB decreases with increasing RPM. TOB ranges from approximately 3000 ft lbs for RPM of approximately 50 rev/min to 1250 ft-lbs for RPM of approximately 145 rev/min. A dotted line 1210, which represents the approximate median TOB value as a function of RPM, is superimposed on the data points of the graph 1206. The dotted line 1210 displays a negative trend of TOB value with increased RPM value. The graph 1208 displays a torsional dysfunction in WOB, where WOB does not display velocity weakening effects. WOB instead exhibits a circular distribution or variance about a central point of approximately 9,000 lbs and 105 rev/min. The distribution of points lies predominantly between WOB values of 4,000 and 14,000 lbs and between 60 and 140 rev/min in RPM. A circle 1212 (shown with a dashed line) encircles the central and densest portion of the WOB-and-RPM distribution. The graph 1208 displays no negative trend of WOB values with RPM values.

FIG. 12B includes graph 1252 depicting RPM in rev/min as a function of time in sec for a 10 sec interval. The graph 1252 displays a maximum RPM of approximately 160 rev/min and a minimum RPM of approximately 50 rev/min. RPM exhibits noise, which corresponds to high frequency oscillation not discernable on the time scale of the graph 1202. The median value of RPM also changes, with the median value for times between 1040 and 1042 sec at about 110 rev/min and the median value for times between 1042 and 1044 sec at about 100 rev/min. FIG. 12B also includes graph 1254, which depicts axial vibration in units g as a function of time for the same 10 sec interval shown in the graph 1252. The graph 1254 displays a maximum axial vibration of approximately 11 g and a minimum axial vibration of approximately 6 g. The axial vibration exhibits high noise—corresponding to high frequency vibrations—on the same time scale as the RPM of the graph 1252. FIG. 12B further includes graph 1256 depicting TOB in ft-lbs as a function of RPM in rev/min and graph 1258 depicting WOB in lbs as a function of RPM in rev/min for the same 10 sec interval shown in the graphs 1252 and 1254.

The graph 1256 displays a torsional dysfunction in TOB, where TOB displays a velocity weakening effect where TOB decreases with increasing RPM. TOB ranges from approximately 2000 ft lbs for RPM of approximately 80 rev/min to 700 ft-lbs for RPM of approximately 140 rev/min. A dotted line 1260, which represents the approximate median TOB value as a function of RPM, is superimposed on the data points of the graph 1256. The dotted line 1260 displays a negative trend of TOB value with increased RPM value. The graph 1258 displays a torsional dysfunction in WOB, where WOB does not display velocity weakening effects. WOB instead exhibits an elliptical distribution or variance about a central point of approximately 5,000 lbs and 110 rev/min. The distribution of points lies predominantly between WOB values of 1,000 and 9,500 lbs and between 80 and 140 rev/min in RPM. An ellipse 1262 (shown with a dashed line) encompasses the central and densest portion of the WOB-and-RPM distribution. The graph 1258 displays no negative trend of WOB values with RPM values.

Figure 13A:
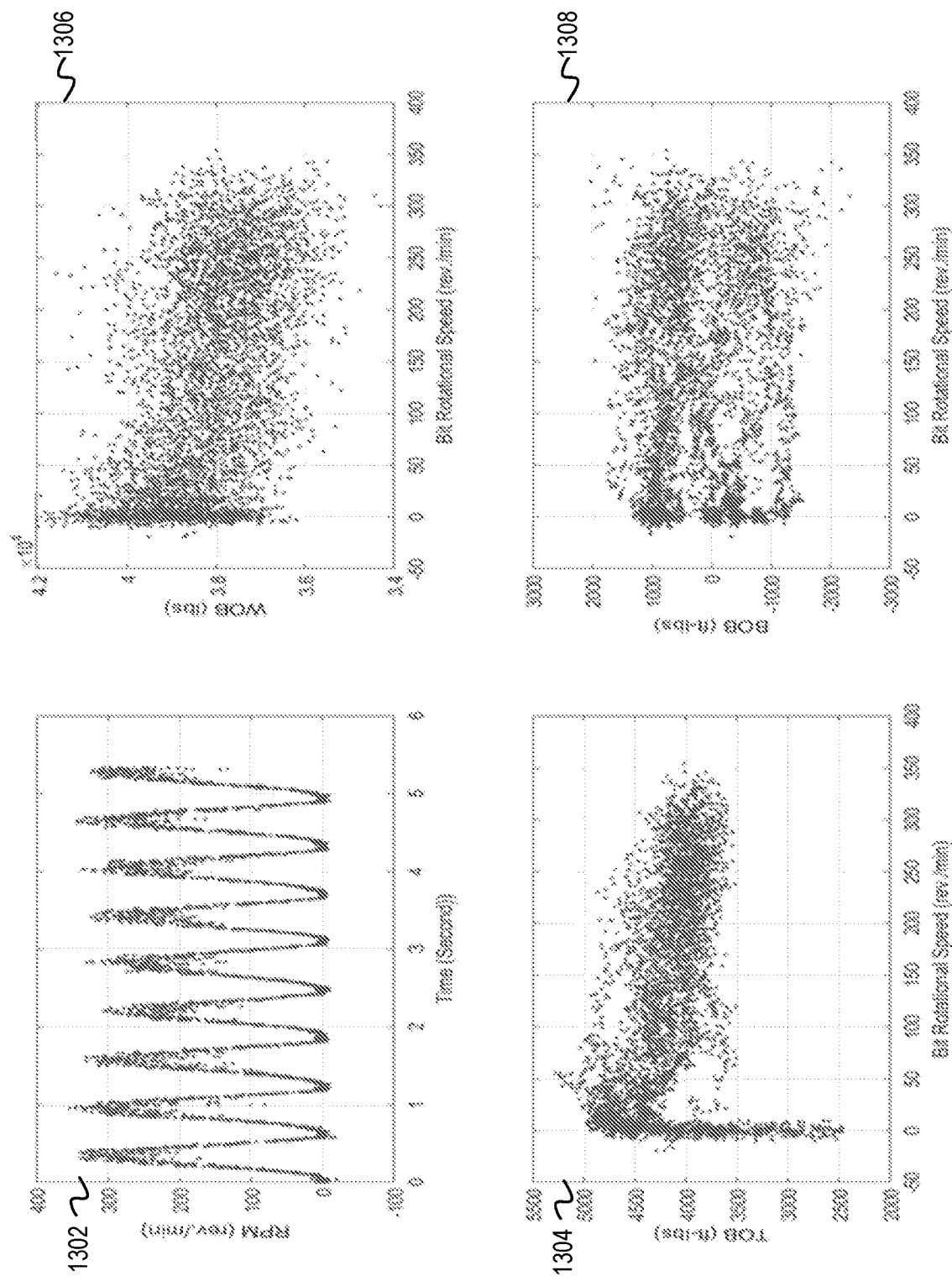
FIGS. 13A, 13B, 13C, and 13D depict graphs corresponding to four example data collection time periods.

FIGS. 13A, 13B, 13C, and 13D depict graphs corresponding to four example data collection time periods. FIGS. 13A, 13B, 13C, and 13D contain graphs of measurements obtained during cutting-induced stick-slip. FIG. 13A includes graph 1302 depicting RPM in rev/min as a function of time in sec for a 5 sec interval. The graph 1302 displays slip periods with maximum RPM of approximately 350 rev/min and stick periods with minimum RPM of approximately 0 rev/min. The stick slip phases exhibit periodicity with relatively constant approximately 0.6 sec periods, which corresponds to a frequency of about 1.7 Hz. Slip phases last about 0.5 sec and vary between RPM values of 0 to 350 with a triangular shape. RPM exhibits variability during slip phases but stick phases have RPM values distributed close to 0 rev/min. FIG. 13A further includes graph 1304 depicting TOB in ft-lbs as a function of RPM in rev/min, graph 1306 depicting WOB in lbs as a function of RPM in rev/min, and graph 1308 depicting bending moment of the bit (BOB) in ft-lbs as a function of RPM in rev/min for the same interval shown in the graph 1302.

The graph 1304 displays a torsional dysfunction in TOB, where TOB is grouped into two (or more) distributions. A first set of points are clustered at approximately 0 RPM (i.e., corresponding to the stick phases) with TOB values between 2500 and 5000 ft-lbs. A second set of points are clustered at RPM values greater than zero with TOB ranging between 5500 and 3500 ft-lbs. The second set of points, which correspond to the slip phases, also exhibit a general decrease in TOB as a function of increasing RPM which is the velocity weakening effect. The graph 1306 displays minor torsional dysfunction and WOB clustered in two distributions, where a first grouping of data points are clustered about 0 RPM between 36,000 and 42,000 lbs. The second grouping of data points occupies the space for 0<RPM≤350 rev/min and between 40,000 and 35,000 lbs and exhibits a decrease in WOB as a function or RPM.

Figure 13B:
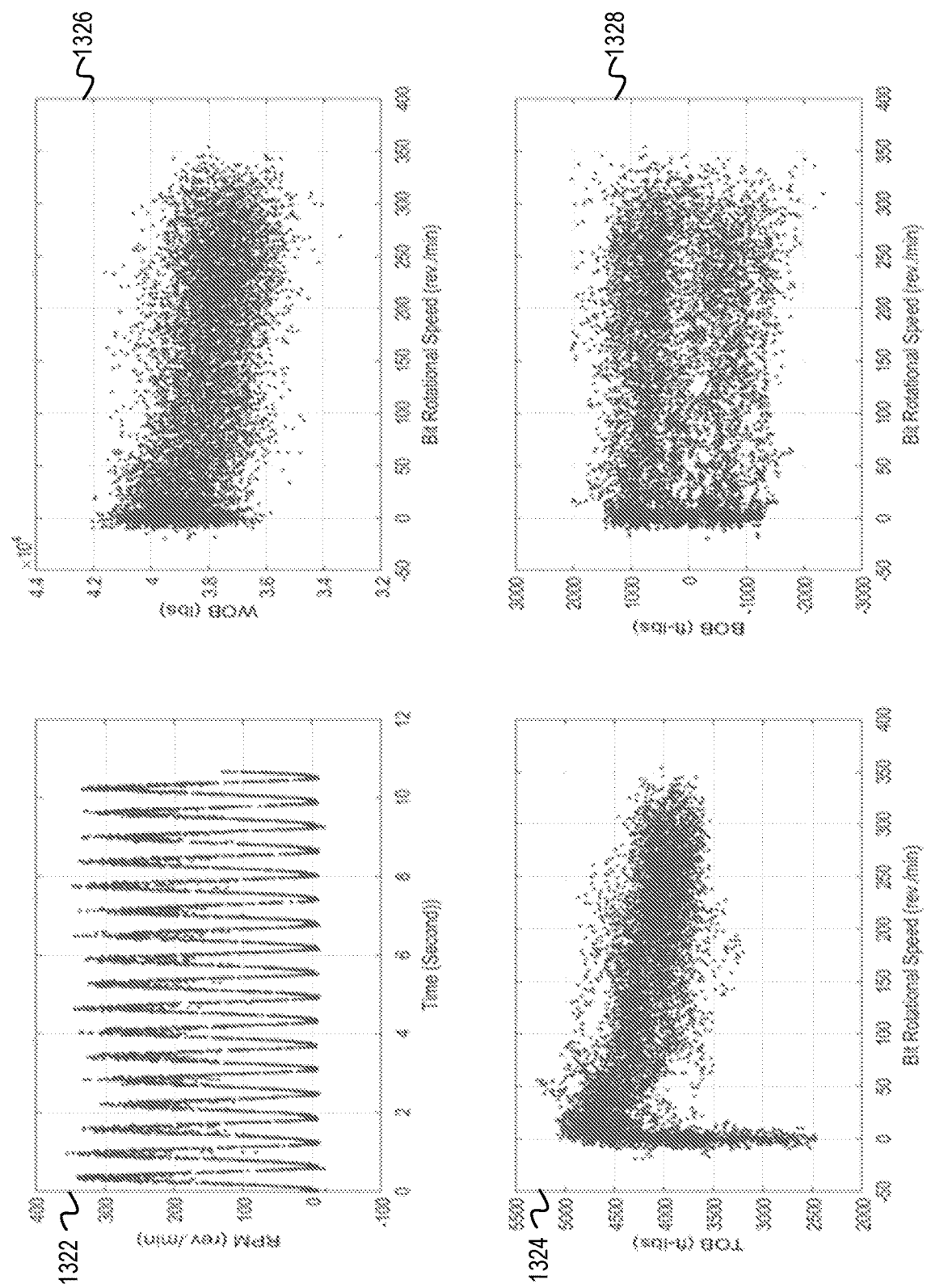

FIG. 13B includes graph 1322 depicting RPM in rev/min as a function of time in sec for a 10 sec interval. The graph 1322 displays slip periods with maximum RPM of approximately 350 rev/min and stick periods with minimum RPM of approximately 0 rev/min. The stick slip phases exhibit periodicity with relatively constant approximately 0.6 sec periods, which corresponds to a frequency of about 1.7 Hz. Slip phases last about 0.5 sec and vary between RPM values of 0 to 350 with a triangular shape. RPM exhibits variability during slip phases but stick phases have RPM values distributed close to 0 rev/min. FIG. 13B further includes graph 1304 depicting TOB in ft-lbs as a function of RPM in rev/min, graph 1306 depicting WOB in lbs as a function of RPM in rev/min, and graph 1308 depicting bending moment of the bit (BOB) in ft-lbs as a function of RPM in rev/min for the same 10 sec interval shown in the graph 1302. Generally, the graphs 1324, 1326, and 1328 are similar to the graphs 1304, 1306, and 1308, respectively, showing the same patterns but with more data points.

Figure 13C:
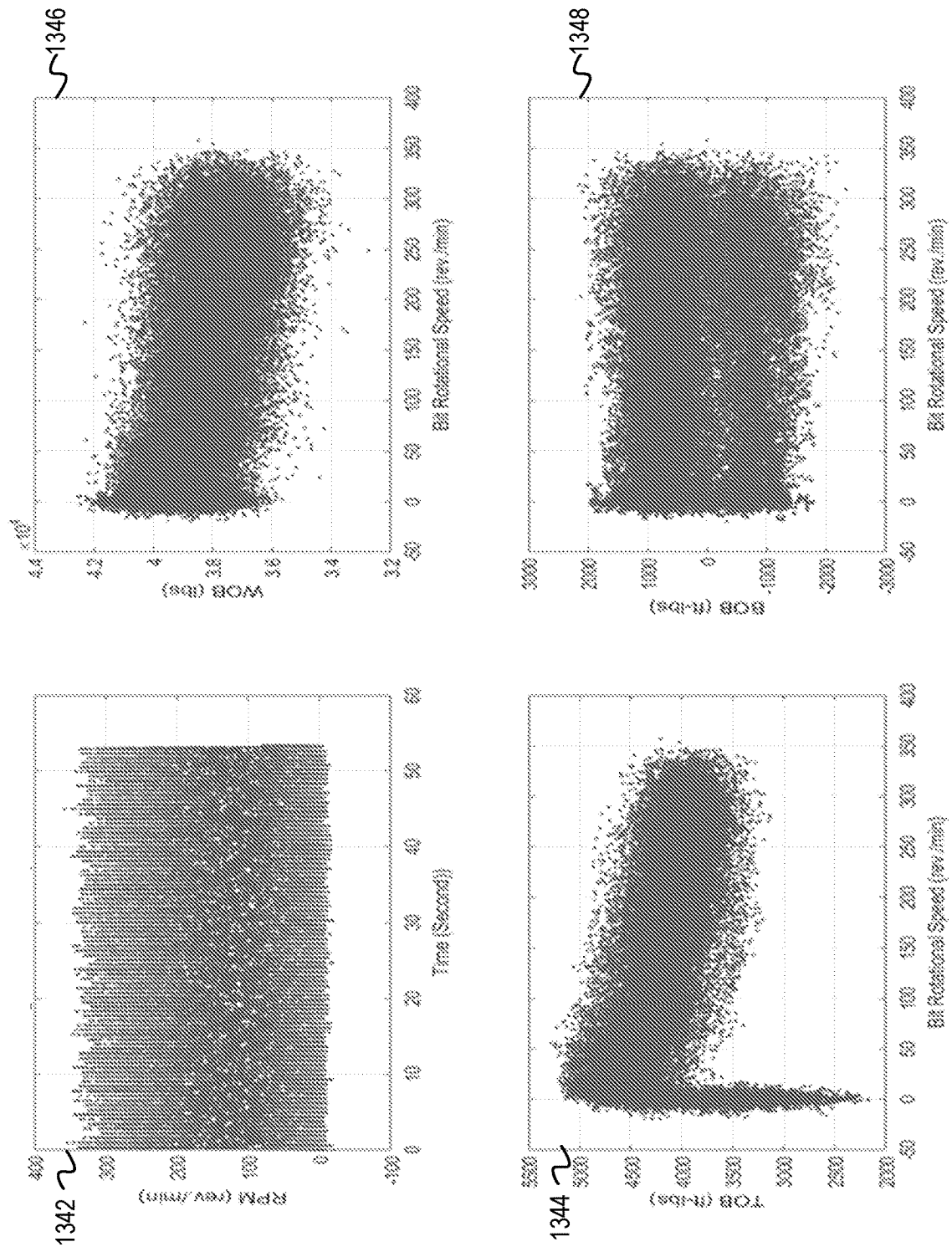

FIG. 13C includes graph 1342 depicting RPM in rev/min as a function of time in sec for a 50 sec interval. FIG. 13C further includes graph 1344 depicting TOB in ft-lbs as a function of RPM in rev/min, graph 1346 depicting WOB in lbs as a function of RPM in rev/min, and graph 1348 depicting bending moment of the bit (BOB) in ft-lbs as a function of RPM in rev/min for the same 50 sec interval shown in the graph 1342. Generally, the graphs 1342, 1344, 1346, and 1348 are similar to the graphs 1302, 1304, 1306, and 1308, respectively, showing the same patterns but with more data points.

Figure 13D:
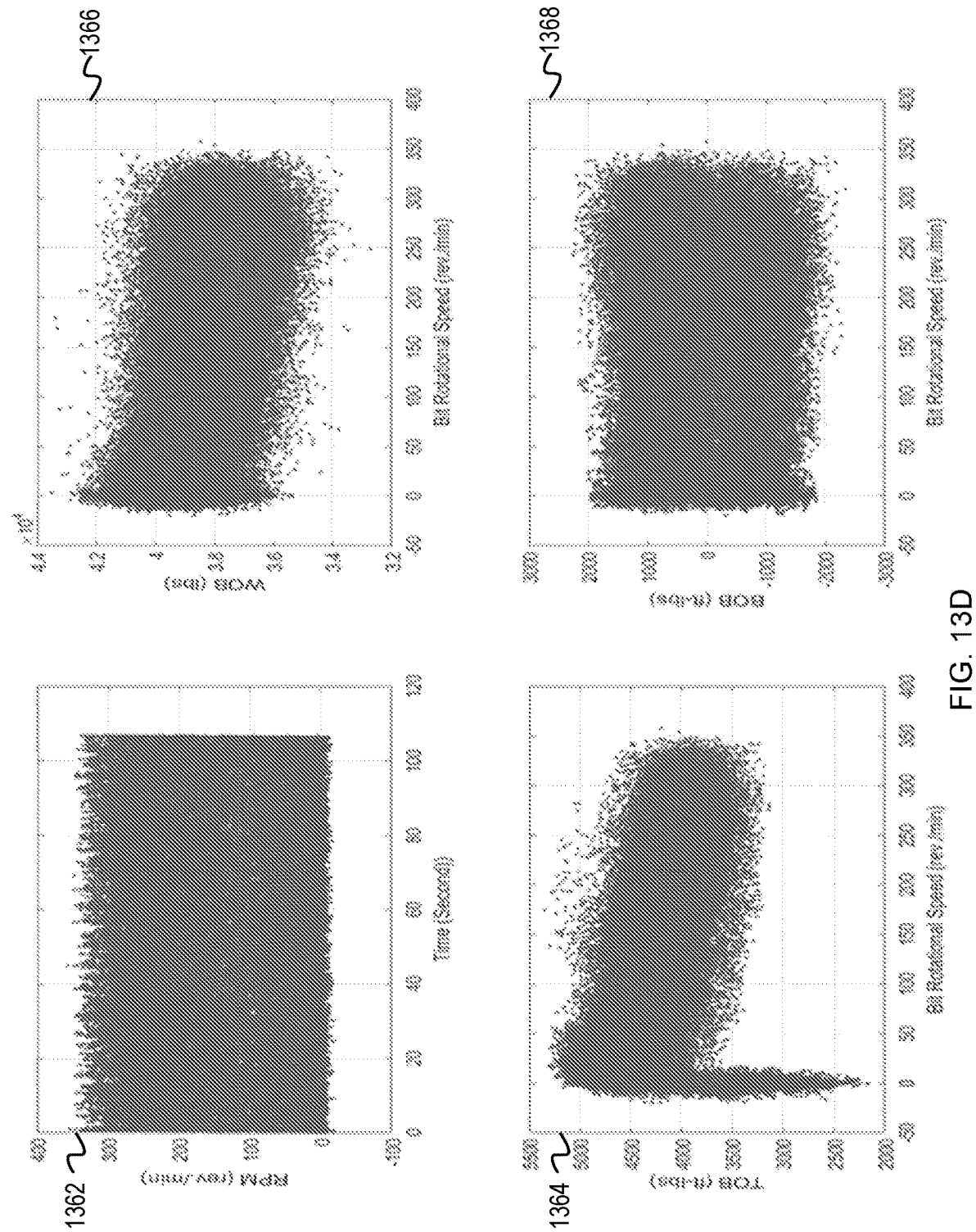

FIG. 13D includes graph 1362 depicting RPM in rev/min as a function of time in sec for a 100 sec interval. FIG. 13D further includes graph 1364 depicting TOB in ft-lbs as a function of RPM in rev/min, graph 1366 depicting WOB in lbs as a function of RPM in rev/min, and graph 1368 depicting bending moment of the bit (BOB) in ft-lbs as a function of RPM in rev/min for the same 100 sec interval shown in the graph 1362. Generally, the graphs 1362, 1364, 1366, and 1368 are similar to the graphs 1302, 1304, 1306, and 1308, respectively, showing the same patterns but with more data points.

Data collection time lengths of 5, 10, 50, and 100 seconds display enough data to identify cutting-induced stick-slip, as shown in FIGS. 13A-13D. Therefore, time period length can be chosen to balance accuracy (i.e., more data points) and speed (i.e., shorter time periods). 10 sec intervals for data collection are shown in many of the included figures, but the interval selection should not be considered limiting on any of the embodiments as it can be varied.

Figure 14:
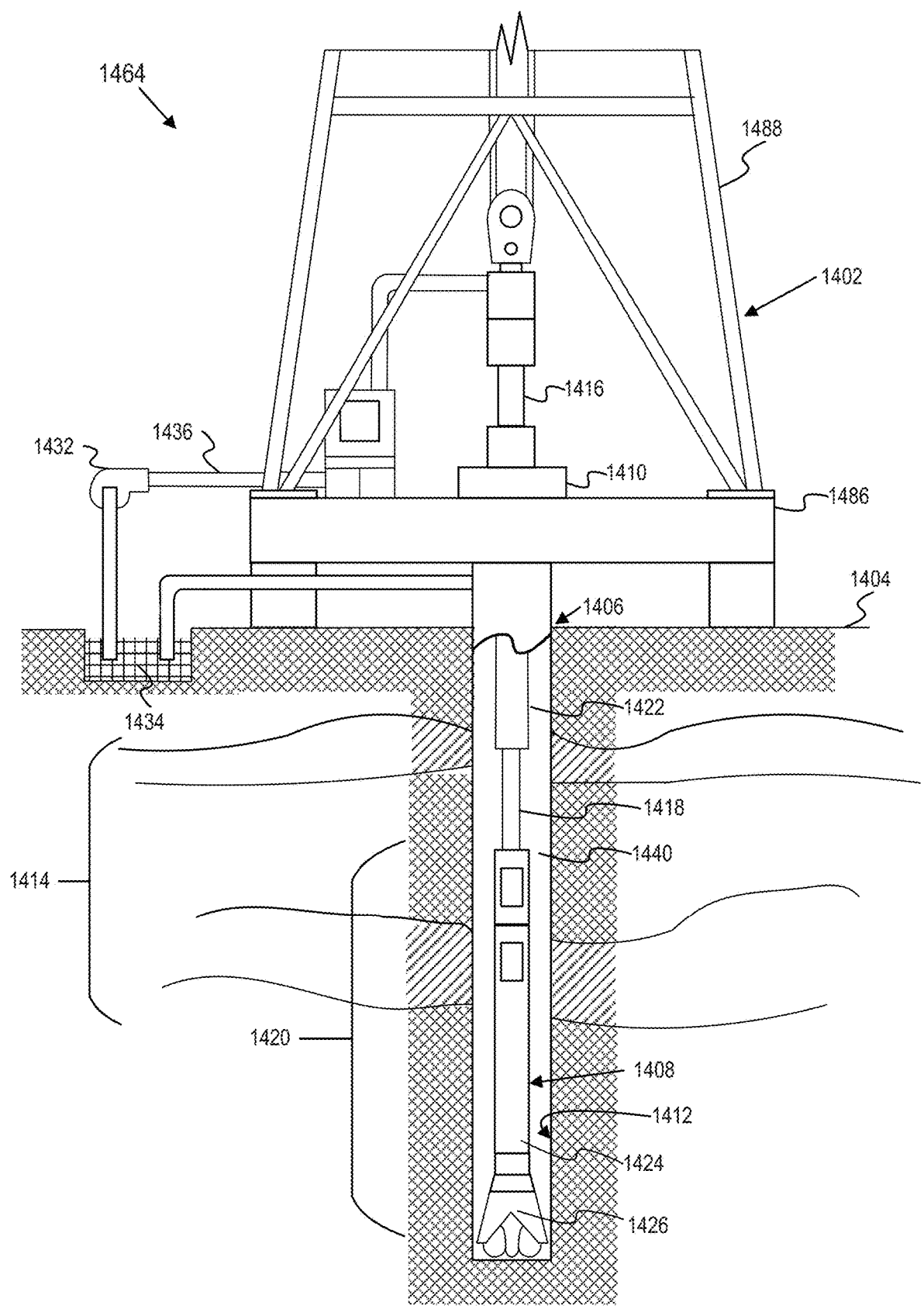
FIG. 14 depicts a schematic diagram of an example drilling system.

FIG. 14 depicts a schematic diagram of an example drilling system. For example, in FIG. 14 it can be seen how a system 1464 may also form a portion of a drilling rig 1402 located at the surface 1404 of a well 1406. Drilling of oil and gas wells is commonly carried out using a string of drill pipes connected together so as to form a drilling string 1408 that is lowered through a rotary table 1410 into a wellbore or borehole 1412. Here a drilling platform 1486 is equipped with a derrick 1488 that supports a hoist.

The drilling rig 1402 may thus provide support for the drill string 1408. The drill string 1408 may operate to penetrate the rotary table 1410 for drilling the borehole 1412 through subsurface formations 1414. The drill string 1408 may include a Kelly 1416, drill pipe 1418, and a bottom hole assembly 1420, perhaps located at the lower portion of the drill pipe 1418.

The bottom hole assembly 1420 may include drill collars 1422, a down hole tool 1424, and a drill bit 1426. The drill bit 1426 may operate to create a borehole 1412 by penetrating the surface 1404 and subsurface formations 1414. The down hole tool 1424 may comprise any of a number of different types of tools including MWD tools, LWD tools, and others.

The drill bit 1426 can be any of a poly-crystalline diamond compact (PDC) bit as depicted in FIG. 1, but can also be thermally stable polycrystalline (TSP) drill bit, a rotary bit such as a fixed cutter-bit (i.e., a PDC bit, a TSP bit, an impregnated bit, a diamond bit, etc.), a rotary bit such as a roller-cone bit (i.e., a tungsten carbide insert (TCI) bit, a milled-tooth bit, etc.), a coring bit, a reaming bit, a side-tracking bit, a natural diamond drill bit, an impregnated diamond drill bit, a hybrid roller cone (RC/FC) and fixed cutter drill bit, etc. The drill bit 1426 can contain one or more sensors and a processor or controller, where the circuitry associated with the drill bit detects at least one of torsional, axial, and rotational dysfunction and transmits identifiers associated with the detected dysfunction to the surface (such as in an array). The drill bit 1426 can communicate with a surface controller via electronic, acoustic (e.g., mud motor or mud pulse telemetry), optical, etc. means of communication. The surface controller can then identify one or more types of drill bit dysfunction and, optionally, mitigate the identified dysfunction.

During drilling operations, the drill string 1408 (perhaps including the Kelly 1416, the drill pipe 1418, and the bottom hole assembly 1420) may be rotated by the rotary table 1410. In addition to, or alternatively, the bottom hole assembly 1420 may also be rotated by a motor (e.g., a mud motor) that is located down hole. Additionally, the mud motor may be used as a communication device, such as via frequency or amplitude modulation, between the drill bit 1426 and surface controller located at the surface 1404. The drill collars 1422 may be used to add weight to the drill bit 1426. The drill collars 1422 may also operate to stiffen the bottom hole assembly 1420, allowing the bottom hole assembly 1420 to transfer the added weight to the drill bit 1426, and in turn, to assist the drill bit 1426 in penetrating the surface 1404 and subsurface formations 1414.

During drilling operations, a mud pump 1432 may pump drilling fluid (sometimes known by those of ordinary skill in the art as "drilling mud") from a mud pit 1434 through a hose 1436 into the drill pipe 1418 and down to the drill bit 1426. The drilling fluid can flow out from the drill bit 1426 and be returned to the surface 1404 through an annular area 1440 between the drill pipe 1418 and the sides of the borehole 1412. The drilling fluid may then be returned to the mud pit 1434, where such fluid is filtered. In some embodiments, the drilling fluid can be used to cool the drill bit 1426, as well as to provide lubrication for the drill bit 1426 during drilling operations. Additionally, the drilling fluid may be used to remove subsurface formation 1414 cuttings created by operating the drill bit 1426. It is the images of these cuttings that many embodiments operate to acquire and process.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 350 and 360 can be performed in parallel or concurrently. With respect to FIG. 3A, identification of a normal drilling is not necessary. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Figure 15:
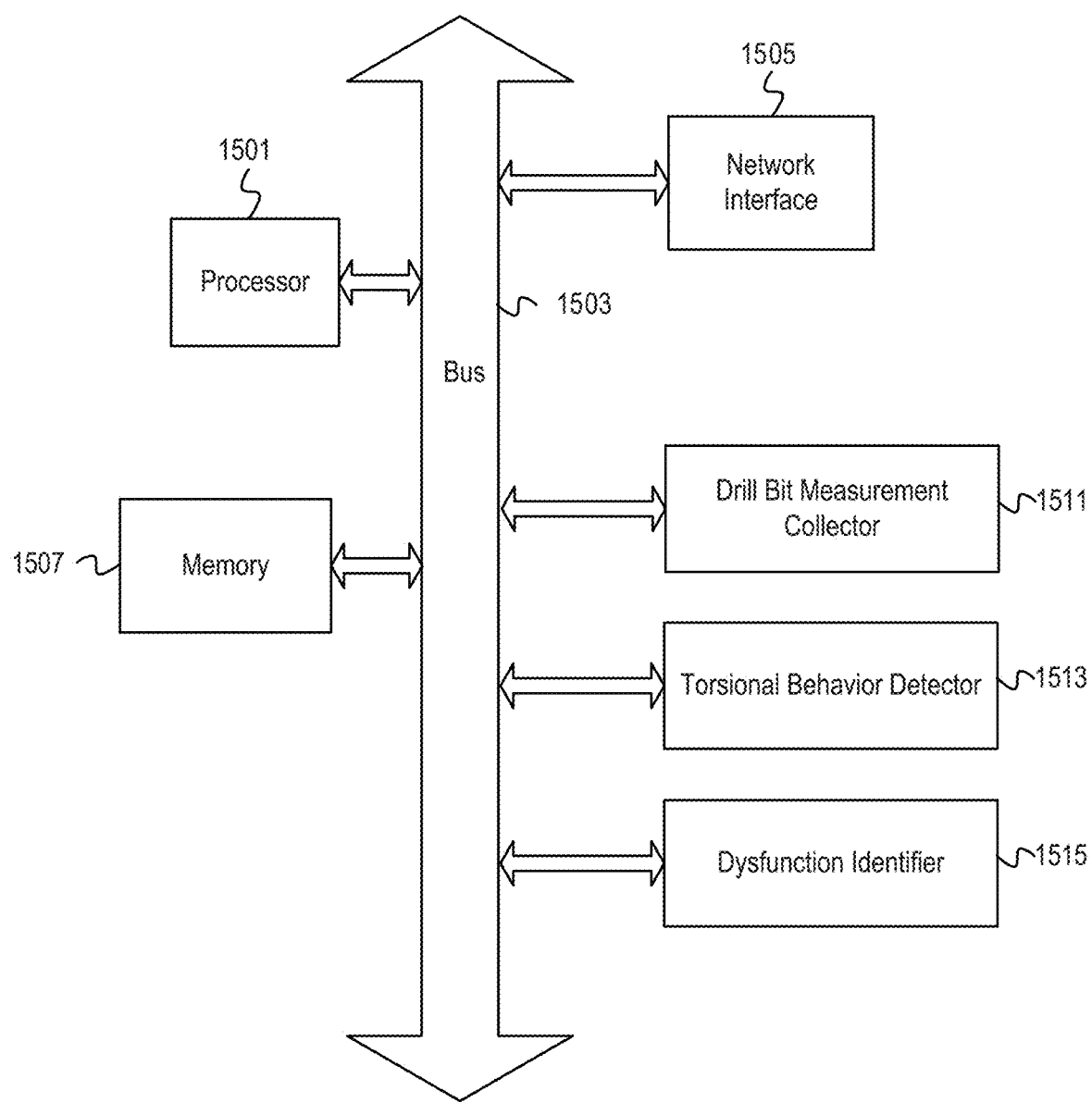
FIG. 15 depicts an example computer system with a drill bit measurement collector, torsional behavior detector, and dysfunction identifier.

FIG. 15 depicts an example computer system with a drill bit measurement collector, torsional behavior detector, and dysfunction identifier. The computer system includes a processor 1501 (possibly including multiple processors, multiple cores, multiple nodes, and/or implementing multi-threading, etc.). The computer system includes memory 1507. The memory 1507 may be system memory or any one or more of the above already described possible realizations of machine-readable media. The computer system also includes a bus 1503 and a network interface 1505. The system also includes a drill bit measurement collector 1511, a torsional behavior detector 1513, and a dysfunction identifier 1515. The drill bit measurement collector 1511 includes one or more sensor or other force measurement device to measure at least one of TOB and WOB and sensors to measure RPM over time. The torsional behavior detector 1513 analyzes the measurements collected by the drill bit measurement collector 1511 to determine at least one drill bit dysfunction classification. The torsional behavior detector 1513 can be in communication with the dysfunction identifier 1515 directly or can communicate through mud pulse telemetry or other acceptable communication methods. The dysfunction identifier 1515 can be located at the surface in a surface device or can optionally be located downhole at or near the drill bit. The dysfunction identifier 1515 determines a drill bit dysfunction for one or more drill bit dysfunction classification communicated by the torsional behavior detector 1513. Any one of the previously described functionalities may be partially (or entirely) implemented in hardware and/or on the processor 1501. For example, the functionality may be implemented with an application specific integrated circuit, in logic implemented in the processor 1501, in a co-processor on a peripheral device or card, etc. Further, realizations may include fewer or additional components not illustrated in FIG. 15 (e.g., video cards, audio cards, additional network interfaces, peripheral devices, etc.). The processor 1501 and the network interface 1505 are coupled to the bus 1503. Although illustrated as being coupled to the bus 1503, the memory 1507 may be coupled to the processor 1501.

While the aspects of the disclosure are described with reference to various implementations and exploitations, it will be understood that these aspects are illustrative and that the scope of the claims is not limited to them. In general, techniques for torsional behavior detection and drill bit dysfunction identification as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

TERMINOLOGY

Embodiment 1

A method comprising: obtaining a plurality of drill bit operational measurements in a time period that a drill bit is operating; determining a plurality of distributions, wherein each distribution corresponds to a different combination of the drill bit operational measurements; for each distribution, fitting the distribution to one or more curves, wherein each of the curves represents a torsional behavior; indicating as an array each of the torsional behaviors represented by the one or more curves that the distributions fit; and identifying a drill bit dysfunction based on the array.

Embodiment 2

The method of embodiment 1, wherein the drill bit operational measurements comprise at least one of torque on bit measurements, weight on bit measurements, and rotational measurements.

Embodiment 3

The method of embodiment 1 or 2, wherein the torsional behavior represented by the one or more curves comprises one of torsional dysfunction, axial dysfunction, and rotational dysfunction.

Embodiment 4

The method of embodiment 3, wherein the torsional behavior represented by the one or more curves further comprises functional behavior.

Embodiment 5

The method of embodiments 3 or 4, wherein the torsional behavior represented by the one or more curves further comprises at least one of coupled vibrations, high frequency vibrations, low frequency vibrations, and a circular distribution of a combination of a set of weight on bit measurements and a set of rotational measurements.

Embodiment 6

The method of any one of embodiments 1 to 5, wherein indicating as an array each of the torsional behaviors further comprises: based on at least one of the drill bit operational measurements, determining at least one of a characteristic frequency, an indication of coupled vibrations, an indication of high frequency vibration, an indication of low frequency vibration, and an indication of stick-slip; and indicating in the array at least one of the characteristic frequency, the indication of coupled vibrations, the indication of high frequency vibration, the indication of low frequency vibration, and the indication of stick-slip.

Embodiment 7

The method of any one of embodiments 1 to 6, further comprising: transmitting the array to a surface device for identification of a drill bit dysfunction.

Embodiment 8

The method of any one of embodiments 1 to 7, wherein identifying the drill bit dysfunction comprises at least one of: identifying cutting-induced stick-slip based on the array indicating detection of torsional behaviors of torsional, axial, and rotational dysfunction; identifying drillpipe-induced stick-slip based on the array indicating detection of torsional behaviors of torsional and rotational dysfunction and no axial dysfunction; identifying high frequency torsional oscillations or three-dimensional coupled vibrations based on the array indicating detection of torsional behaviors of dysfunction and no axial or rotational dysfunction;

and identifying friction-induced stick-slip based on the array indicating detection of torsional behaviors of rotational dysfunction and no torsional or axial dysfunction.

Embodiment 9

The method of any one of embodiments 1 to 8, wherein identifying the drill bit dysfunction comprises at least one of identifying normal drilling behavior or high frequency torsional noise based on the array indicating detection of torsional behaviors of no torsional, axial, or rotational dysfunction.

Embodiment 10

The method of any one of embodiments 1 to 9, wherein identifying the drill bit dysfunction further comprises at least one of: identifying low frequency torsional oscillation or three-dimensional coupled vibrations based on the array indicating detection of no torsional, axial, and rotational dysfunctions and on the array indicating coupled vibrations and low frequency vibrations; identifying high frequency torsional vibrations based on the array indicating detection of no torsional, axial, and rotational dysfunctions and on the array indicating detection of a circular distribution of a combination of a set of weight on bit measurements and a set of rotational measurements; identifying high frequency torsional vibrations based on the array indicating detection of no torsional, axial, and rotational dysfunctions and no coupled vibrations and on the array indicating high frequency vibrations; and identifying low frequency torsional vibrations based on the array indicating detection of no torsional, axial, and rotational dysfunctions and no coupled vibrations.

Embodiment 11

The method of any one of embodiments 1 to 10 further comprising: mitigating the identified drill bit dysfunction.

Embodiment 12

The method of embodiment 11, wherein mitigating the identified drill bit dysfunction comprises adjusting at least one of a drilling parameter and a drill bit parameter.

Embodiment 13

The method of any one of embodiments 1 to 12, wherein fitting the distribution to the one or more curves, comprises fitting the distributions to the one or more curves to within a margin.

Embodiment 14

The method of any one of embodiments 1 to 13, wherein each of the one or more curves comprises a curve previously correlated to a torsional behavior.

Embodiment 15

A non-transitory, machine-readable medium having instructions stored thereon that are executable by a computing device to perform operations comprising instructions to: obtain a plurality of drill bit operational measurements in a time period that a drill bit is operating; determine a plurality of distributions, wherein each distribution corresponds to a different combination of the drill bit operational measurements; for each distribution, fit the distribution to one or more curves, wherein each of the curves represents a torsional behavior; indicate in an array each of the torsional behaviors represented by the one or more curves that the distribution fits; and identify a drill bit dysfunction based on the array.

Embodiment 16

The machine-readable medium of embodiment 15, wherein the drill bit operational measurements comprise at least one of torque on bit measurements, weight on bit measurements, and rotational measurements, and wherein the torsional behaviors represented by the one or more curves comprise torsional dysfunction, axial dysfunction, and rotational dysfunction.

Embodiment 17

The machine-readable medium of embodiment 15 or 16, wherein instructions to indicate in the array each of the torsional behaviors further comprise instructions to: based on at least one of the drill bit operational measurements, determine at least one of a characteristic frequency, an indication of coupled vibrations, an indication of high frequency vibration, an indication of low frequency vibration, and an indication of stick-slip; and indicate in the array at least one of the characteristics frequency, the indication of coupled vibrations, the indication of high frequency vibration, the indication of low frequency vibration, and the indication of stick-slip.

Embodiment 18

The machine-readable medium of any one of embodiments 15 to 17, further comprising instructions to: provide the array for transmission to a surface device that identifies drill bit dysfunction.

Embodiment 19

A drill bit comprising: at least two sensors; a processor; and a computer-readable medium having instructions stored thereon that are executable by the processor to cause the drill bit to, obtain a plurality of drill bit operational measurements in a time period that a drill bit is operating; determine a plurality of distributions, wherein each distribution corresponds to a different combinations of the drill bit operational measurements; for each distribution, fit the distribution to one or more curves, wherein each of the curves represents a torsional behavior; indicate in an array each of the torsional behaviors represented by the one or more curves that the distribution fits; and identify a drill bit dysfunction based on the array.

Embodiment 20

The drill bit of embodiment 19, wherein the instructions further comprise instructions to transmit the array to a surface device for identification of a drill bit dysfunction.

Embodiment 21

The drill bit of embodiment 19 or 20, wherein the at least two sensors comprise a weight on bit sensor and a torque on bit sensor.

Embodiment 22

The drill bit of embodiment 21, further comprising a third sensor and wherein the third sensor is a rotational velocity sensor.

Embodiment 23

The drill bit of any one of embodiments 19 to 22, wherein the instructions to fit the distribution to one or more curves further comprise instructions to select the one or more curves from a plurality of curves, wherein the computer-readable medium has stored thereon the plurality of curves and wherein each of the plurality of curves has been previously correlated to a torsional behavior.

Embodiment 24

A method comprising: obtaining a plurality of drill bit operational measurements in a time period that a drill bit is operating; determining a plurality of distributions, where each distribution corresponds to a different combination of the drill bit operational measurements; for each distribution, fitting the distribution to one or more curves, wherein each of the curves represents a torsional behavior; indicating as an array each of the torsional behaviors represented by the one of more curves that the distributions fit; and transmitting the array for identification of a drill bit torsional dysfunction.

Embodiment 25

The method of embodiment 24, wherein the drill bit operational measurements comprise at least one of torque on bit measurements, weight on bit measurements and rotational measurements.

Embodiment 26

The method of embodiment 24 or 25, wherein the torsional behavior represented by the one or more curves comprises at least one of torsional dysfunction, no torsional dysfunction, axial dysfunction, no axial dysfunction, rotational dysfunction and no rotational dysfunction.

Embodiment 27

The method of any one of embodiments 24 to 26, wherein indicating as an array each of the torsional behaviors further comprises: based on at least one of the drill bit operational measurements, determining at least one of a characteristic frequency, an indication of coupled vibrations, an indication of high frequency vibration, an indication of low frequency vibration, and an indication of stick-slip; and indicating in the array at least one of the characteristic frequency, the indication of coupled vibrations, the indication of high frequency vibration, the indication of low frequency vibration, and the indication of stick-slip.

Embodiment 28

The method of any one of embodiments 24 to 27, further comprising: identifying a drill bit dysfunction based on the array.

Embodiment 29

The method of any one of embodiments 24 to 28, wherein fitting the distribution to the one or more curves comprises fitting the distribution to the one or more curves to within a margin.

Embodiment 30

The method of any one of embodiments 24 to 29, wherein each of the one or more curves comprises a curve previously correlated to at least one of torsional dysfunction, no torsional dysfunction, axial dysfunction, no axial dysfunction, rotational dysfunction and no rotational dysfunction.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    obtaining a plurality of drill bit operational measurements in a time period that a drill bit is operating;
    determining a plurality of distributions, wherein each distribution corresponds to a different combination of the drill bit operational measurements;
    for each distribution, fitting the distribution to one or more curves, wherein each of the curves represents a torsional behavior;
    indicating as an array each of the torsional behaviors represented by the one or more curves that the distributions fit; and
    identifying a drill bit dysfunction based on the array.

2. The method of claim 1, wherein the drill bit operational measurements comprise at least one of torque on bit measurements, weight on bit measurements, and rotational measurements.

3. The method of claim 1, wherein the torsional behavior represented by the one or more curves comprises one of torsional dysfunction, axial dysfunction, and rotational dysfunction.

4. The method of claim 3, wherein the torsional behavior represented by the one or more curves further comprises functional behavior.

5. The method of claim 3, wherein the torsional behavior represented by the one or more curves further comprises at least one of coupled vibrations, high frequency vibrations, low frequency vibrations, and a circular distribution of a combination of a set of weight on bit measurements and a set of rotational measurements.

6. The method of claim 1, wherein indicating as an array each of the torsional behaviors further comprises:
    based on at least one of the drill bit operational measurements, determining at least one of a characteristic frequency, an indication of coupled vibrations, an indication of high frequency vibration, an indication of low frequency vibration, and an indication of stick-slip; and
    indicating in the array at least one of the characteristic frequency, the indication of coupled vibrations, the indication of high frequency vibration, the indication of low frequency vibration, and the indication of stick-slip.

7. The method of claim 1, further comprising:
transmitting the array to a surface device for identification of a drill bit dysfunction.

8. The method of claim 1, wherein identifying the drill bit dysfunction comprises at least one of:
identifying cutting-induced stick-slip based on the array indicating detection of torsional behaviors of torsional, axial, and rotational dysfunction;
identifying drillpipe-induced stick-slip based on the array indicating detection of torsional behaviors of torsional and rotational dysfunction and no axial dysfunction;
identifying high frequency torsional oscillations or three-dimensional coupled vibrations based on the array indicating detection of torsional behaviors of dysfunction and no axial or rotational dysfunction; and
identifying friction-induced stick-slip based on the array indicating detection of torsional behaviors of rotational dysfunction and no torsional or axial dysfunction.

9. The method of claim 1, wherein identifying the drill bit dysfunction comprises at least one of identifying normal drilling behavior or high frequency torsional noise based on the array indicating detection of torsional behaviors of no torsional, axial, or rotational dysfunction.

10. The method of claim 1, wherein identifying the drill bit dysfunction further comprises at least one of:
identifying low frequency torsional oscillation or three-dimensional coupled vibrations based on the array indicating detection of no torsional, axial, and rotational dysfunctions and on the array indicating coupled vibrations and low frequency vibrations;
identifying high frequency torsional vibrations based on the array indicating detection of no torsional, axial, and rotational dysfunctions and on the array indicating detection of a circular distribution of a combination of a set of weight on bit measurements and a set of rotational measurements;
identifying high frequency torsional vibrations based on the array indicating detection of no torsional, axial, and rotational dysfunctions and no coupled vibrations and on the array indicating high frequency vibrations; and
identifying low frequency torsional vibrations based on the array indicating detection of no torsional, axial, and rotational dysfunctions and no coupled vibrations.

11. The method of claim 1 further comprising:
mitigating the identified drill bit dysfunction.

12. The method of claim 11, wherein mitigating the identified drill bit dysfunction comprises adjusting at least one of a drilling parameter and a drill bit parameter.

13. The method of claim 1, wherein fitting the distribution to the one or more curves, comprises fitting the distributions to the one or more curves to within a margin.

14. The method of claim 1, wherein each of the one or more curves comprises a curve previously correlated to a torsional behavior.

15. A non-transitory, machine-readable medium having instructions stored thereon that are executable by a computing device to perform operations comprising instructions to:
obtain a plurality of drill bit operational measurements in a time period that a drill bit is operating;
determine a plurality of distributions, wherein each distribution corresponds to a different combination of the drill bit operational measurements;
for each distribution, fit the distribution to one or more curves, wherein each of the curves represents a torsional behavior;
indicate in an array each of the torsional behaviors represented by the one or more curves that the distribution fits; and
identify a drill bit dysfunction based on the array.

16. The machine-readable medium of claim 15, wherein the drill bit operational measurements comprise at least one of torque on bit measurements, weight on bit measurements, and rotational measurements, and wherein the torsional behaviors represented by the one or more curves comprise torsional dysfunction, axial dysfunction, and rotational dysfunction.

17. The machine-readable medium of claim 15, wherein instructions to indicate in the array each of the torsional behaviors further comprise instructions to:
based on at least one of the drill bit operational measurements, determine at least one of a characteristic frequency, an indication of coupled vibrations, an indication of high frequency vibration, an indication of low frequency vibration, and an indication of stick-slip; and
indicate in the array at least one of the characteristics frequency, the indication of coupled vibrations, the indication of high frequency vibration, the indication of low frequency vibration, and the indication of stick-slip.

18. The machine-readable medium of claim 15, further comprising instructions to:
provide the array for transmission to a surface device that identifies drill bit dysfunction.

19. A drill bit comprising:
at least two sensors;
a processor; and
a non-transitory computer-readable medium having instructions stored thereon that are executable by the processor to cause the drill bit to,
obtain a plurality of drill bit operational measurements in a time period that a drill bit is operating;
determine a plurality of distributions, wherein each distribution corresponds to a different combinations of the drill bit operational measurements;
for each distribution, fit the distribution to one or more curves, wherein each of the curves represents a torsional behavior;
indicate in an array each of the torsional behaviors represented by the one or more curves that the distribution fits; and
identify a drill bit dysfunction based on the array.

20. The drill bit of claim 19, wherein the instructions further comprise instructions to transmit the array to a surface device for identification of a drill bit dysfunction.

21. The drill bit of claim 19, wherein the at least two sensors comprise a weight on bit sensor and a torque on bit sensor.

22. The drill bit of claim 21, further comprising a third sensor and wherein the third sensor is a rotational velocity sensor.

23. The drill bit of claim 19, wherein the instructions to fit the distribution to one or more curves further comprise instructions to select the one or more curves from a plurality of curves, wherein the non-transitory computer-readable medium has stored thereon the plurality of curves and wherein each of the plurality of curves has been previously correlated to a torsional behavior.

24. A method comprising:
obtaining a plurality of drill bit operational measurements in a time period that a drill bit is operating;
determining a plurality of distributions, where each distribution corresponds to a different combination of the drill bit operational measurements;
for each distribution, fitting the distribution to one or more curves, wherein each of the curves represents a torsional behavior;
indicating as an array each of the torsional behaviors represented by the one of more curves that the distributions fit; and
transmitting the array for identification of a drill bit torsional dysfunction.

25. The method of claim 24, wherein the drill bit operational measurements comprise at least one of torque on bit measurements, weight on bit measurements and rotational measurements.

26. The method of claim 24, wherein the torsional behavior represented by the one or more curves comprises at least one of torsional dysfunction, no torsional dysfunction, axial dysfunction, no axial dysfunction, rotational dysfunction and no rotational dysfunction.

27. The method of claim 24, wherein indicating as an array each of the torsional behaviors further comprises:
based on at least one of the drill bit operational measurements, determining at least one of a characteristic frequency, an indication of coupled vibrations, an indication of high frequency vibration, an indication of low frequency vibration, and an indication of stick-slip; and
indicating in the array at least one of the characteristic frequency, the indication of coupled vibrations, the indication of high frequency vibration, the indication of low frequency vibration, and the indication of stick-slip.

28. The method of claim 24, further comprising:
identifying a drill bit dysfunction based on the array.

29. The method of claim 24, wherein fitting the distribution to the one or more curves comprises fitting the distribution to the one or more curves to within a margin.

30. The method of claim 24, wherein each of the one or more curves comprises a curve previously correlated to at least one of torsional dysfunction, no torsional dysfunction, axial dysfunction, no axial dysfunction, rotational dysfunction and no rotational dysfunction.

* * * * *